United States Patent
Kawase

(10) Patent No.: US 9,519,854 B2
(45) Date of Patent: Dec. 13, 2016

(54) RFID TAG, RFID SYSTEM, AND PACKAGE INCLUDING RFID TAG

(71) Applicant: Tsutomu Kawase, Kanagawa (JP)

(72) Inventor: Tsutomu Kawase, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 6 days.

(21) Appl. No.: 14/356,536

(22) PCT Filed: Dec. 7, 2012

(86) PCT No.: PCT/JP2012/082434
§ 371 (c)(1),
(2) Date: May 6, 2014

(87) PCT Pub. No.: WO2013/085076
PCT Pub. Date: Jun. 13, 2013

(65) Prior Publication Data
US 2014/0291390 A1    Oct. 2, 2014

(30) Foreign Application Priority Data

Dec. 9, 2011  (JP) ................... 2011-269506
Aug. 16, 2012 (JP) ................... 2012-180367
Aug. 29, 2012 (JP) ................... 2012-188144

(51) Int. Cl.
*G06K 19/077*    (2006.01)
*H01Q 13/10*     (2006.01)
*H01Q 1/22*      (2006.01)

(52) U.S. Cl.
CPC ... *G06K 19/07771* (2013.01); *G06K 19/07773* (2013.01); *H01Q 1/2225* (2013.01); *H01Q 13/10* (2013.01)

(58) Field of Classification Search
CPC ............... G06K 19/07771; G06K 19/07773; G06K 19/07783; H01Q 1/2208; H01Q 1/2225; H01Q 1/2283; H01Q 9/0407; H01Q 13/10; H01Q 13/106; B08B 13/2417; G08B 13/2437
(Continued)

(56) References Cited

U.S. PATENT DOCUMENTS 7,088,249 B2   8/2006  Senba et al.
8,035,524 B2   10/2011 Sakama et al.
(Continued)

FOREIGN PATENT DOCUMENTS

DE   10 2006 029 248 A1   5/2007
JP   09-005080            1/1997
(Continued)

OTHER PUBLICATIONS

Extended European Search Report issued Apr. 20, 2015 in Patent Application No. 12855271.8.
(Continued)

*Primary Examiner* — Suezu Ellis
(74) *Attorney, Agent, or Firm* — Oblon, McClelland, Maier & Neustadt, L.L.P.

(57) ABSTRACT

An RFID tag is attached to a metal member including a slit, the RFID tag including conductive members attached to a surface of the metal member at corresponding sides of the slit in a width direction of the slit through an isolator; and an IC chip that receives power through the conductive members. When a frequency of radio waves is f, the power induced between the sides the slit is Wa, voltage induced between the sides of the slit is V, an area of each of the conductive members is S, thickness of the isolator is d, a dielectric constant of the isolator is $\in_r$, a dielectric constant of vacuum is $\in_0$, and a minimum value of the power required for the IC chip to operate is Wmin, an inequality Wmin≤Wa−4πf·S·$\in_0$·$\in_r$·V²/d is satisfied.

6 Claims, 101 Drawing Sheets

(58) Field of Classification Search
USPC .................. 235/492; 340/572.1, 572.7, 572.8
See application file for complete search history.

(56) References Cited

U.S. PATENT DOCUMENTS

| | | |
|---|---|---|
| 8,215,562 B2 | 7/2012 | Kai et al. |
| 2002/0126057 A1* | 9/2002 | King .................. B65B 15/04 343/725 |
| 2007/0046466 A1 | 3/2007 | Sakama et al. |
| 2011/0080270 A1 | 4/2011 | Kawase |
| 2011/0175790 A1 | 7/2011 | Yanagi et al. |
| 2012/0044088 A1 | 2/2012 | Watanabe et al. |
| 2012/0187198 A1 | 7/2012 | Kato et al. |

FOREIGN PATENT DOCUMENTS

| | | |
|---|---|---|
| JP | 2002-157565 | 5/2002 |
| JP | 2005-149298 | 6/2005 |
| JP | 2005-173151 | 6/2005 |
| JP | 2005-309811 | 11/2005 |
| JP | 2007-135183 | 5/2007 |
| JP | 2008-284967 | 11/2008 |
| JP | 2009-031893 | 2/2009 |
| JP | 2009-081689 | 4/2009 |
| JP | 2009-140182 | 6/2009 |
| JP | 2010-087622 | 4/2010 |
| JP | 4723447 | 7/2011 |
| JP | 2011-155627 | 8/2011 |
| JP | 2011-187075 | 9/2011 |
| JP | 4787572 | 10/2011 |
| JP | 2012-043440 | 3/2012 |
| WO | 2011/111509 A1 | 9/2011 |

OTHER PUBLICATIONS

U.S. Appl. No. 14/277,534 filed May 14, 2014.
International Search Report Issued on Mar. 12, 2013 in PCT/JP2012/082434 filed on Dec. 7, 2012.

* cited by examiner

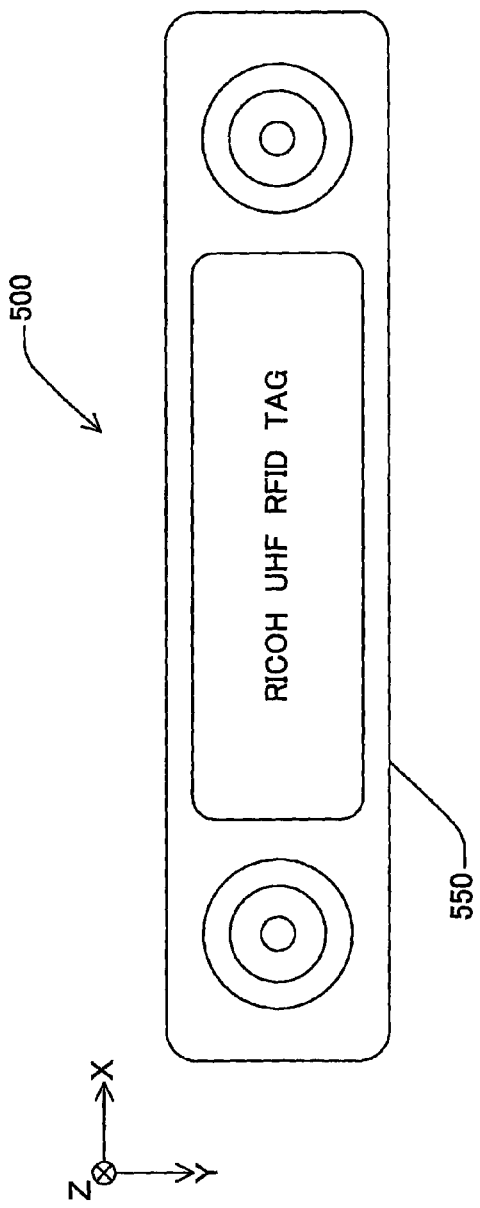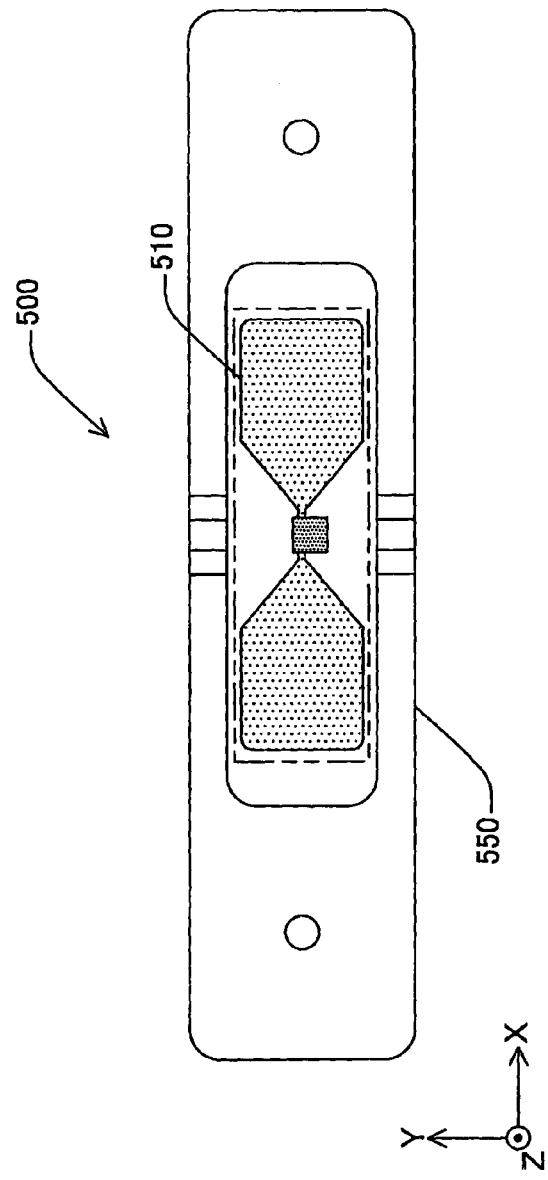

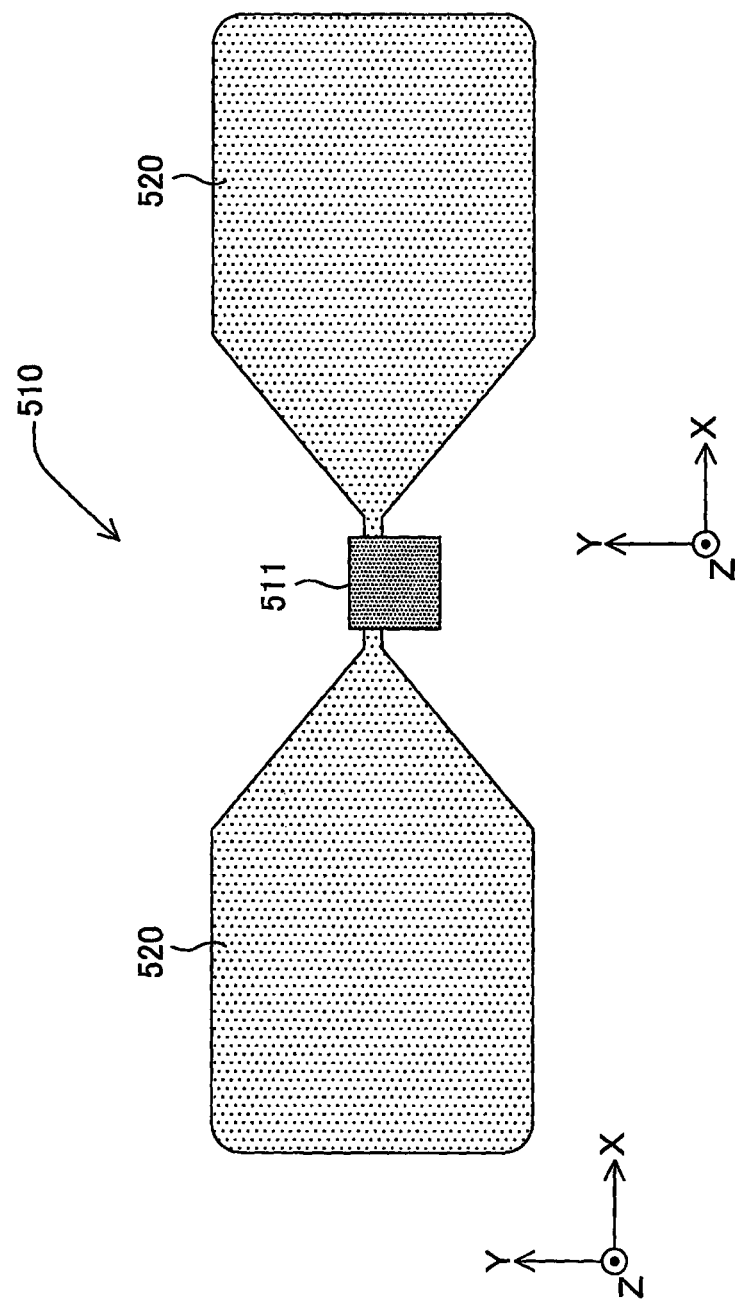

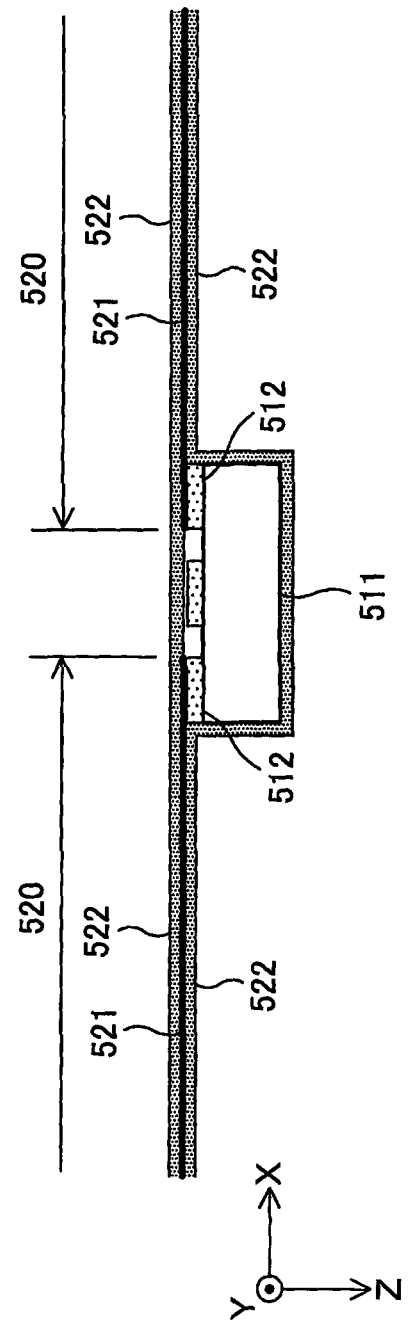

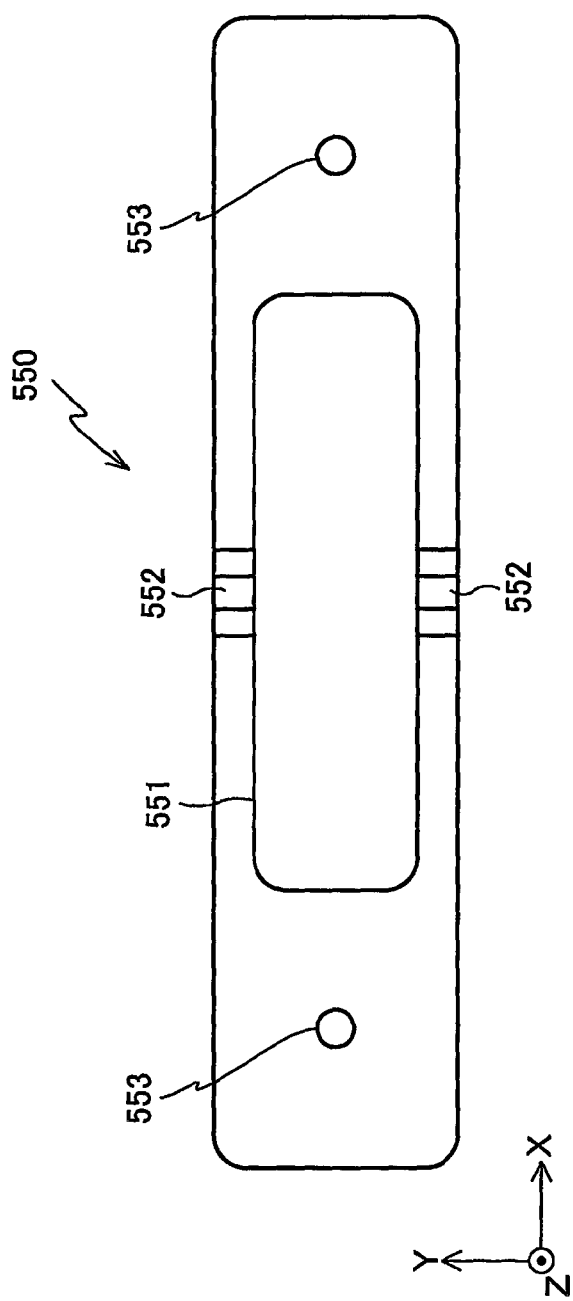
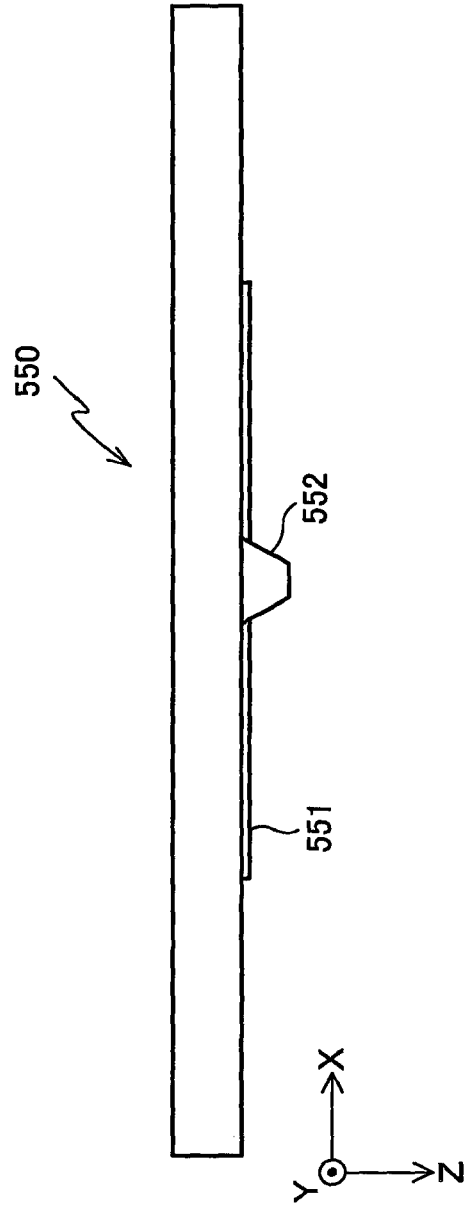

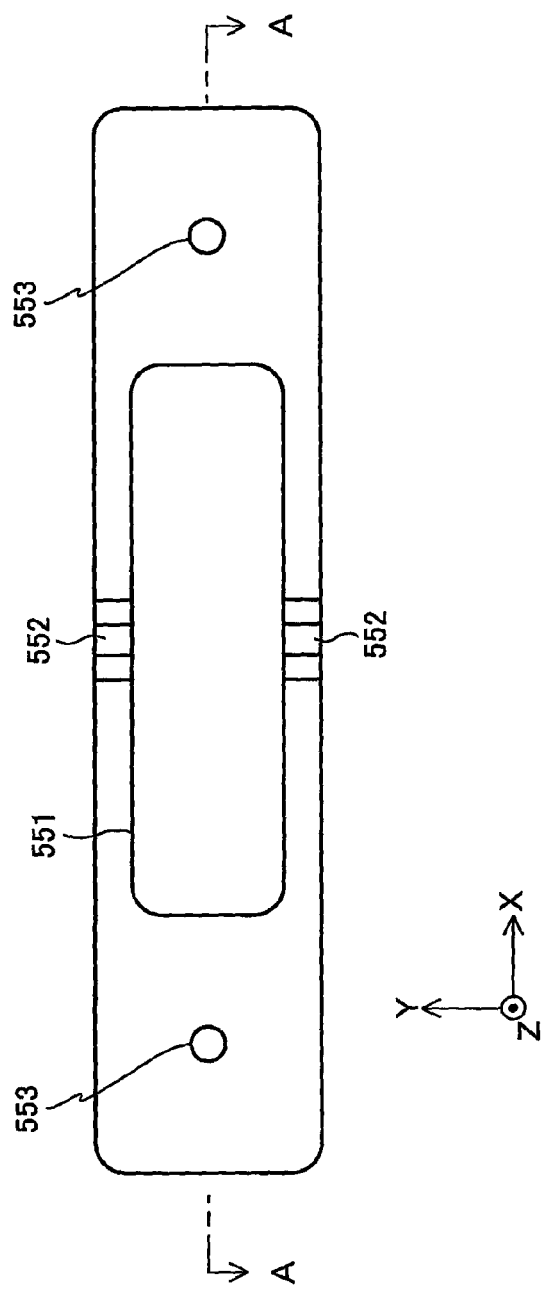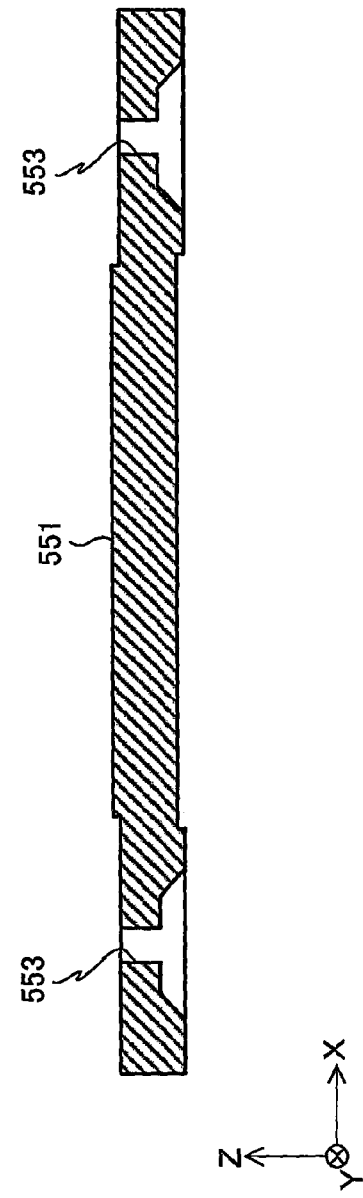
FIG.14A
FIG.14B

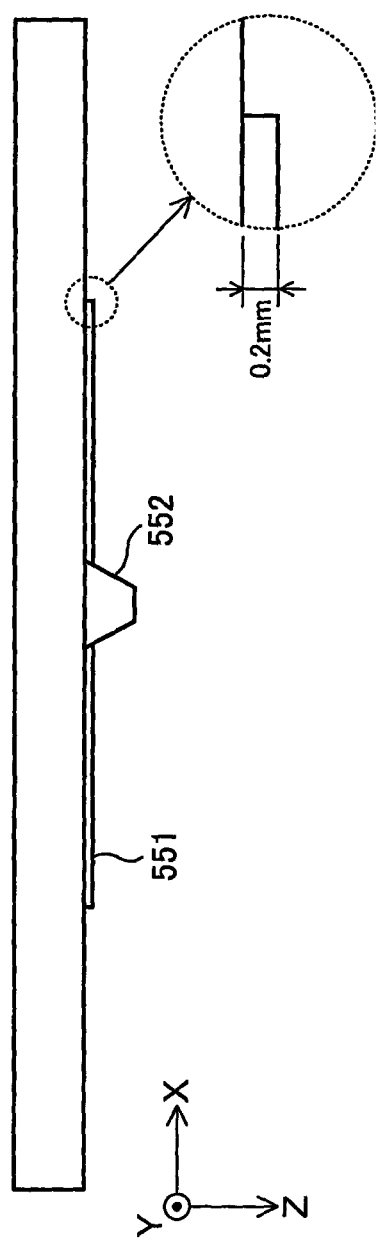

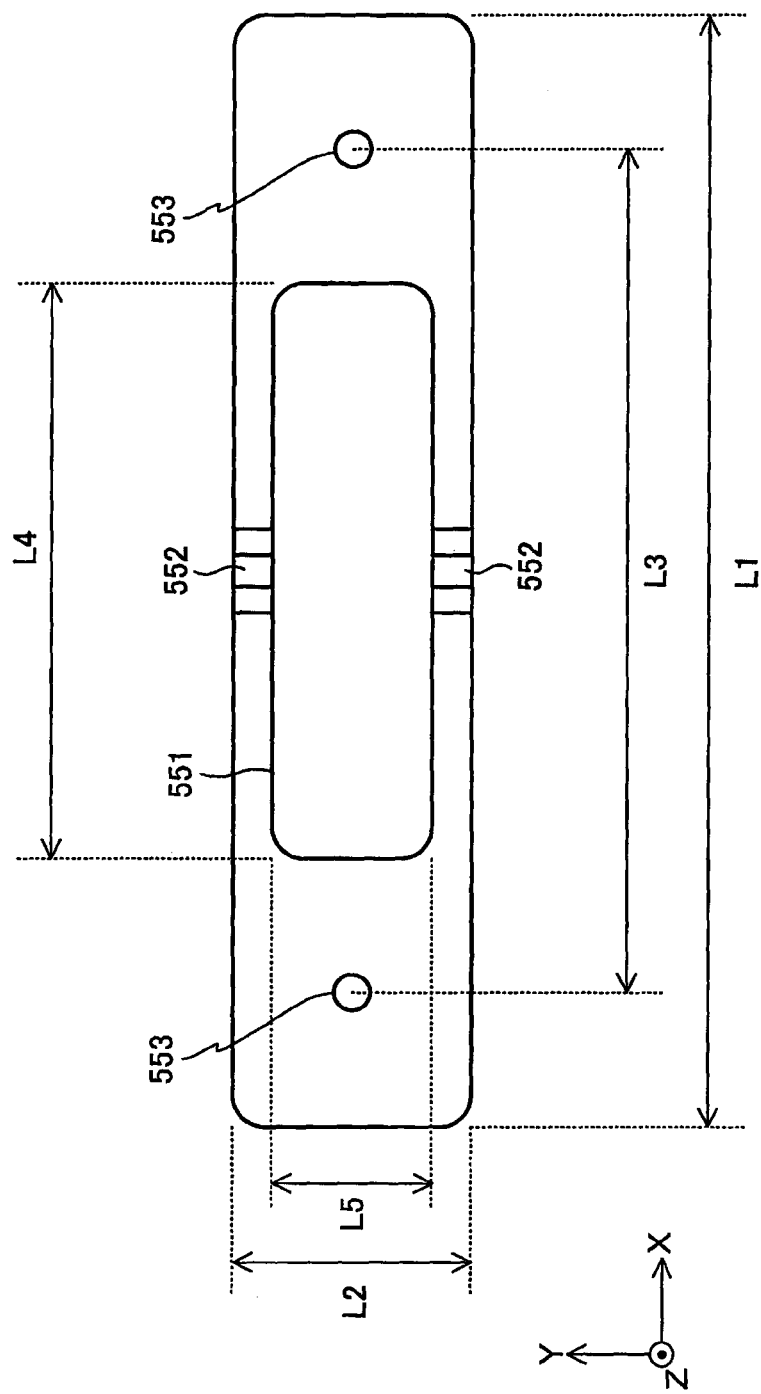

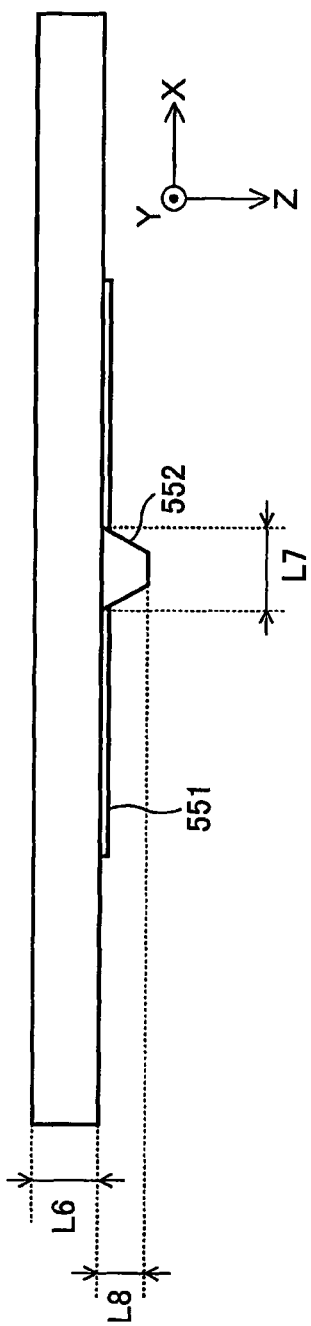
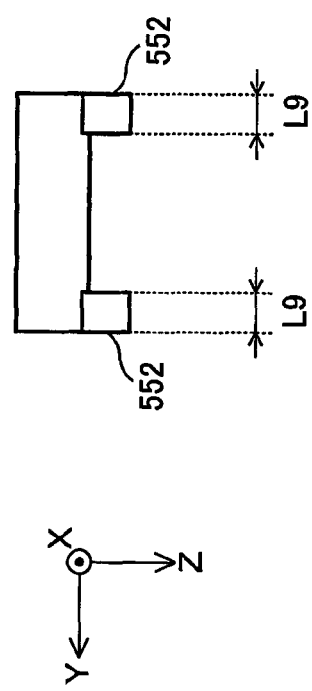

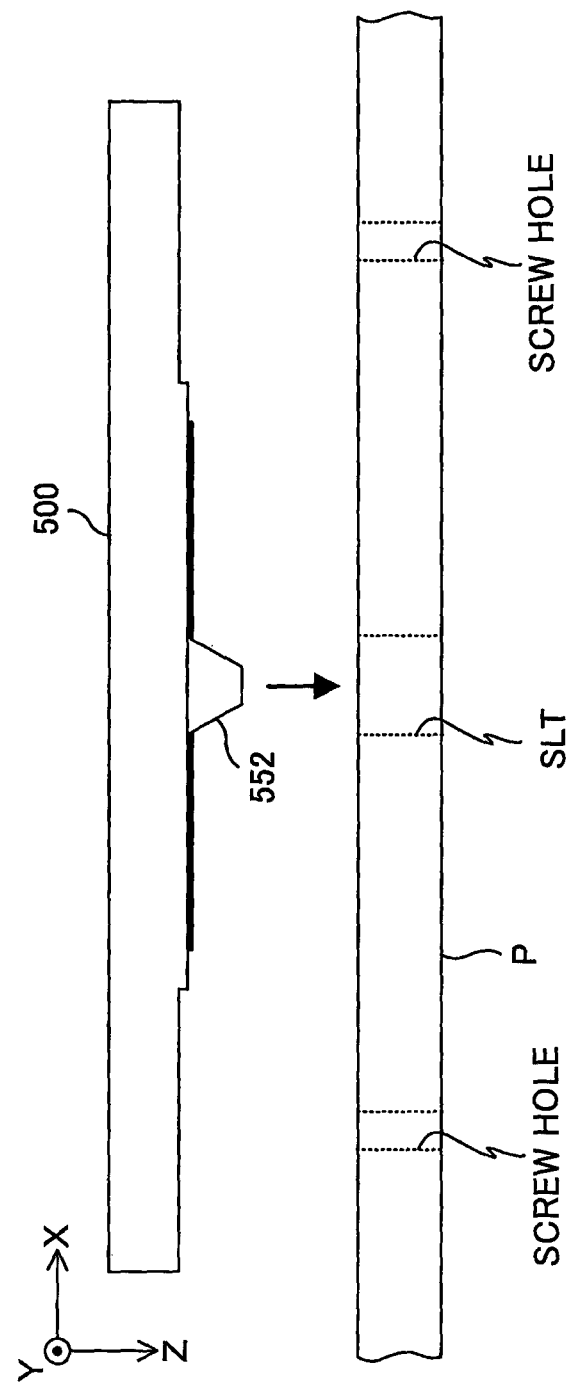

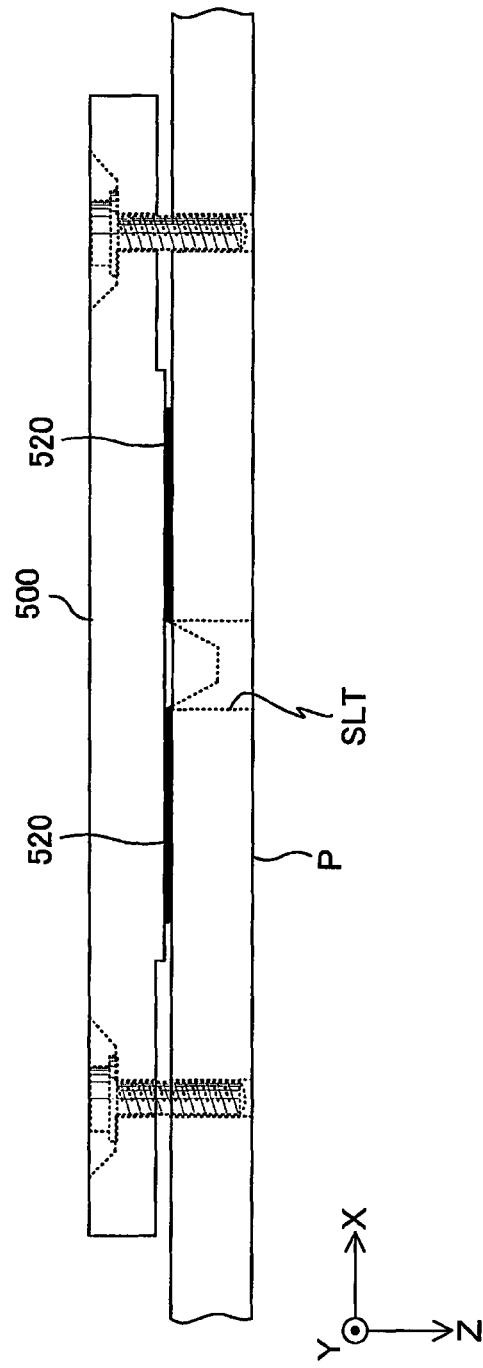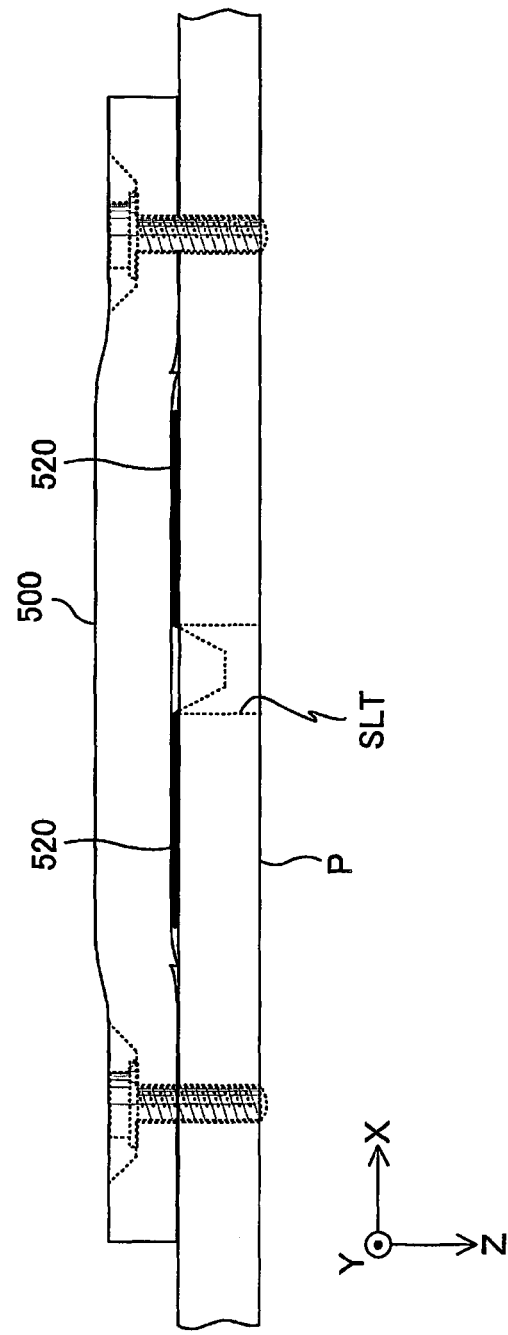

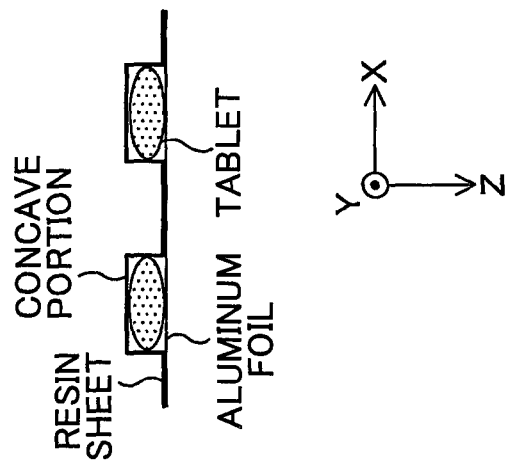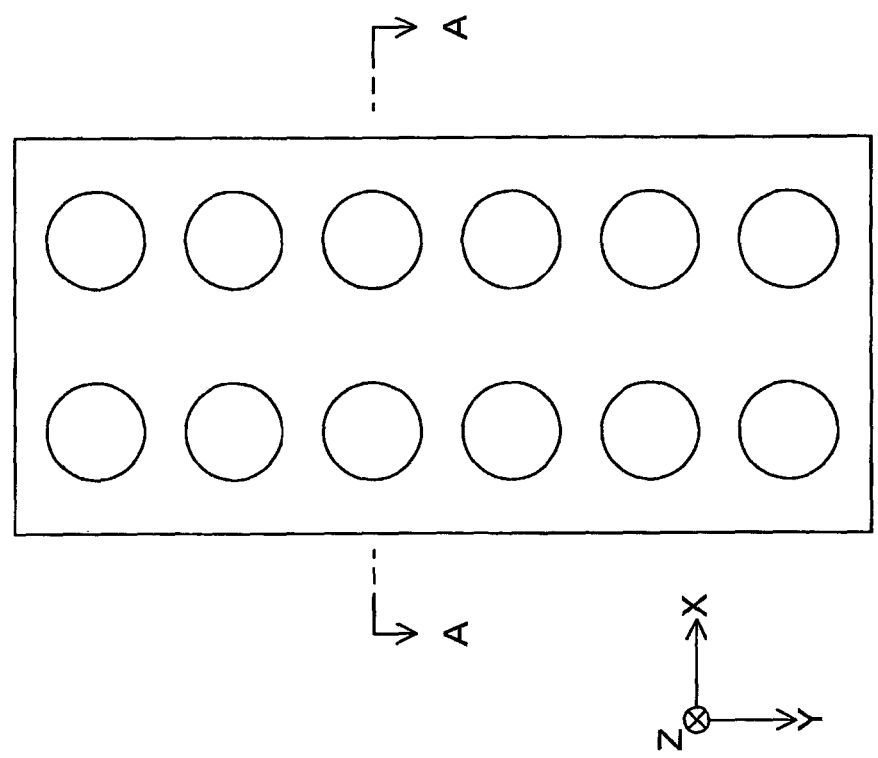

FIG.32
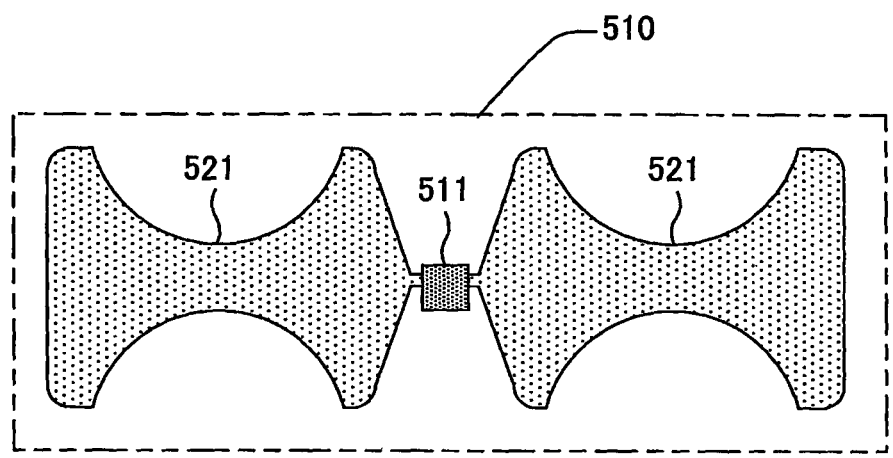
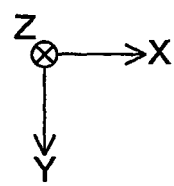

FIG.39
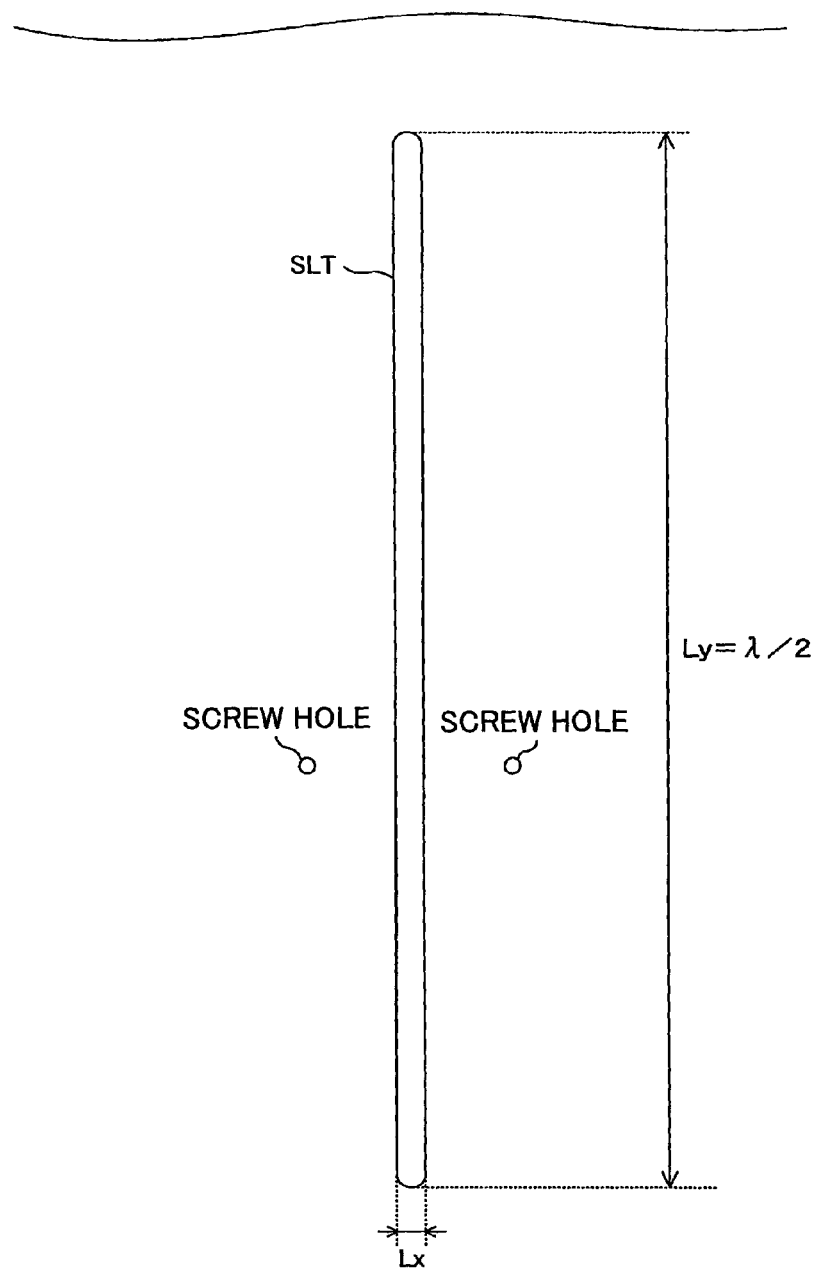
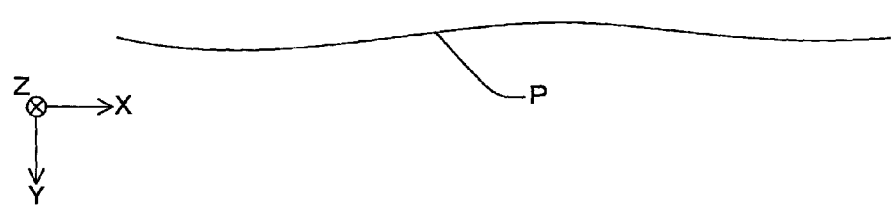

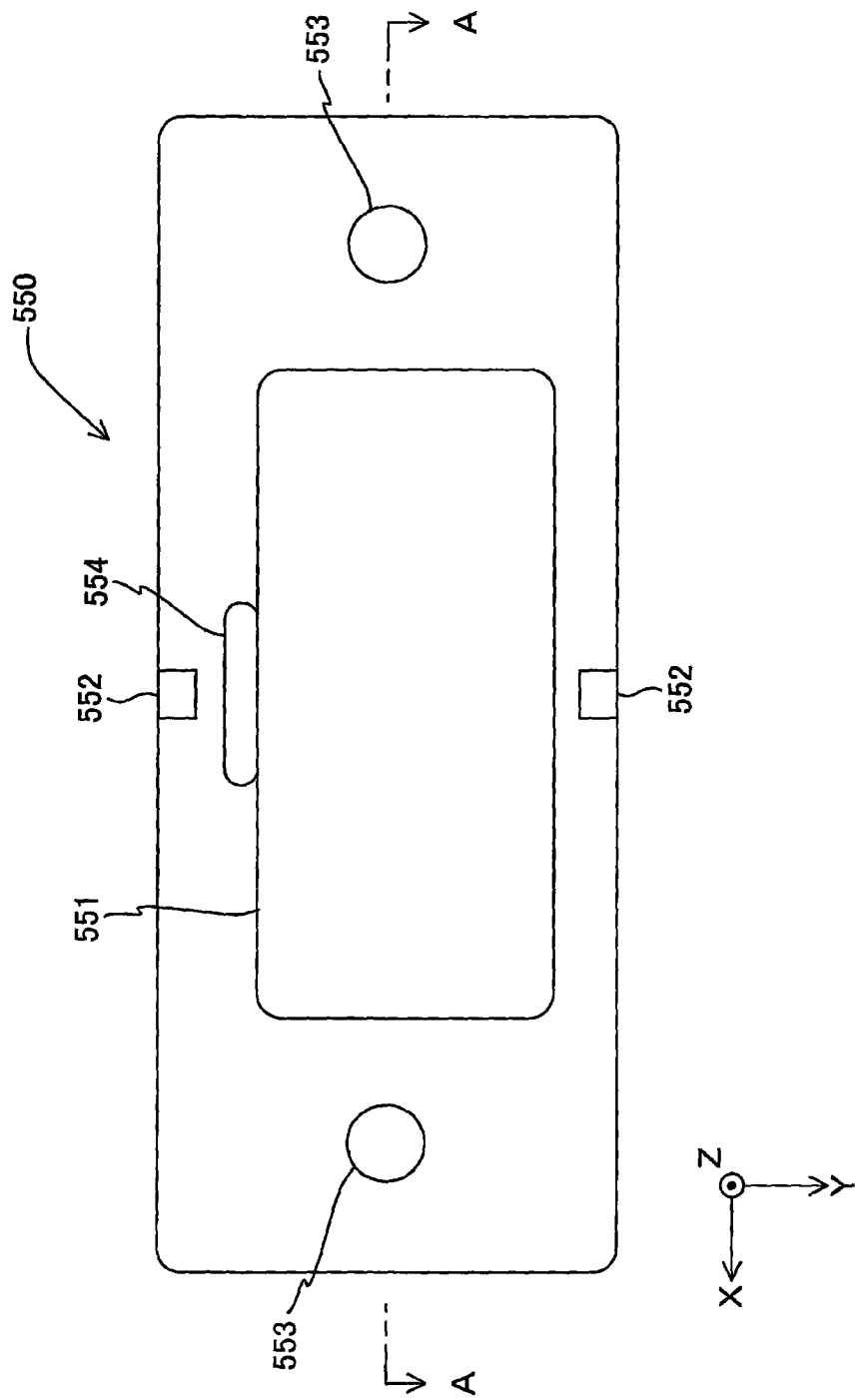

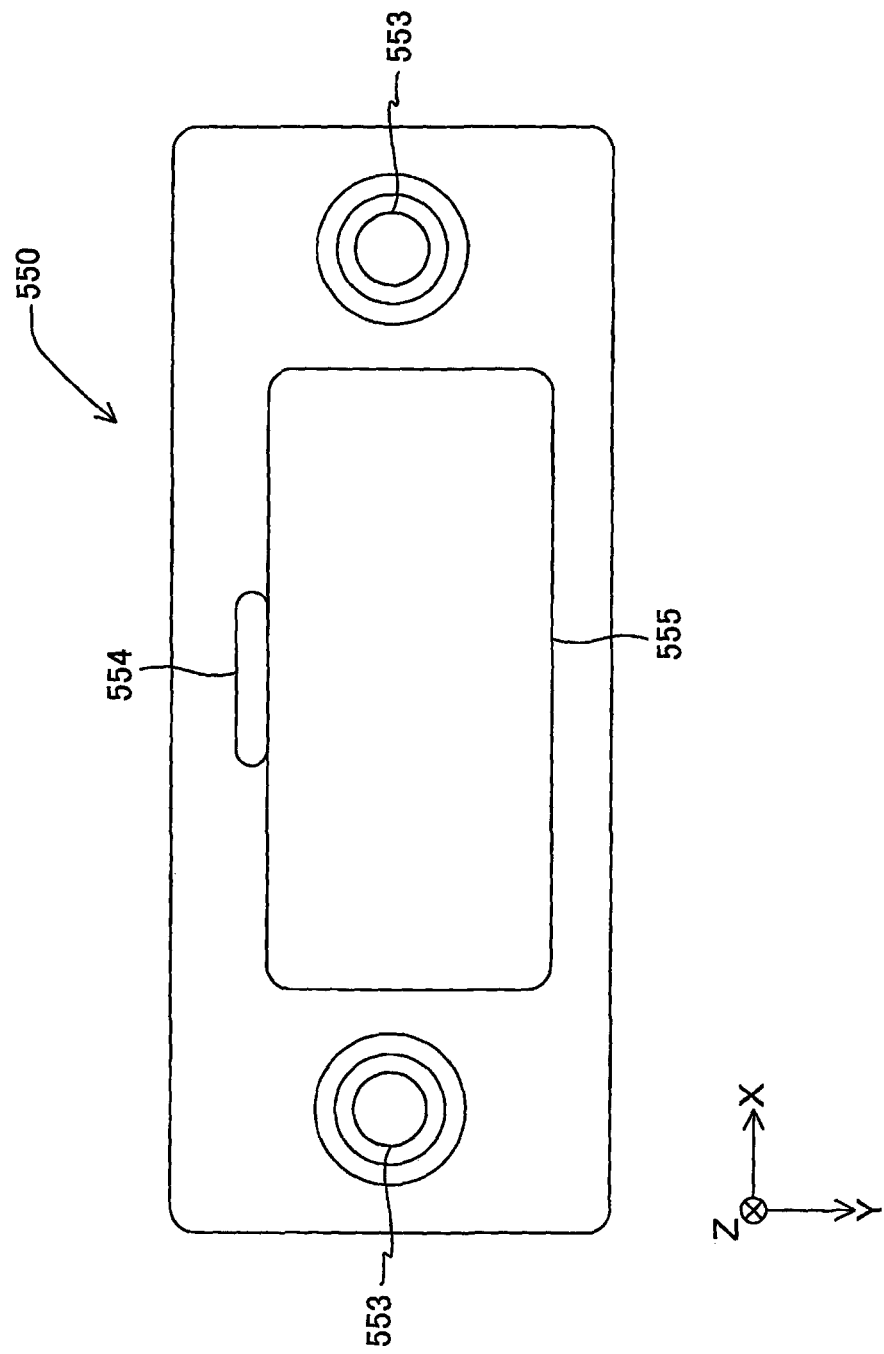

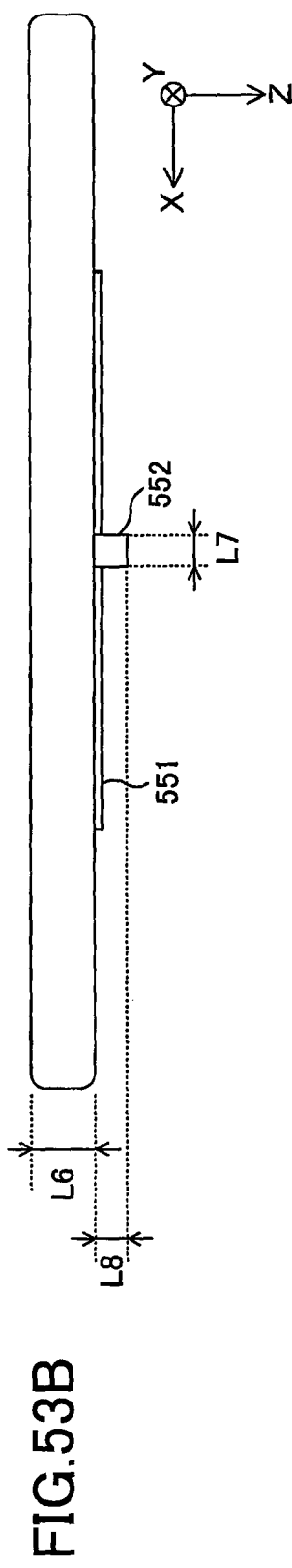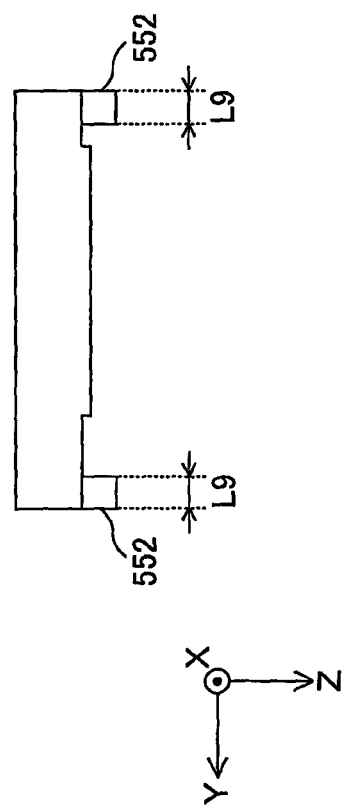

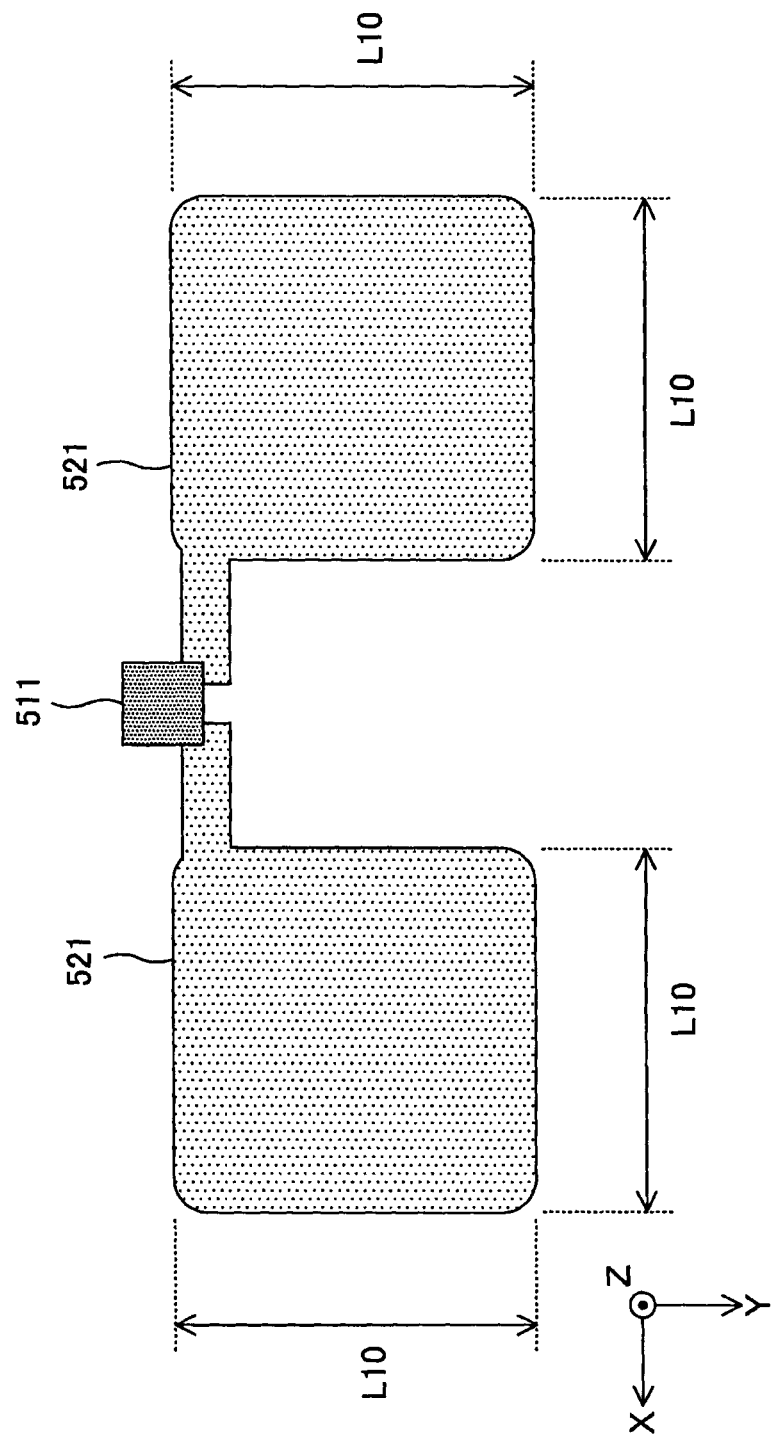

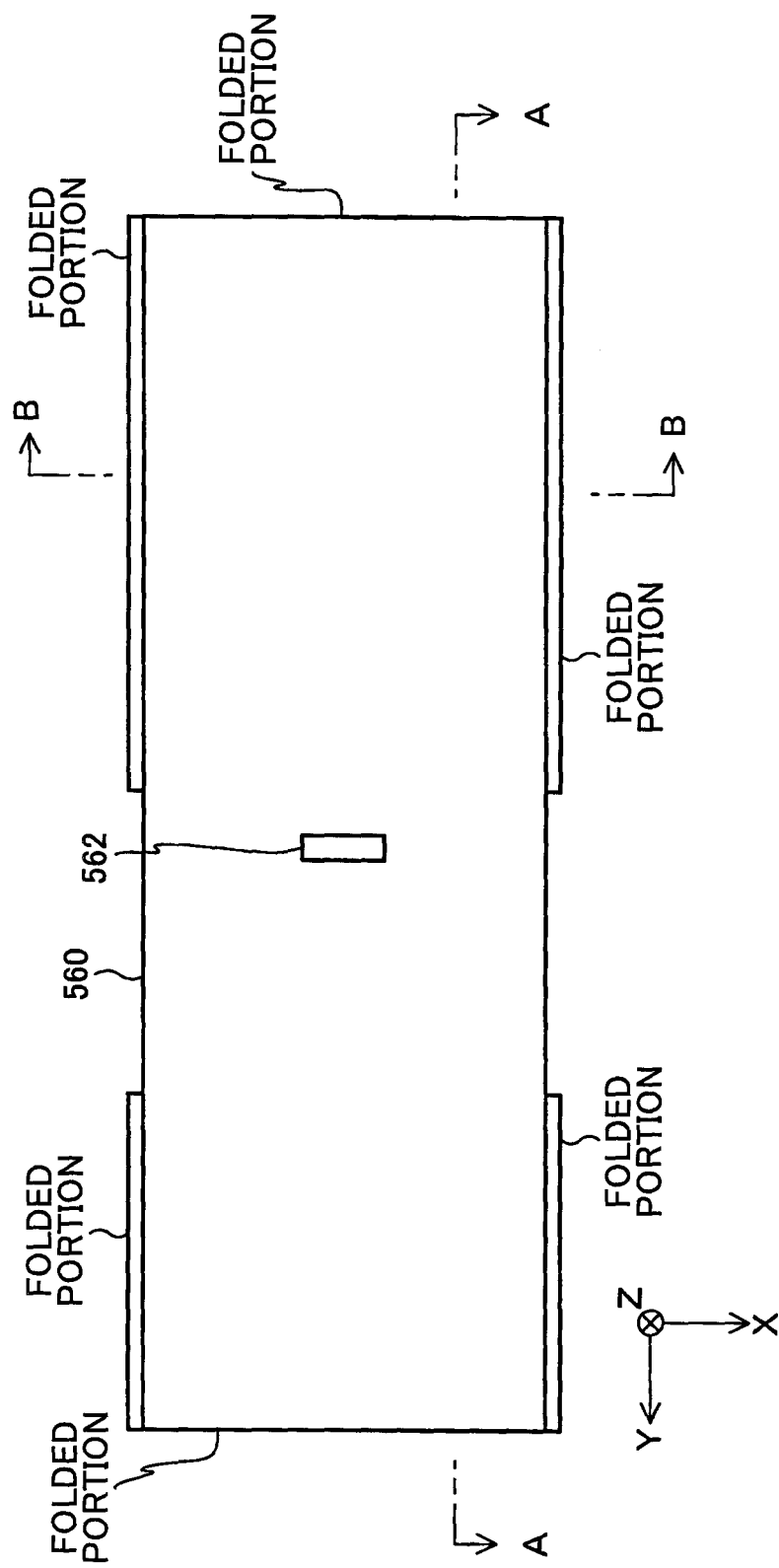

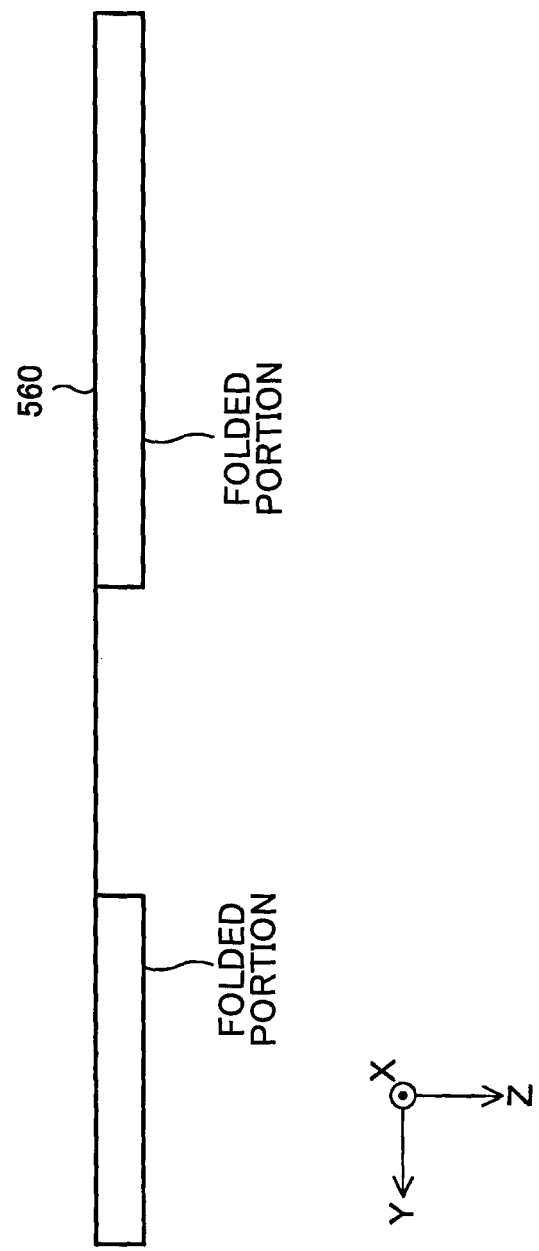

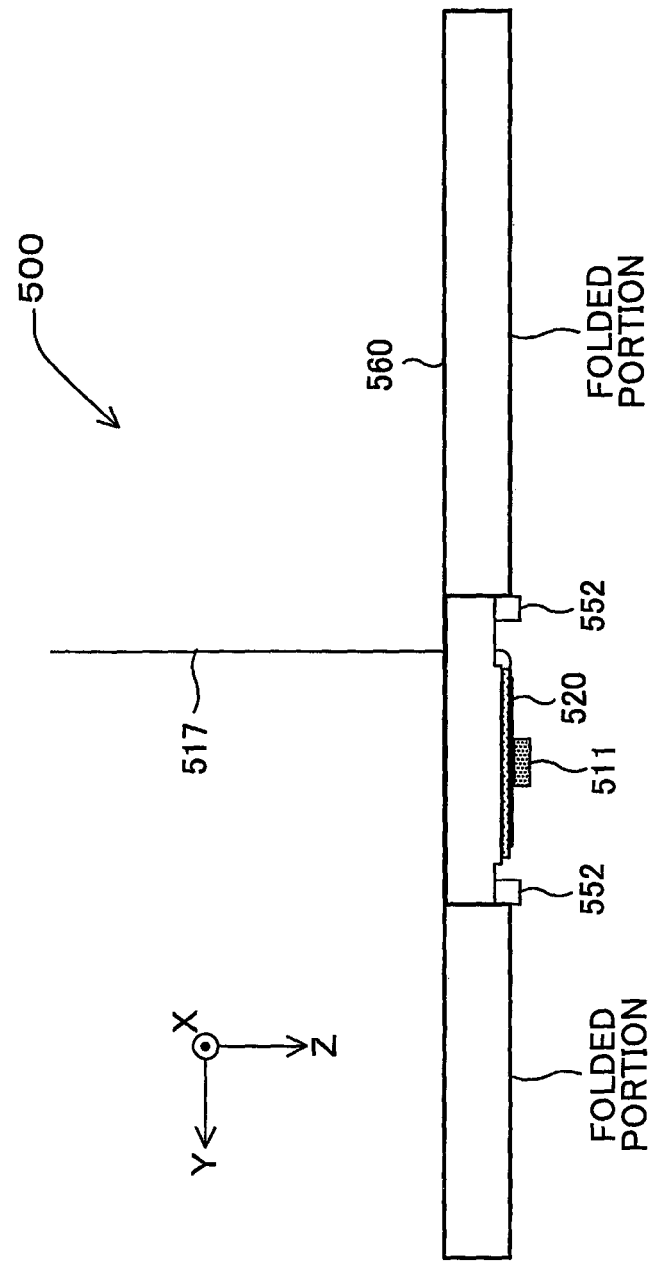

FIG.63
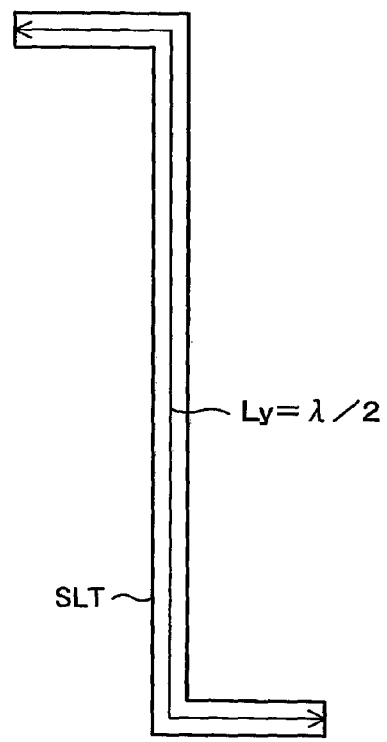
Ly = λ/2
SLT
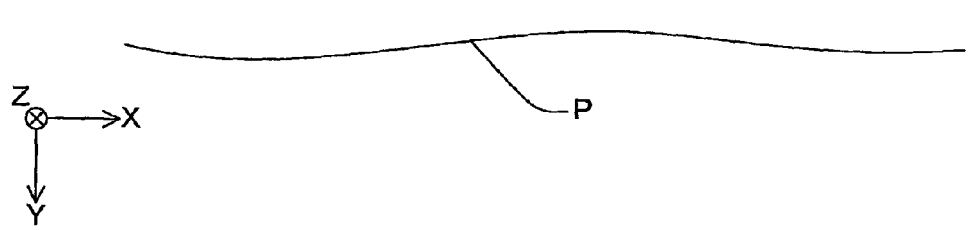

FIG.74
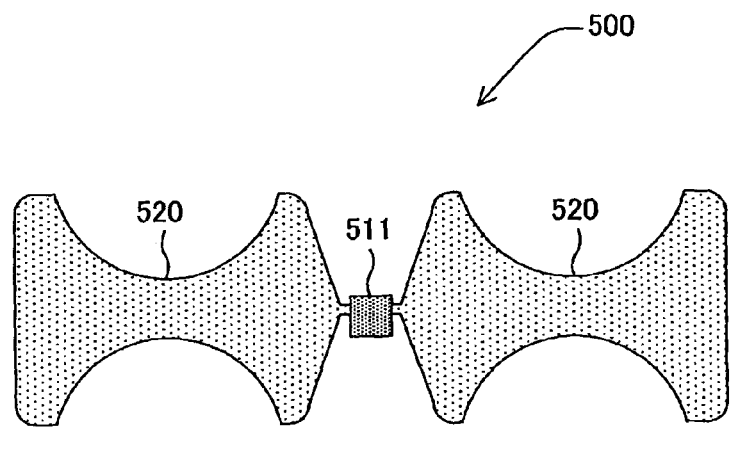
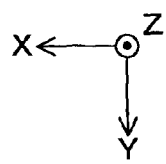
FIG.75
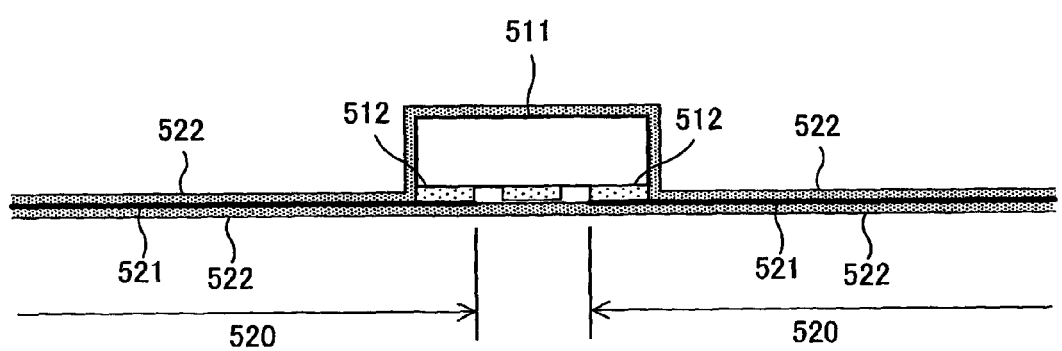
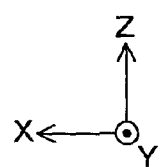

FIG.82
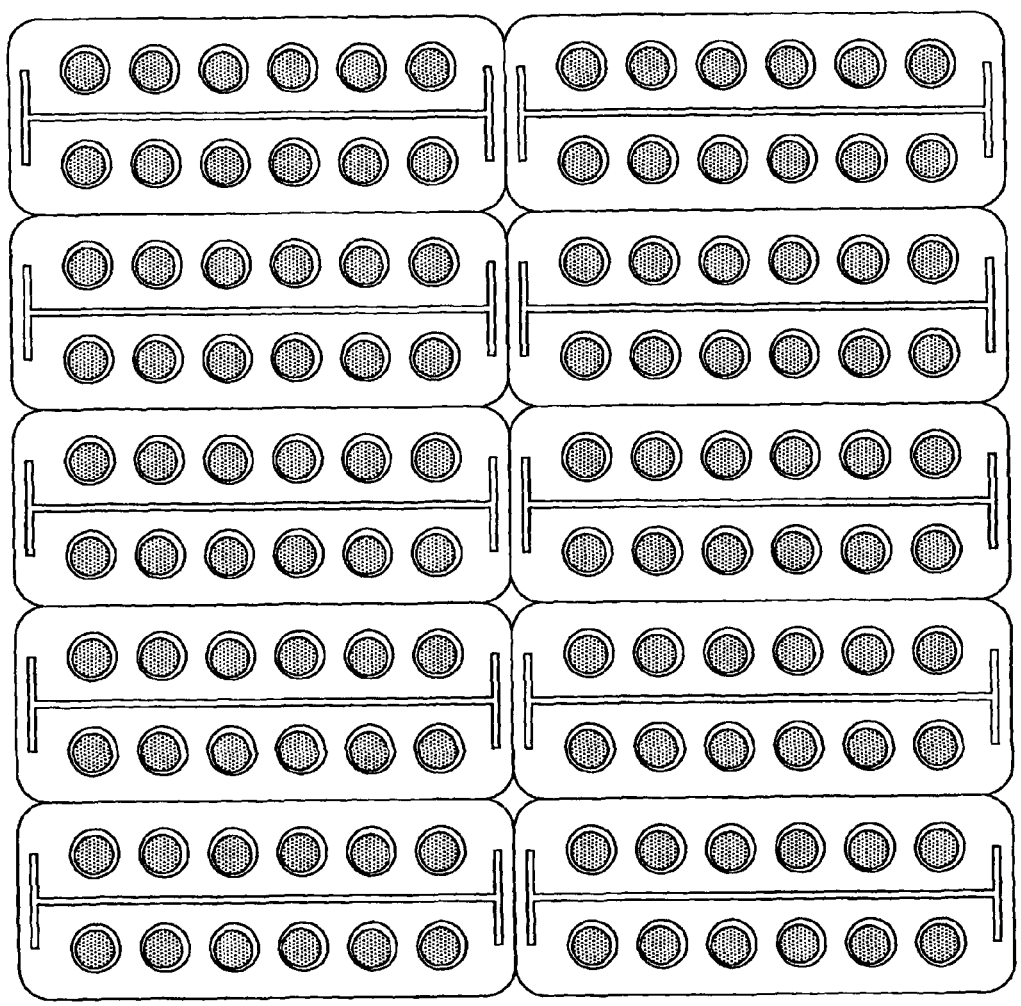
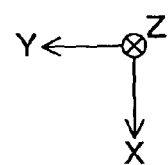

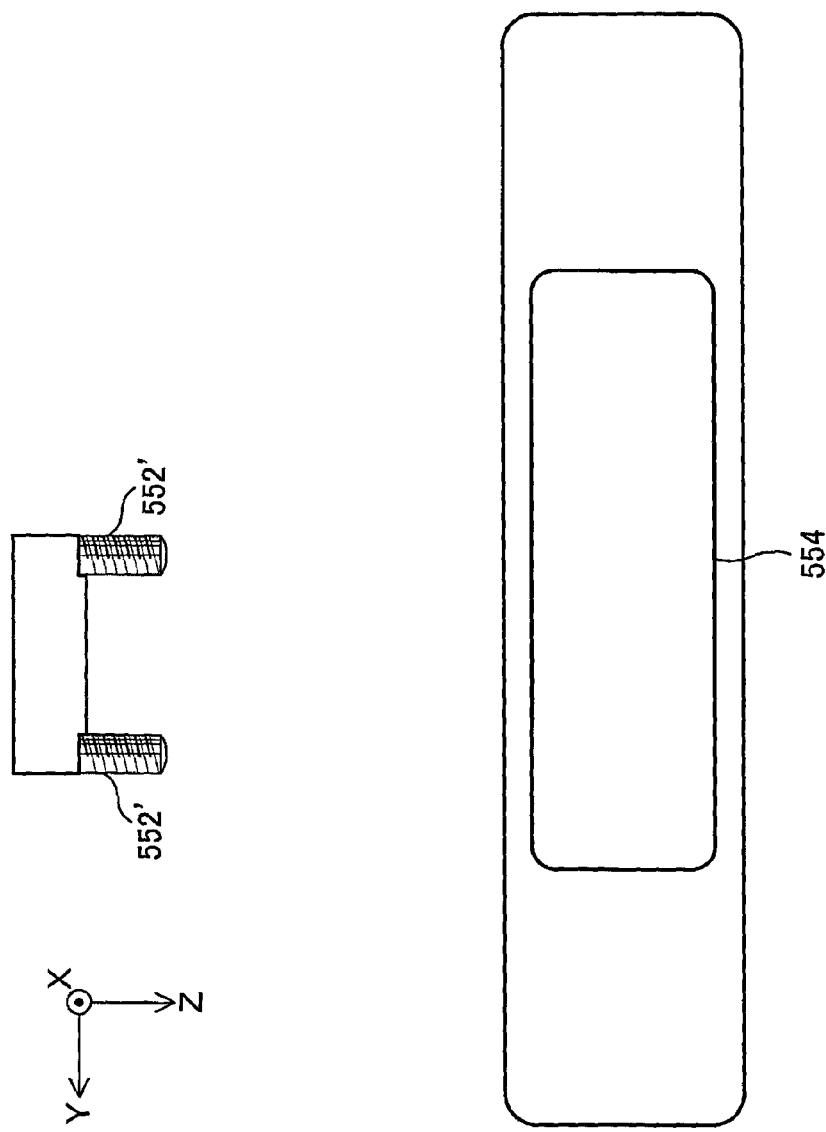

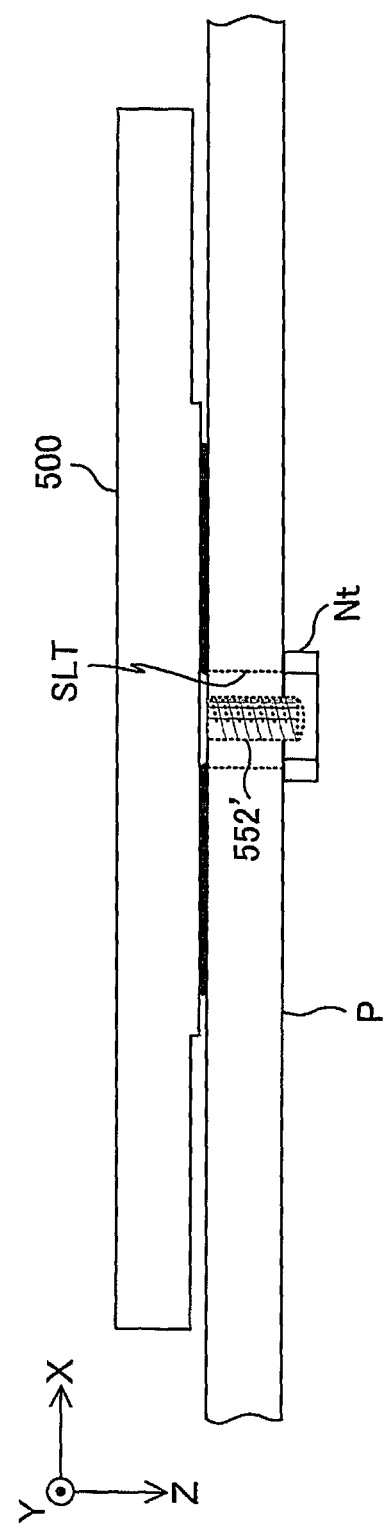

RFID TAG, RFID SYSTEM, AND PACKAGE INCLUDING RFID TAG

TECHNICAL FIELD

Embodiments of the present invention relate to an RFID tag, an RFID system, and a package including an RFID tag. Specifically, the embodiments of the present invention relate to the RFID tag that can be used for a metal product, the RFID system including the RFID tag, and the package including the RFID tag which is suitable for medicines.

BACKGROUND ART

A radio frequency identification (RFID) system has been known as a non-contact transmission system that wirelessly transmits information.

In general, the RFID system includes an RFID tag (also referred to as a "wireless tag") and a reader/writer (RW). The reader/writer reads out information from an RFID tag and writes information into an RFID tag through wireless communications.

The RFID tags are classified into active and passive tags. An active tag includes a battery, and the active tag operates by power from the battery. A passive tag receives power from a reader/writer, and the passive tag operates by the received power.

Since the active tag includes the battery, the active tag is advantageous with respect to the communication range and the stability of the communication, compared to the passive tag. On the other hand, the active tag has disadvantages such that, since the configuration of the active tag is complicated, the downsizing is difficult and the cost tends to be higher.

Incidentally, due to the improvements in semiconductor technology in recent years, IC chips have further been downsized and the performance of the IC chips has further been improved. Accordingly, the communication range and the communication stability of the passive tags are being improved. Thus, it is expected that the passive tags will be applied in wider fields. For example, Patent Document 4 (Japanese Registered Patent No. 4723447), Patent Document 5 (Japanese Patent Laid-Open Application No. 2009-31893), and Patent Document 6 (Japanese Patent Laid-Open Application No. 2011-187075) disclose that passive tags are used for packages.

Further, it is expected that the RFID tags will be used for medicines such as tablets and capsules. The medicines such as the tablets and the capsules are sealed in a press through package (PTP), which is a type of heat seal packaging. In the PTP, one side of the package is covered with a resin sheet, and the other side the package is covered with an aluminum sheet.

For example, Patent Document 7 (Japanese Registered Patent No. 4787572) discloses a wireless IC tag that may be implemented in a package, for which a thin film of a metal such as aluminum is used as a sealing material.

Incidentally, various frequency bands are utilized for the RFID systems.

In an RFID system where a passive tag is utilized as an RFID tag, when a frequency band is a low frequency band and/or a high frequency band, a voltage is induced in the RFID tag due to an electromagnetic induction action between a transmission antenna coil of the reader/writer and an antenna coil of the RFID tag. An IC chip is activated by this voltage, and the communication is enabled. Namely, the communication is performed based on an electromagnetic induction method.

Therefore, in this case, the RFID tag operates only within the induction field caused by the reader/writer, and the communication range is several tens of cm.

On the other hand, when the frequency band is a UHF band and/or a microwave band, power is supplied to an IC chip of an RFID tag by a radio wave. Namely, the communication is performed based on a radio communication method.

Therefore, in this case, the communication range is significantly improved. The communication range is from 1 m to 8 m, approximately.

When the communication is based on the radio communication method, it is possible to read plural RFID tags simultaneously and to read a moving RFID tag. It has been difficult to perform simultaneous reading of plural RFID tags and reading of a moving RFID tag with the electromagnetic induction method. Therefore, it is expected that the RFID tags will be used in wider fields.

Incidentally, it has been known that, when a normal RFID tag is attached to a surface of a metal object or when water exists in the vicinity of the RFID tag, it is difficult to perform communication with the RFID tag.

Therefore, various types of RFID tags that can be used with a metal object have been proposed (cf. Patent Document 1 (Japanese Patent Laid-Open Application No. 2002-157565) and Patent Document 2 (Japanese Patent Laid-Open Application No. 2005-309811), for example). The proposed RFID tags can be attached to the surface of the metal object.

Additionally, Patent Document 3 (Japanese Patent Laid-Open Application No. 2008-284967) discloses a vehicle number plate. The vehicle number plate includes an RFID tag including a passive-type RFID chip and antenna patterns, wherein the passive-type RFID chip is disposed on an insulating film and does not require a power source, and the antenna patterns are disposed to sandwich the RFID chip; and a protection film formed on an entire surface of a conductive flat plate, wherein the entire surface of the conductive flat plate includes the conductive flat plate in which a slit has been formed, a filled portion formed of a non-conductive material that has been filled to the slit, and a top surface of the filled portion, wherein the RFID tag is disposed on a rear side of the conductive flat plate so as to cross the slit, and the insulating film is disposed to face the rear side of the conductive flat plate, wherein length L of the slit is expressed by $L=\lambda/n$, where the $\lambda$ is a wavelength of a radio signal transmitted from the RFID chip and the n is an integer greater than or equal to 1, and wherein width of the slit is within a range from 7 mm to 9 mm when radio signals in a UHF band are transmitted and received, and the width of the slit is within a range from 2 mm to 3 mm when radio signals in a 2.45 GHz band are transmitted and received.

DISCLOSURE OF THE INVENTION

With the conventional RFID tag, it has been difficult to realize the downsizing and the cost reduction, without decreasing the communication range.

In one aspect of the present invention, there is provided a radio frequency identification tag configured to be attached to a metal member including a slit or a groove, the radio frequency identification tag including a first conductive member configured to be attached to a surface of the metal member at one side of the slit or the groove in a width direction of the slit or the groove through a first isolator;

a second conductive member configured to be attached to the surface of the metal member at the other side of the slit or the groove in the width direction of the slit or the groove through a second isolator;

and an IC chip configured to receive power through the first conductive member and the second conductive member, wherein, when a frequency of radio waves that is utilized for communication is denoted by f, the power induced between the one side and the other side of the slit or the groove by receiving the radio waves is denoted by Wa, voltage induced between the one side and the other side of the slit or the groove by receiving the radio waves is denoted by V, a first area of the first conductive member is denoted by S, a second area of the second conductive member is denoted by S, a first thickness of the first isolator is denoted by d, a second thickness of the second isolator is denoted by d, a first dielectric constant of the first isolator is denoted by $\in_r$, a second dielectric constant of the second isolator is denoted by $\in_r$, a dielectric constant of vacuum is denoted by $\in_0$, and a minimum value of the power required for the IC chip to operate is denoted by Wmin, an inequality Wmin≤Wa−4πf·S·$\in_0$·$\in_r$·V²/d is satisfied.

With the RFID tag according to the aspect of the present invention, the downsizing and the cost reduction can be realized, without decreasing the communication range.

Incidentally, when a slit similar to that of Patent Document 3 is formed in a metal chassis of a device, where electronic components are stored in the metal chassis, and the RFID tag disclosed in Patent Document 3 is attached to the slit, a failure may occur in some of the electronic components stored in the chassis, and another device disposed in the vicinity of the device may be interfered with.

In another aspect of the present invention, there is provided a radio frequency identification tag configured to be attached to a metal plate having a slit, and configured to be capable of performing radio communication, the radio frequency identification tag including:

a first conductive member configured to be attached to a surface of the metal plate at one side of the slit in a width direction of the slit through a first isolator;

a second conductive member configured to be attached to the surface of the metal plate at the other side of the slit in the width direction of the slit through a second isolator;

an IC chip configured to receive power through the first conductive member and the second conductive member; and a shield member configured to be attached to the surface of the metal plate, and configured to cover the slit.

The RFID tag according to the aspect of the present invention can be used with a metal object, and the RFID tag can be used for any device having a metal plate.

Incidentally, when the wireless IC tag disclosed in Patent Document 7 is adopted to the UHF band, the communication range may be reduced and the wireless IC tag may be enlarged.

In another aspect of the present invention, there is provided a tablet package including a radio frequency identification tag, the tablet package including:

a package member including a metal sheet and a resin sheet, wherein the package member is configured to hold tablets between the metal sheet and the resin sheet, and the metal sheet includes a slit;

a first conductive member configured to be attached to a surface of the metal sheet at one side of the slit in a width direction of the slit through an isolator; and a second conductive member configured to be attached to the surface of the metal sheet at the other side of the slit in the width direction of the slit through the isolator, wherein the radio frequency identification tag includes an IC chip configured to receive power through the first conductive member and the second conductive member.

The tablet package including the RFID tag according to the aspect of the present invention enables the radio communication in the UHF band, without decreasing the communication range and without enlarging the RFID tag.

BRIEF DESCRIPTION OF THE DRAWINGS

FIGS. 9A and 9B are diagrams illustrating the RFID tag;

FIG. 10 is a diagram (version 1) illustrating a chip module;

FIG. 11 is a diagram (version 2) illustrating the chip module;

FIGS. 13A-13D are diagrams (version 1) illustrating a holding member;

FIGS. 14A and 14B are diagrams (version 2) illustrating the holding member;

FIG. 15 is a diagram (version 3) illustrating the holding member;

FIGS. 16A-16C are diagrams illustrating dimensions of the holding member;

FIG. 20 is a diagram (version 1) illustrating an installation method of the RFID tag;

FIG. 24 is a diagram (version 5) illustrating the installation method of the RFID tag;

FIG. 25 is a diagram (version 6) illustrating the installation method of the RFID tag;

FIGS. 30A and 30B are diagrams illustrating a tablet package;

FIG. 32 is a diagram (version 1) illustrating the chip module attached to the tablet package;

FIG. 39 is a diagram illustrating a slit of the metal plate P;

FIGS. 49A and 49B are diagrams (version 1) illustrating a holding member according to the second embodiment;

FIGS. 50A and 50B are diagrams (version 2) illustrating the holding member;

FIGS. 53A-53C are diagrams illustrating dimensions of the holding member according to the second embodiment;

FIG. 54 is a diagram illustrating dimensions of thin metal films according to the second embodiment;

FIGS. 57A and 57B are diagrams illustrating a shield member;

FIGS. 59A and 59B are diagrams illustrating a state where the shield member is attached to the holding member;

FIG. 63 is a diagram illustrating a modified example of the slit of the metal plate P;

FIG. 74 is a diagram illustrating an RFID tag according to the third embodiment;

FIG. 75 is a diagram illustrating terminal members according to the third embodiment;

FIG. 82 is a diagram (version 2) illustrating the state where the metal sheets are attached to the resin sheets;

FIGS. 97A-97D are diagrams illustrating a modified example of the holding member; and FIG. 98 is a diagram illustrating a state where an RFID tag including the holding member according to the modified example is attached to the metal plate.

DESCRIPTION OF THE REFERENCE NUMERALS

Figure 1:
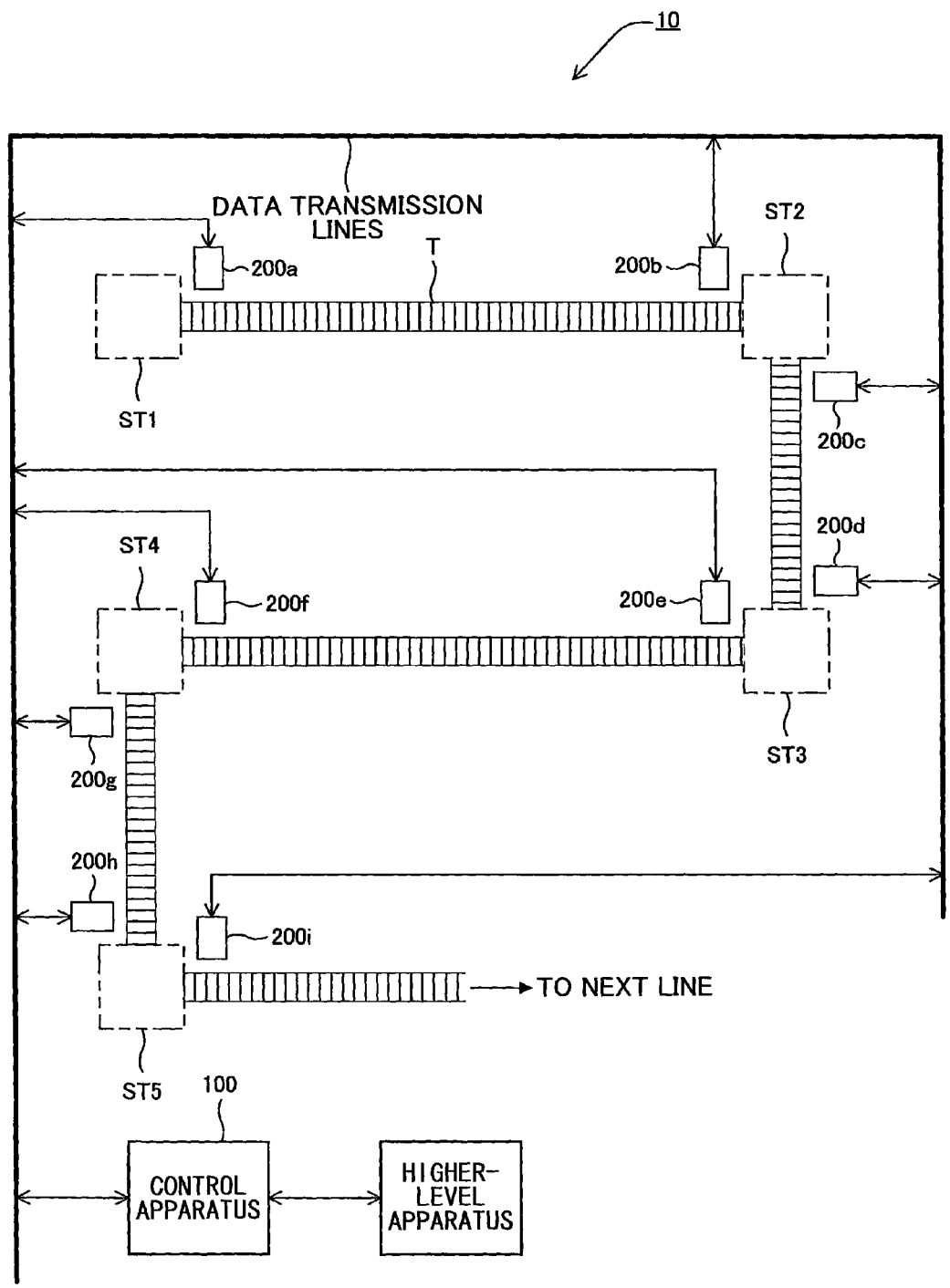
FIG. 1 is a diagram illustrating a schematic configuration of an RFID system according to a first embodiment.

10: RFID system
100: Control apparatus (management apparatus)
200a-200i: Reader/writers (communication devices)
500: RFID tag
510: Chip module
511: IC chip
512: Electrodes
520: Terminal members
521: Thin metal films (conductive members)
522: Resin films
550: Holding member
551: Planer portion
552: Protrusion
553: Through holes
554: Elongated holes (windows)
560: Dielectric sheet (shield member)
562: Opening
3010: Tablet sheet
3100: Tablet package (tablet package including RFID tag)
3110: Package member
3111: Resin sheet
3112: Metal sheet
3200: Tablet
P: Metal plate
SLT: Slit
ST1-ST5: Stations

BEST MODE FOR CARRYING OUT THE INVENTION

<First Embodiment>

Hereinafter, a first embodiment of the present invention will be explained by referring to FIGS. 1-26. FIG. 1 shows a schematic configuration of an RFID system 10 according to the first embodiment.

The RFID system 10 is an RFID system where a passive tag is utilized, and the RFID system 10 is for a UHF band (860 MHz-960 MHz).

The RFID system 10 is an RFID system where a passive tag is utilized, and the RFID system 10 is for a UHF band (860 MHz-960 MHz). The RFID system 10 is adopted to an assembly line for manufacturing a product M. The assembly line includes a conveyance system T, and five stations (ST1-ST5) where corresponding first to fifth assembling steps are performed.

Hereinafter, for convenience, a product that has been assembled at the station ST1 is referred to as "an assembly M1," a product that has been assembled at the station ST2 is referred to as "an assembly M2," a product that has been assembled at the station ST3 is referred to as "an assembly M3," a product that has been assembled at the station ST4 is referred to as "an assembly M4," and a product that has been assembled at the station ST5 is referred to as "an assembly M5."

The RFID system 10 includes a control apparatus 100; nine reader/writers 200a-200i; plural RFID tags (referred to as the RFID tag 500); and data transmission lines.

Structures of the plural RFID tags are the same, but each of the RFID tags stores a unique identification (ID) number. Since it is not necessary to distinguish the plural RFID tags here, the RFID tags are collectively referred to as the RFID tag 500. Details of the RFID tag 500 will be described later.

Figure 2:
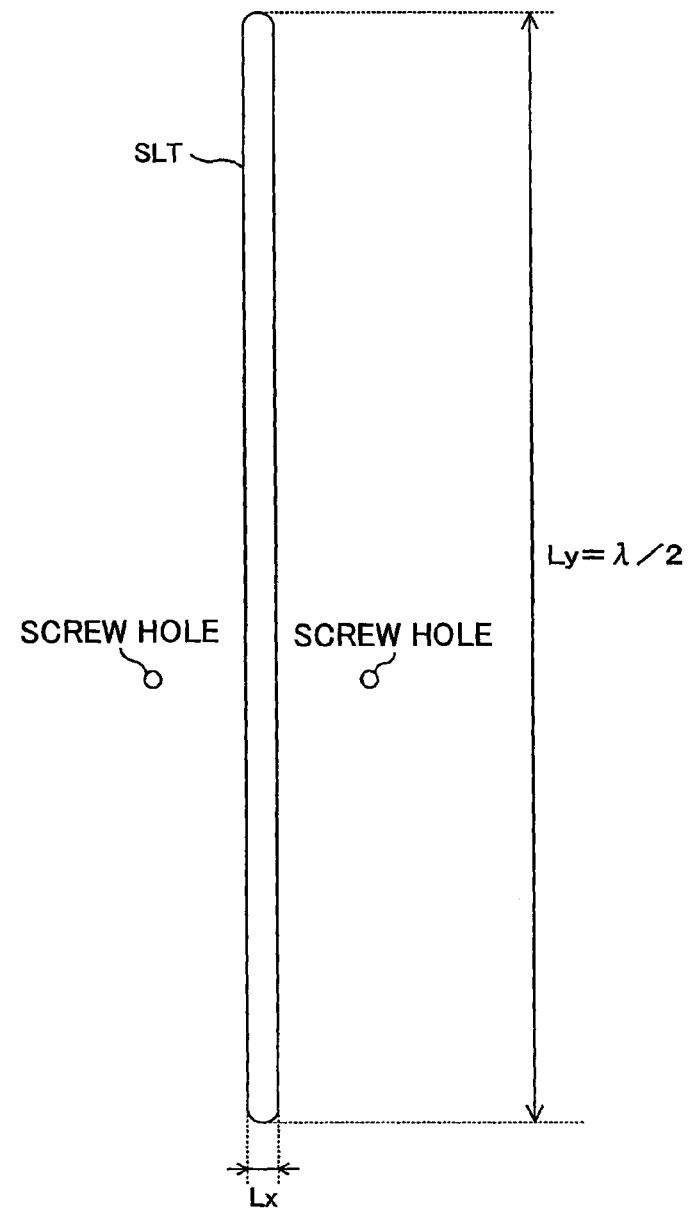
FIG. 2 is a diagram illustrating a slit of a metal plate.

At the station ST1, the RFID tag 500 is attached to a metal plate P of the assembly M1. For example, as shown in FIG. 2, the metal plate P includes a slit SLT having a length of Ly and a width of Lx; and two screw holes for attaching the RFID tag 500. The slit SLT and the two screw holes have been formed in advance.

When the length (the length in the longitudinal direction) Ly of the slit SLT is equal to a half of a wavelength $\lambda$ of a radio wave that is utilized in the RFID system, a voltage that is induced between both ends of the slit SLT in an X-axis direction is maximized. The voltage is induced by receiving the radio wave. For example, when the frequency of the radio wave is 950 MHz, the length Ly is 160 mm.

The width (the length in the short direction) Lx of the slit SLT relates to a frequency band width, within which the slit SLT can obtain a desired gain (a good antenna performance) as an antenna. Namely, as the width Lx becomes smaller, the frequency band width becomes smaller. Conversely, as the width Lx becomes greater, the frequency band width becomes greater. However, as the width Lx becomes greater, impedance becomes greater. Accordingly, the efficiency of the antenna is lowered.

In general, the slit SLT is formed by a punching process using metal molds. The slit SLT is shaped by a secondary process depending on necessity. In this case, when the width Lx is too small, it is difficult to form the slit SLT having the desired width with a predetermined accuracy. Therefore, the slit SLT may be formed by laser processing. However, in this case, the cost may become higher. Furthermore, when the width Lx is too small, a foreign material such as a metal piece may be caught in the slit SLT, and it is possible that the antenna performance is degraded. Therefore, when the frequency of the radio wave is 950 MHz, the width Lx is set to be within a range from 2 mm to 3 mm. In the first embodiment, when the frequency of the radio wave is 950 MHz, the slit having the length Ly of 160 mm and the width Lx of 2 mm is formed.

Hereinafter, the first embodiment is explained while setting the longitudinal direction of the slit SLT to be a Y-axis direction and the short direction of the slit SLT to be the X-axis direction in the XYZ three-dimensional orthogonal coordinate system. Therefore, the direction perpendicular to the surface of the metal plate P becomes a Z-axis direction.

As for the two screw holes, one of the screw holes is formed at the -X side of the slit SLT, and the other one of the screw holes is formed at the +X side of the slit SLT. With respect to the Y-axis direction, the two screw holes are formed at the same positions.

The metal plate P may be a chassis of the product M, or the metal plate P may be a metal plate that is used inside the product M.

Figure 3:
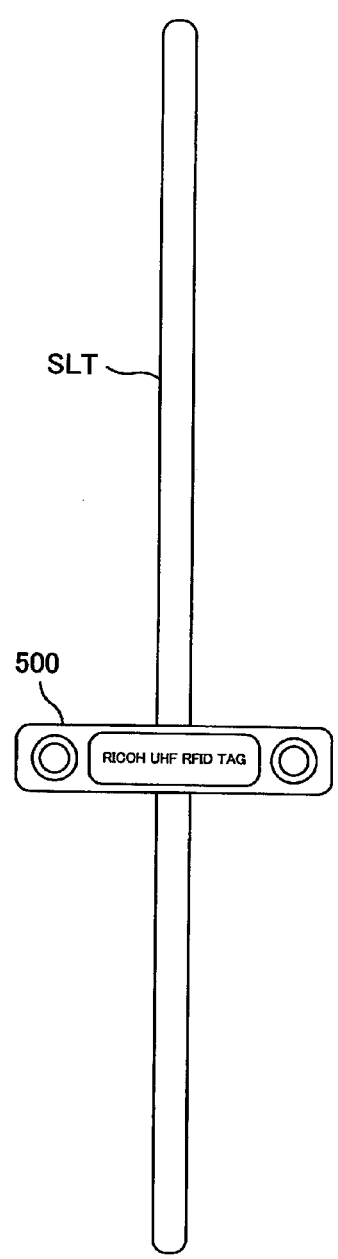
FIG. 3 is a diagram illustrating an RFID tag attached to the metal plate.

FIG. 3 shows a state where the RFID tag 500 is attached to the metal plate P. The position in the Y-axis direction of the RFID tag 500 is a position where impedance matching is achieved. The position is shifted from the center of the slit SLT.

In FIG. 1, the reader/writer 200a is disposed in the vicinity of an exit of the station ST1. The reader/writer 200b is disposed in the vicinity of an entrance of the station ST2, and the reader/writer 200c is disposed in the vicinity of an exit of the station ST2.

The reader/writer 200d is disposed in the vicinity of an entrance of the station ST3, and the reader/writer 200e is disposed in the vicinity of an exit of the station ST3.

The reader/writer 200f is disposed in the vicinity of an entrance of the station ST4, and the reader/writer 200g is disposed in the vicinity of an exit of the station ST4.

The reader/writer 200h is disposed in the vicinity of an entrance of the station ST5, and the reader/writer 200i is disposed in the vicinity of an exit of the station ST5.

The reader/writers 200a-200i have corresponding unique device numbers. Hereinafter, the unique device number of each of the reader/writers 200a-200i is referred to as the device's own number.

When each of the reader/writers 200a-200i reads out an ID number from the RFID tag 500, the reader/writer reports the ID number together with the date and time of the reading and the device's own number as the detected information to the control apparatus 100 through the data transmission lines. Hereinafter, the date and time of the reading is referred to as the detection time.

Each of the reader/writers 200a-200i writes the detection time and the device's own number into the RFID tag 500 as the history information.

Namely, each of the reader/writers 200a-200i functions as a reading device for reading information stored in the RFID tag 500 and functions as a writing device for writing information into the RFID tag 500. The space where each of the reader/writers 200a-200i can communicate with the RFID tag 500 is also referred to as the "effective communication area."

The control apparatus 100 includes a CPU, a ROM, a RAM, a hard disk drive, an input device, and a display.

The hard disk drive includes a hard disk that stores information, and a disk drive that reads the information stored in the hard disk and that writes information into the hard disk in accordance with instructions from the CPU.

The input device includes at least one input medium, such as a keyboard, a mouse, a tablet, alight pen, and a touch panel. The input device reports various types of information input by an operator through the input medium to the CPU. The information from the input medium may be wirelessly input to the input device.

The display includes a display unit that utilizes, for example, a CRT, a liquid crystal display (LCD) and/or a plasma display panel (PDP). The display indicates various types of information instructed by the CPU. An LCD with a touch panel is an example of a device where the display and the input device are integrated.

The ROM is a memory that stores plural pieces of data and the like. The plural pieces of data and the like are used for plural programs and for executing the programs. The programs are described in code that can be interpreted by the CPU. The RAM is a memory for processing data.

The control apparatus 100 has a configuration such that, when a notification is received from corresponding one of the reader/writers 200a-200i, an interrupt is caused.

A personal computer may be utilized as the control apparatus 100.

The control apparatus 100 is connected to a higher-level apparatus (e.g., a host computer). In response to a request from the higher-level apparatus, the control apparatus 100 transmits various types of information to the higher-level apparatus.

Hereinafter, there will be explained operation of the RFID system 10. Each of the reader/writers 200a-200i transmits a command signal at every predetermined timing. When one of the reader/writers 200a-200i receives a response to the command signal from the RFID tag 500, the operating mode of the one of the reader/writers 200a-200i switches to a communication mode for communicating with the RFID tag 500.

First, a primary assembly process is performed at the station ST1. Subsequent to the completion of the assembly process at the station ST1, the assembly M1 is conveyed toward the station ST2 by the conveyance system T.

Figure 4:
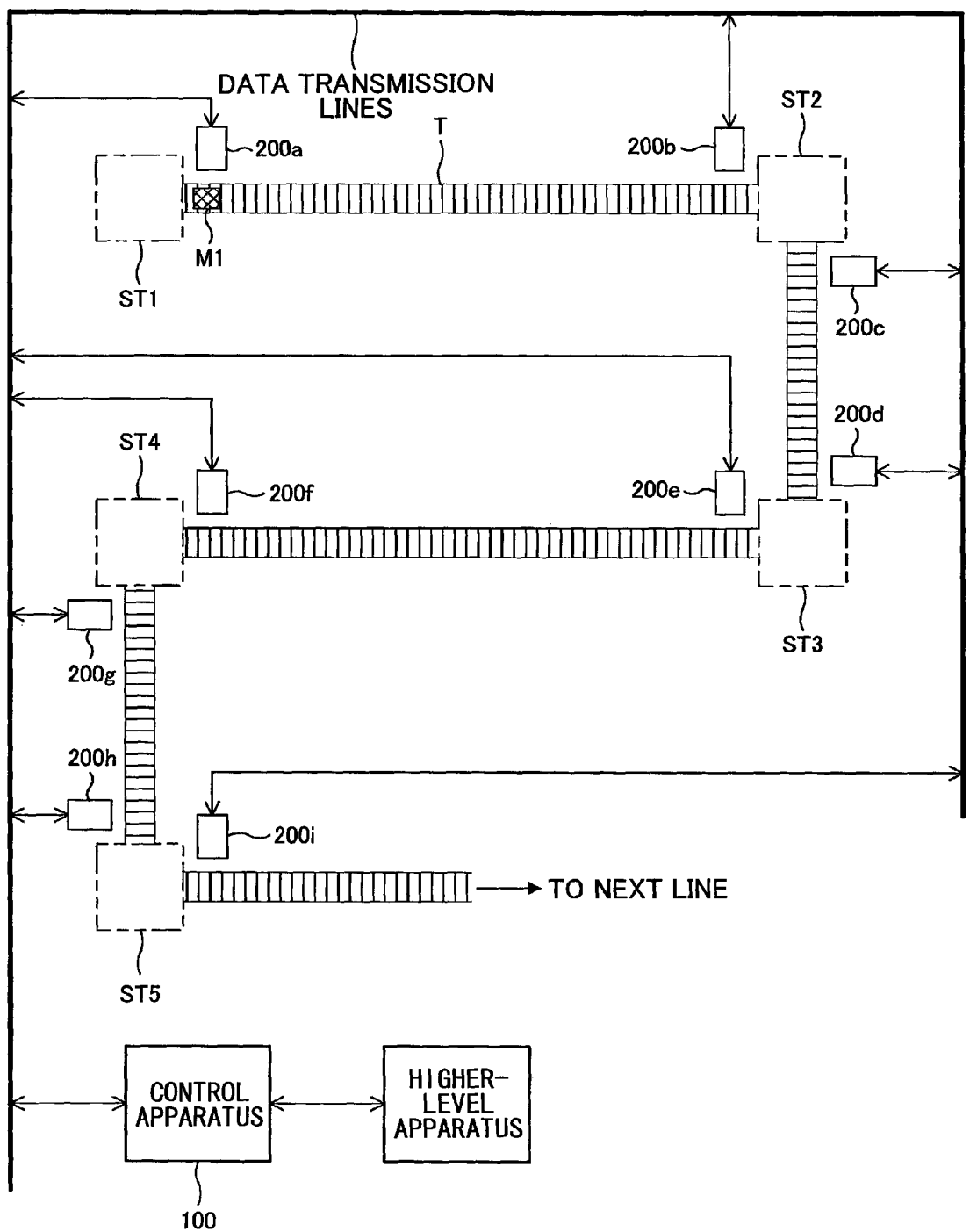
FIG. 4 is a diagram (version 1) illustrating an operation of the RFID system.
Figure 5:
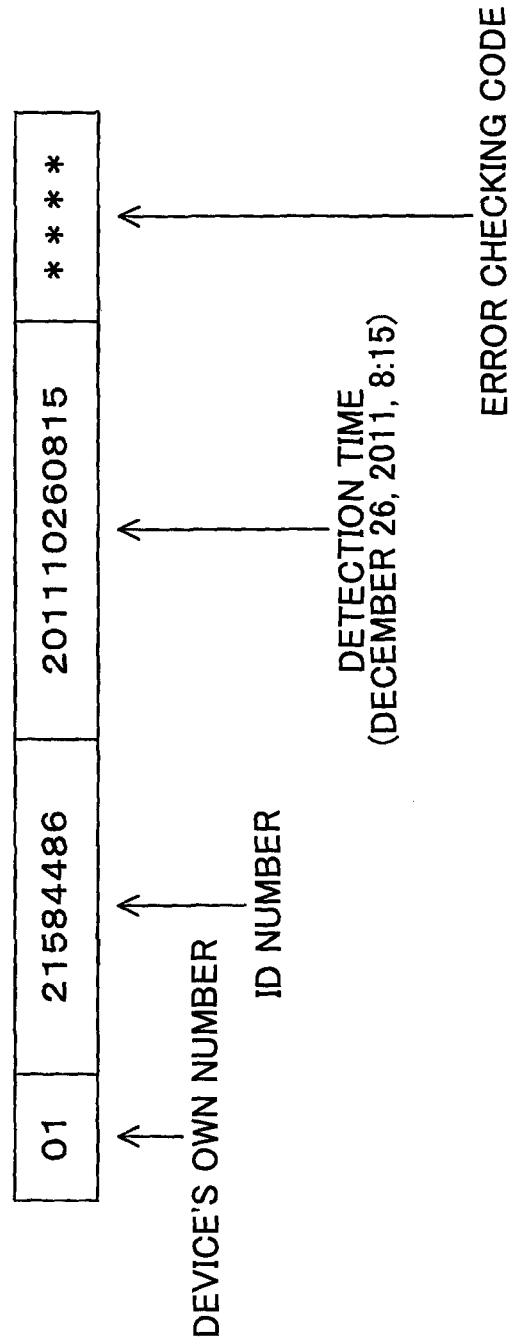
FIG. 5 is a diagram illustrating an example of detected information.

As shown in FIG. 4, when the RFID tag 500 of the assembly M1 enters an effective communication area of the reader/writer 200a, the RFID tag 500 transmits a signal including the ID number of the RFID tag 500.

When the reader/writer 200a receives the signal from the RFID tag 500, the reader/writer 200a extracts the ID number included in the signal, and transmits the detected information (cf. FIG. 5) to the control apparatus 100. At the same time, the reader/writer 200a writes the history information into the RFID tag 500.

Figure 6:
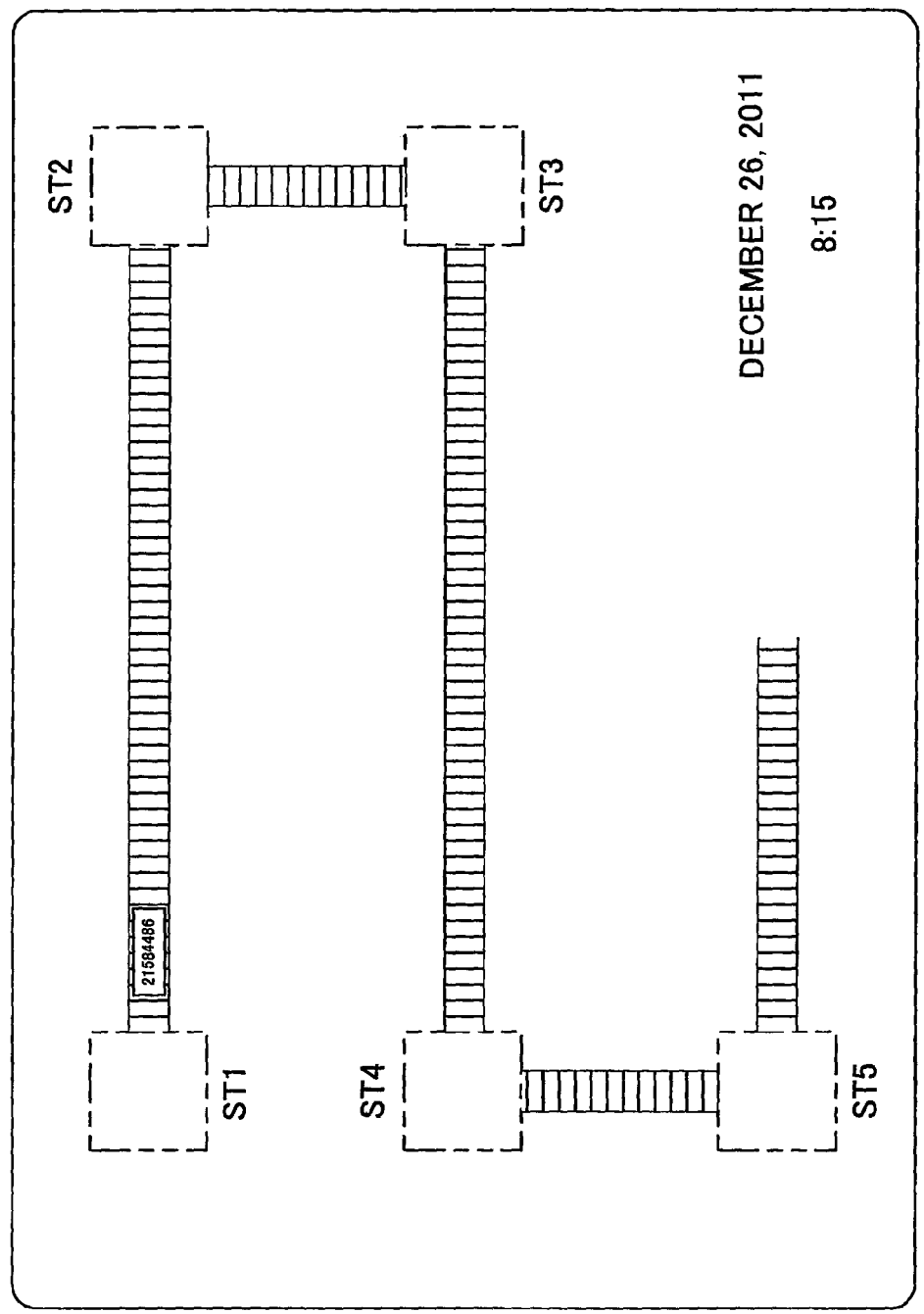
FIG. 6 is a diagram (version 2) illustrating the operation of the RFID system.

The control apparatus 100 records the received information into the hard disk, and indicates the situation on the display unit of the display (cf. FIG. 6). With this, it can be found that the primary assembly process has been completed for the product M having the ID number of "21584486."

Here, the primary assembly process for a next product M is continued at the station ST1. However, for the simplicity of the explanation, the explanation will be continued while assuming that the primary assembly process for the next product M is not performed at the station ST1.

When the RFID tag 500 of the assembly M1 enters an effective communication area of the reader/writer 200b, the RFID tag 500 transmits a signal including the ID number.

When the reader/writer 200b receives the signal from the RFID tag 500, the reader/writer 200b extracts the ID number included in the signal, and transmits the detected information to the control apparatus 100. At the same time, the reader/writer 200b writes the history information into the RFID tag 500. Here, the time included in the detection time indicates the start time of an assembly process at the station ST2.

Figure 7:
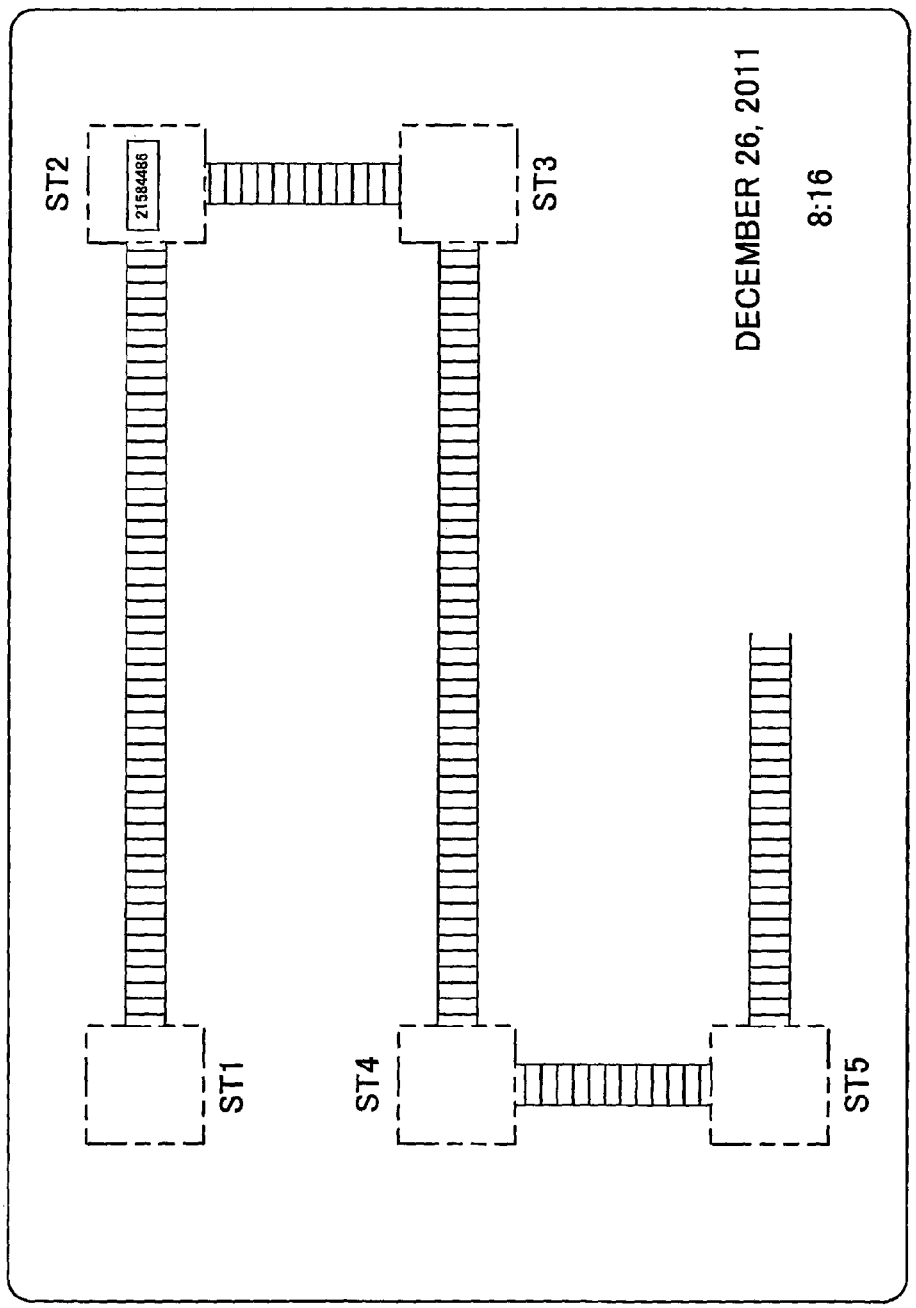
FIG. 7 is a diagram (version 3) illustrating the operation of the RFID system.
Figure 8:
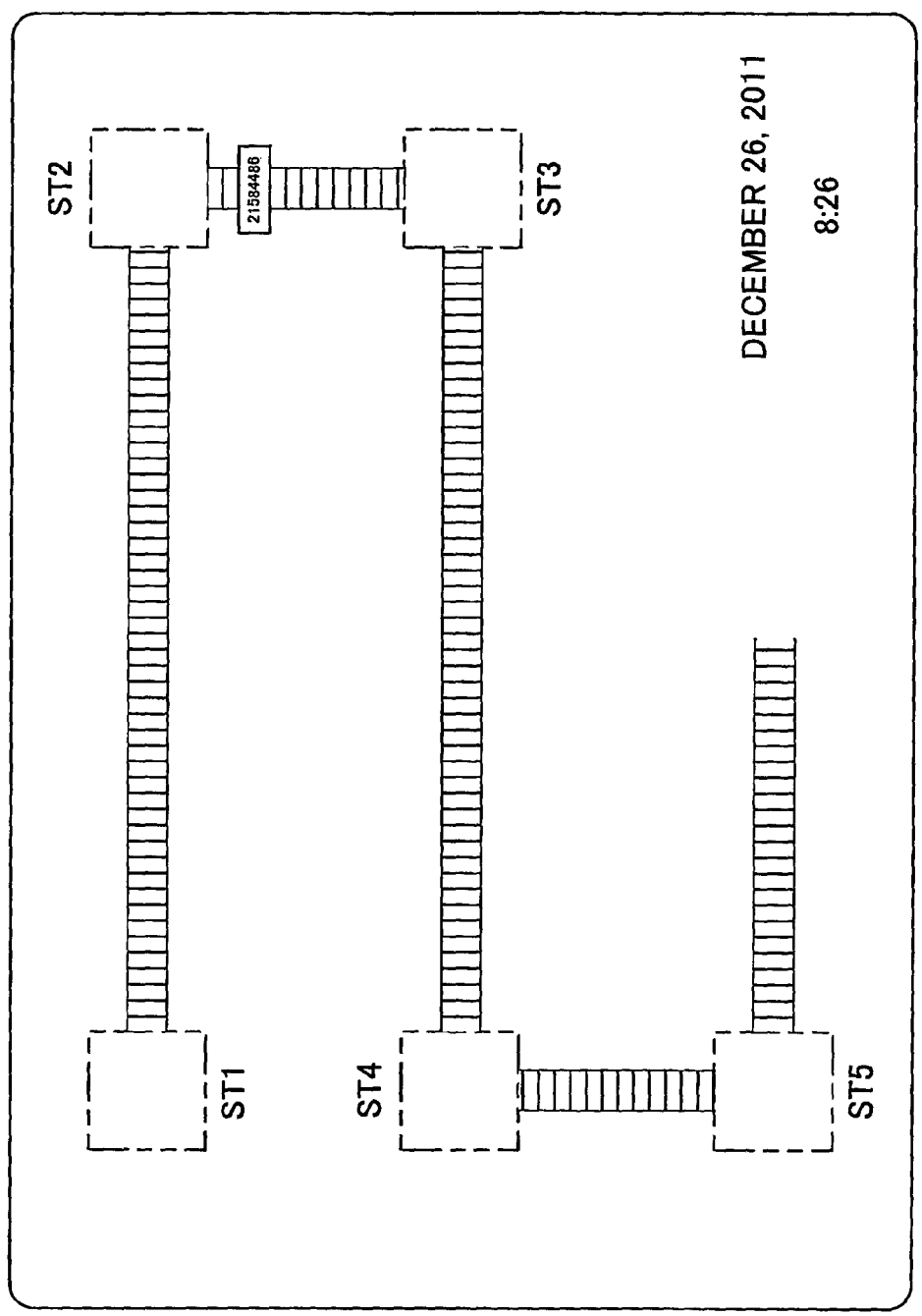
FIG. 8 is a diagram (version 4) illustrating the operation of the RFID system.

The control apparatus 100 records the received detected information into the hard disk, and causes the display unit of the display to indicate the situation (cf. FIG. 7). With this, it can be found that the product M having the ID number of "21584486" is located at the station ST2.

Next, the secondary assembly process is performed at the station ST2. When the secondary assembly process is completed at the station ST2, the assembly M2 is conveyed toward the station ST3 by the conveyance system T.

When the RFID tag 500 of the assembly M2 enters the effective communication area of the reader/writer 200c, the RFID tag 500 transmits a signal including the ID number.

When the reader/writer 200c receives the signal from the RFID tag 500, the reader/writer 200c extracts the ID number included in the signal, and transmits the detected information to the control apparatus 100. At the same time, the reader/writer 200c writes the history information into the RFID tag 500. The detection time at this time indicates the termination time of the assembly process at the station ST2. Therefore, an assembly time at the station ST2 can be obtained from the detection time by the reader/writer 200c and the detection time by the reader/writer 200b.

The control apparatus 100 records the received detected information into the hard disk. At the same time, the control apparatus causes the display unit of the display to indicate the situation (cf. FIG. 8). With this, it can be found that the secondary assembly process has been completed for the product M having the ID number of "21584486."

When the RFID tag 500 of the assembly M2 enters an effective communication area of the reader/writer 200d, the RFID tag 500 transmits a signal including the ID number.

When the reader/writer 200d receives the signal from the RFID tag 500, the reader/writer 200d extracts the ID number included in the signal, and reports the detected information to the control apparatus 100. At the same time, the reader/writer 200d writes the history information into the RFID tag 500. The detection time at this time indicates the start time of an assembly process at the station ST3.

The control apparatus 100 records the received detected information into the hard disk. At the same time, the control apparatus 100 causes the display unit of the display to indicate the situation. With this, it can be found that the product M having the ID number of "21584486" is located at the station ST3.

The third assembly process is performed at the station ST3. When the third assembly process at the station ST3 is completed, the assembly M3 is conveyed toward the station ST4 by the conveyance system T.

When the RFID tag 500 of the assembly M3 enters an effective communication area of the reader/writer 200e, the RFID tag 500 transmits a signal including the ID number.

When the reader/writer 200e receives the signal from the RFID tag 500, the reader/writer 200e extracts the ID number included in the signal, and reports the detected information to the control apparatus 100. At the same time, the reader/writer 200e writes the history information into the RFID tag 500. The detection time at this time indicates the termination time of the assembly process at the station ST3. Therefore, an assembly time at the station ST3 can be obtained from the detection time by the reader/writer 200e and the detection time by the reader/writer 200d.

The control apparatus 100 records the received detected information into the hard disk. At the same time, the control apparatus 100 causes the display unit of the display to indicate the situation. With this, it can be found that the third assembly process has been completed for the product M having the ID number of "21584486."

When the RFID tag 500 of the assembly M3 enters an effective communication area of the reader/writer 200f, the RFID tag 500 transmits a signal including the ID number.

When the reader/writer 200f receives the signal from the RFID tag 500, the reader/writer 200f extracts the ID number included in the signal, and reports the detected information to the control apparatus 100. At the same time, the reader/writer 200f writes the history information into the RFID tag 500. The detection time at this time indicates the start time of an assembly process at the station ST4.

The control apparatus 100 records the received detected information into the hard disk. At the same time, the control apparatus 100 causes the display unit of the display to indicate the situation. With this, it can be found that the product M having the ID number of "21584486" is located at the station ST4.

The fourth assembly process is performed at the station ST4. When the fourth assembly process at the station ST4 is completed, the assembly M4 is conveyed toward the station ST5 by the conveyance system T.

When the RFID tag 500 of the assembly M4 enters an effective communication area of the reader/writer 200g, the RFID tag 500 transmits a signal including the ID number.

When the reader/writer 200g receives the signal from the RFID tag 500, the reader/writer 200g extracts the ID number included in the signal, and reports the detected information to the control apparatus 100. At the same time, the reader/writer 200g writes the history information into the RFID tag 500. The detection time at this time indicates the termination time of the assembly process at the station ST4. Therefore, an assembly time at the station ST4 can be obtained from the detection time by the reader/writer 200g and the detection time by the reader/writer 200f.

The control apparatus 100 records the received detected information into the hard disk. At the same time, the control apparatus 100 causes the display unit of the display to indicate the situation. With this, it can be found that the fourth assembly process has been completed for the product M having the ID number of "21584486."

When the RFID tag 500 of the assembly M4 enters an effective communication area of the reader/writer 200h, the RFID tag 500 transmits a signal including the ID number.

When the reader/writer 200h receives the signal from the RFID tag 500, the reader/writer 200h extracts the ID number included in the signal, and reports the detected information to the control apparatus 100. At the same time, the reader/writer 200h writes the history information into the RFID tag 500. The detection time at this time indicates the start time of an assembly process at the station ST5.

The control apparatus 100 records the received detected information into the hard disk. At the same time, the control apparatus 100 causes the display unit of the display to indicate the situation. With this, it can be found that the product M having the ID number of "21584486" is located at the station ST5.

The fifth assembly process is performed at station ST5. When the assembly process at the station ST5 is completed, the assembly M5 is conveyed toward a next line by the conveyance system T.

When the RFID tag 500 of the assembly M5 enters an effective communication area of the reader/writer 200i, the RFID tag 500 transmits a signal including the ID number.

When the reader/writer 200i receives the signal from the RFID tag 500, the reader/writer 200i extracts the ID number included in the signal, and transmits the detected information to the control apparatus 100. At the same time, the reader/writer 200i writes the history information into the RFID tag 500. The detection time at this time indicates the termination time of the assembly process at the station ST5. An assembly time at the station ST5 can be obtained from the detection time by the reader/writer 200i and the detection time by the reader/writer 200h.

The control apparatus 100 records the received detection information into the hard disk. At the same time, the control apparatus causes the display unit of the display to indicate the situation. With this, it can be found that the fifth assembly process has been terminated for the product M having the ID number of "21584486."

In the RFID system 10, it is possible to know a processing state of the product M in real time. Further, in the RFID system 10, it is possible to know the assembly time in each of the stations ST1-ST5 in real time.

In this case, the congestion of the products under processing can be avoided by allocating workforce so that the assembly time in each of the stations ST1-ST5 becomes substantially the same. Therefore, the product M can be efficiently assembled.

Next, the RFID tag 500 will be explained in detail.

As shown in FIGS. 9A and 9B, for example, the RFID tag 500 includes a chip module 510 and a holding member 550.

As shown in FIG. 10, for example, the chip module 510 includes an IC chip 511 and two terminal members 520.

Each of the terminal members 520 includes a thin metal film (here, the thin metal film is an aluminum film) 521; and resin films 522 that laminate corresponding surfaces of the thin metal film 521. The resin films 522 function as isolators for electrically isolating the metal plate P and the thin metal film 521. The resin films 522 also function to protect the thin metal film 521 from pollution and damage.

Figure 12:
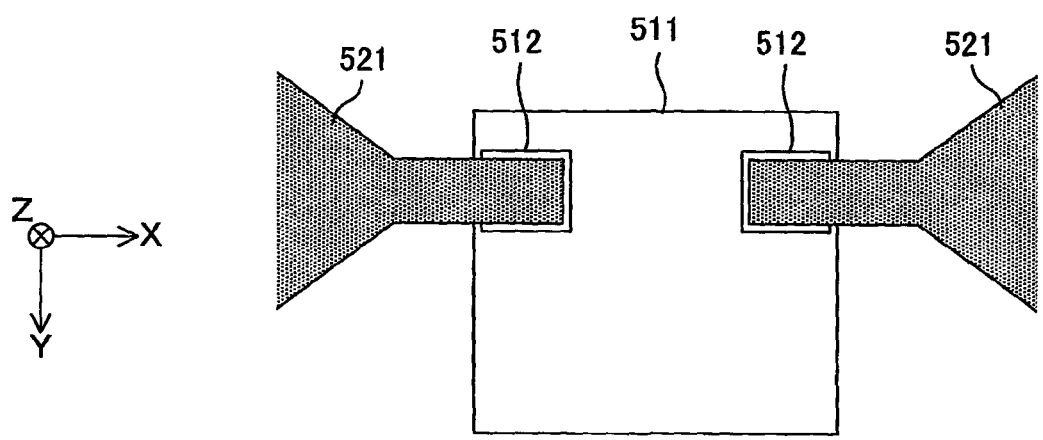
FIG. 12 is a diagram (version 3) illustrating the chip module.
Figure 13C:
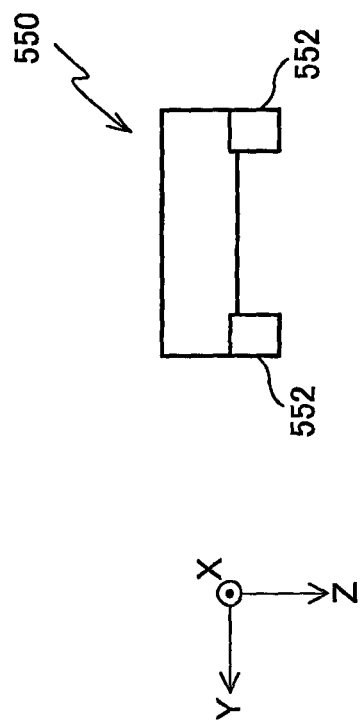
Figure 13D:
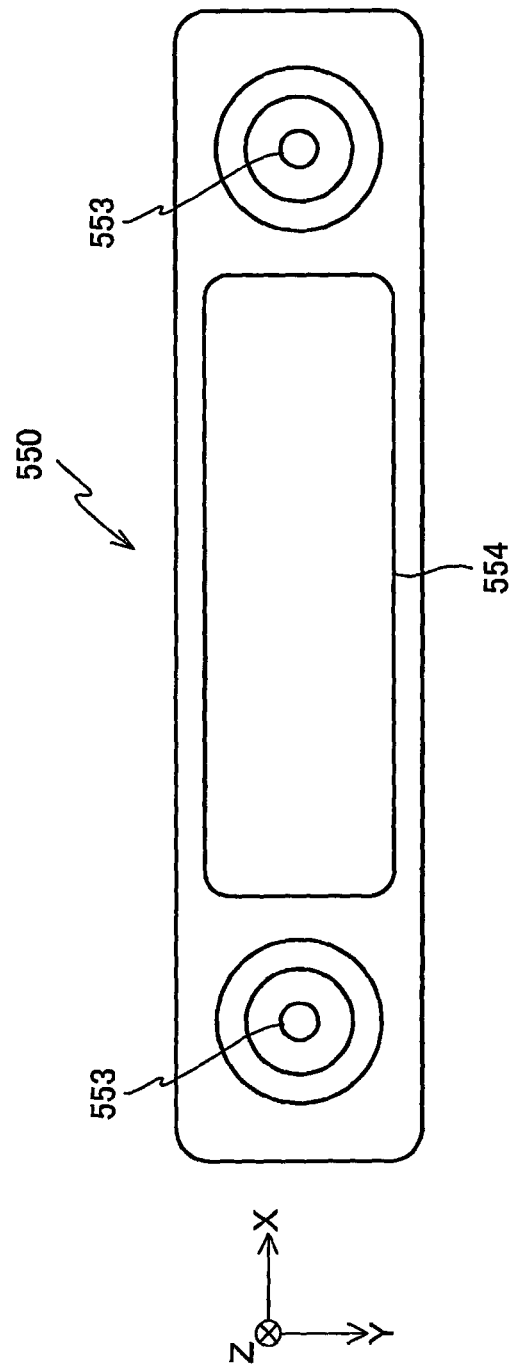

As shown in FIGS. 11 and 12, for example, each of the thin metal films 521 of the corresponding terminal members 520 is connected to a corresponding electrode 512 of the IC chip 511.

As shown in FIGS. 13A-13D, for example, the holding member 550 is a planer member formed of a ceramic material or a resin material. The holding member 550 has a substantially rectangular shape.

The holding member 550 includes two through holes 553, into which corresponding screws are inserted. One of the through holes 553 is formed in the vicinity of an edge in the X-axis direction of the holding member 550, and the other through hole 553 is formed in the vicinity of the other edge in the X-axis direction. As shown in FIG. 14B, for example, at the end portions of the through holes 553 in the −Z side, counter boring has been performed so that the corresponding heads of the screws can be embedded. Here, FIG. 14B is the A-A cross-sectional view of FIG. 14A.

The holding member 550 includes a planer portion 551 disposed at a center portion of the surface of the holding member 550 at the +Z side. The chip module 510 is adhered to the planer portion 551. As shown in FIG. 15, for example, the planer portion 551 protrudes by about 0.2 mm relative to the surrounding portion.

Protrusions 552 are disposed at the +Y side of the planer portion 551 and the −Y side of the planer portion 551, respectively. The protrusions 552 function to align the RFID tag 500, when the RFID tag 500 is attached to the metal plate P. Further, the protrusions 552 function to prevent the metal plate P from being twisted, when the RFID tag 500 is attached to the metal plate P. Especially, the protrusions 552 are quite effective to prevent twisting, when self tapping screws are utilized to attach the RFID tag 500 to the metal plate P. Further, the protrusions 552 function to protect the IC chip 551 from being collided with an object and damaged.

A seal is adhered to the center portion of the surface of the holding member 550 at the −Z side. For example, the name of the product is printed on the seal.

Hereinafter, there will be explained a specific example of dimensions of the holding member 550 by referring to FIGS. 16A-16C. Here, it is assumed that the frequency of the radio wave that is utilized for the communication is 950 MHz.

The holding member 550 has a length L1 of 55 mm in the X-axis direction, and a length L2 of 20 mm in the Y-axis direction. A distance between the centers of the two through holes 553 in the X-axis direction is 40 mm. The planer portion 551 has a length L4 of 35 mm in the X-axis direction, and a length L5 of 14 mm in the Y-axis direction.

The holding member 550 has a length L6 of 5 mm in the Z-axis direction. Each of the protrusions 552 has a length L7 of 1.8 mm in the X-axis direction, a length L8 of 2 mm in the Z-axis direction, and a length L9 of 2 mm in the Y-axis direction. The length L7 in the X-axis direction of each of the protrusions 552 is defined to be slightly smaller than the width Lx of the slit SLT. Such a configuration facilitates the alignment in the X-axis direction, when the RFID tag 500 is attached to the metal plate P. The value of the length L9 in the Y-axis direction of each of the protrusions 552 is not strictly defined. However, if the value is too small, it is possible that the protrusions 552 are broken.

Further, a diameter of each of the through holes 553 is 3.5 mm.

A transmissible distance depends on sizes of the thin metal films 521 of the corresponding terminal members 520 and thickness of the isolator such as the protection layer and the adhesive layer disposed between the thin metal films 521 and the metal plate P. Namely, the transmissible distance can be extended by lowering the capacitive coupling impedance Z. The capacitive coupling impedance Z can be lowered by adjusting the sizes of the thin metal films 521 depending on the thickness of the isolator.

The impedance Z can be expressed by the formula (1) below.

$$Z = 1/(\omega \cdot C) \tag{1}$$

In the formula (1), $\omega$ is an angular frequency, and C is a capacitance. The angular frequency $\omega$ is expressed by the formula (2) below, and the capacitance C is expressed by the formula (3) below.

$$\omega = 2\pi f \tag{2}$$

$$C = S \cdot \in_0 \cdot \in_r / d \tag{3}$$

Here, f is a frequency of the radio wave that is utilized for the communication, S is an area of the thin metal film 521, $\in_0$ is the dielectric constant of vacuum, $\in_r$ is a dielectric constant of the isolator, and d is the thickness of the isolator.

The formula (1) can be rewritten as the formula (4) below.

$$Z = d/(2\pi f \cdot S \cdot \in_0 \cdot \in_r) \tag{4}$$

The electric power W supplied from the terminal members 520 to the IC chip 511 can be expressed by the formula (5) below.

$$\begin{aligned} W &= Wa - 2 \cdot V \cdot A \\ &= Wa - 2 \cdot V^2/Z \end{aligned} \tag{5}$$

In the formula (5), Wa is the electric power induced between the edges in the X-axis direction of the slit SLT during the communication, V is a voltage induced between the edges in the X-axis direction of the slit SLT during the communication, and A is a current supplied from the two terminal members 520 to the IC chip 511. Namely, the electric power supplied to the IC chip 511 is obtained by subtracting the electric power consumed by the connecting portion (the portion of the isolator) from the electric power induced at the antenna.

When the electric power required to realize a desired communication range is defined to be Wmin, the area S of each of the thin metal films 521 is adjusted so that the inequality (6) below is satisfied.

$$W\text{min} \leq Wa - 2 \cdot V^2/Z = Wa - 4\pi f \cdot S \cdot \in_0 \cdot \in_r \cdot V^2/d \tag{6}$$

Here, Wmin is a value that is uniquely determined when the type of the IC chip to be utilized and the desired communication range are determined.

For example, for a case where f is 950 MHz, the isolator is polyethylene-telephthalate (PET), and d is 20 μm, the formula (6) is satisfied if S is equal to 100 mm².

Figure 17:
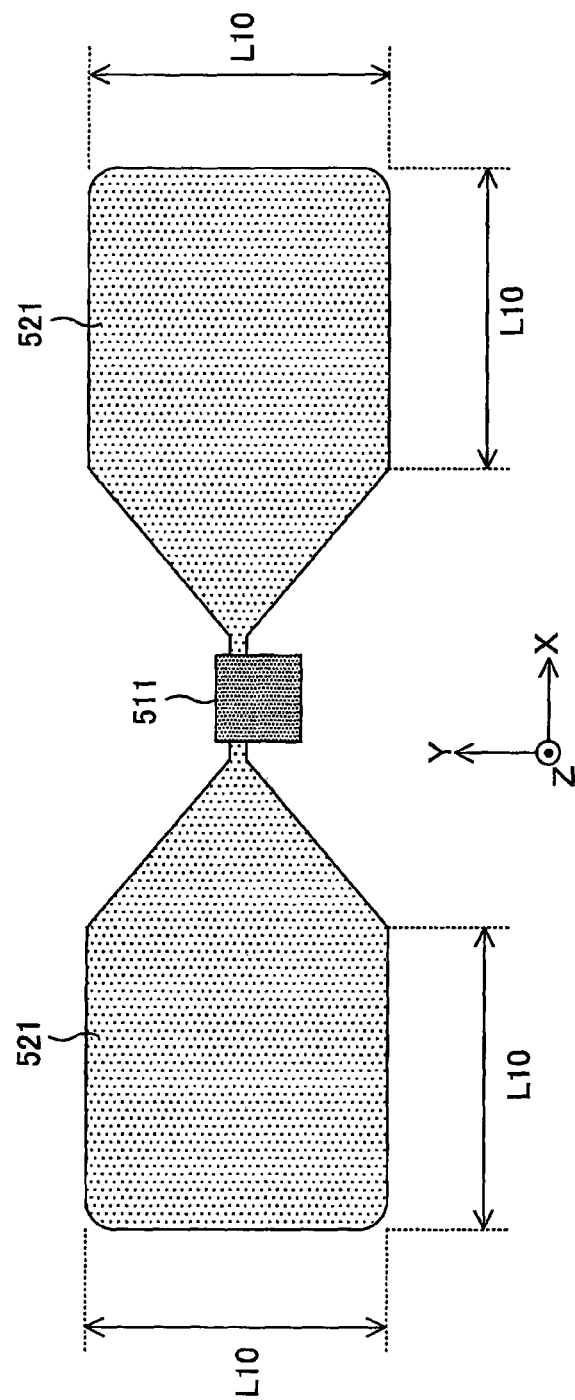
FIG. 17 is a diagram illustrating dimensions of a thin metal film.
Figure 18A:
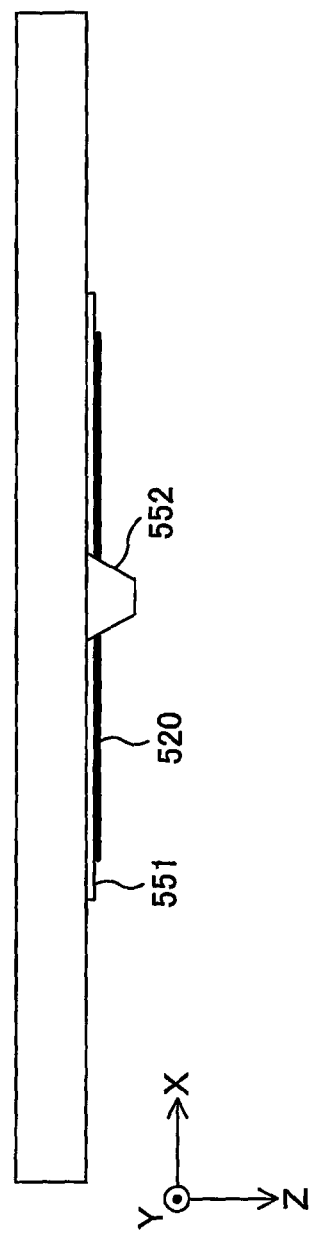
FIGS. 18A and 18B are diagrams (version 1) illustrating a state where the chip module is adhered to the holding member.
Figure 18B:
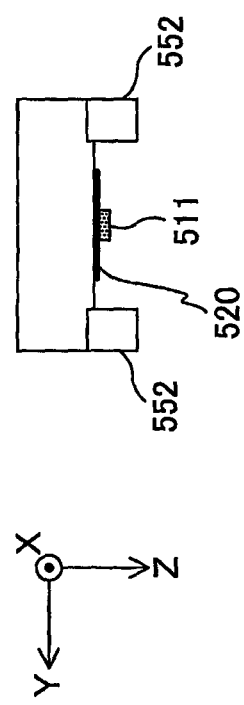

Therefore, in the first embodiment, a PET film having thickness of 20 μm is utilized as the resin film 522. As shown in FIG. 17, for example, each of the thin metal films 521 has a substantially square shape with a side length L10 of 10 mm. When a non-conductive protection material is applied to or laminated on the surface of the metal plate P, the thickness of the resin film 522 is determined depending on the type and the thickness of the protection material. For example, when the protection material is the PET film, the total of the thickness of the protection material and the thickness of the resin film 522 is 20 μm.

Figure 19A:
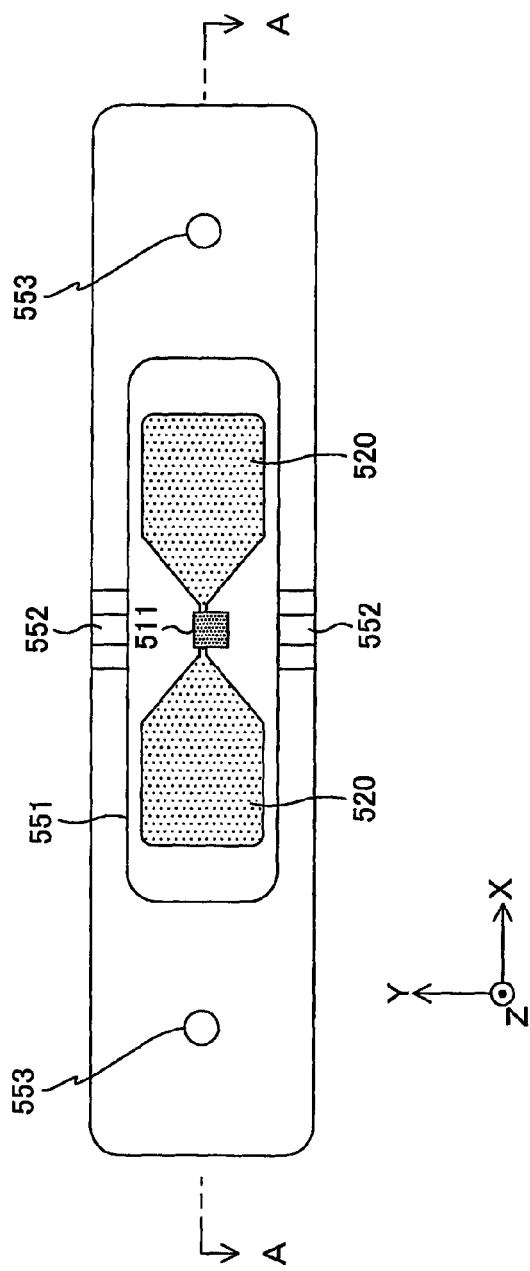
FIGS. 19A and 19B are diagrams (version 2) illustrating the state where the chip module is adhered to the holding member.
Figure 19B:
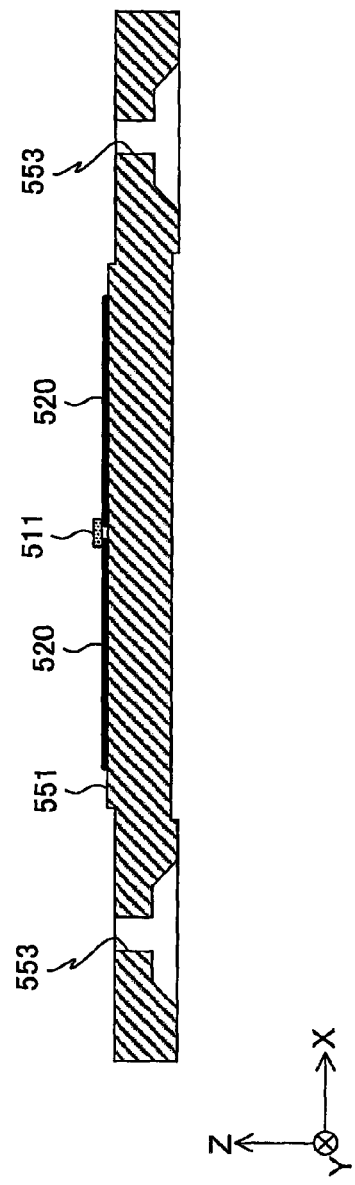
Figure 21:
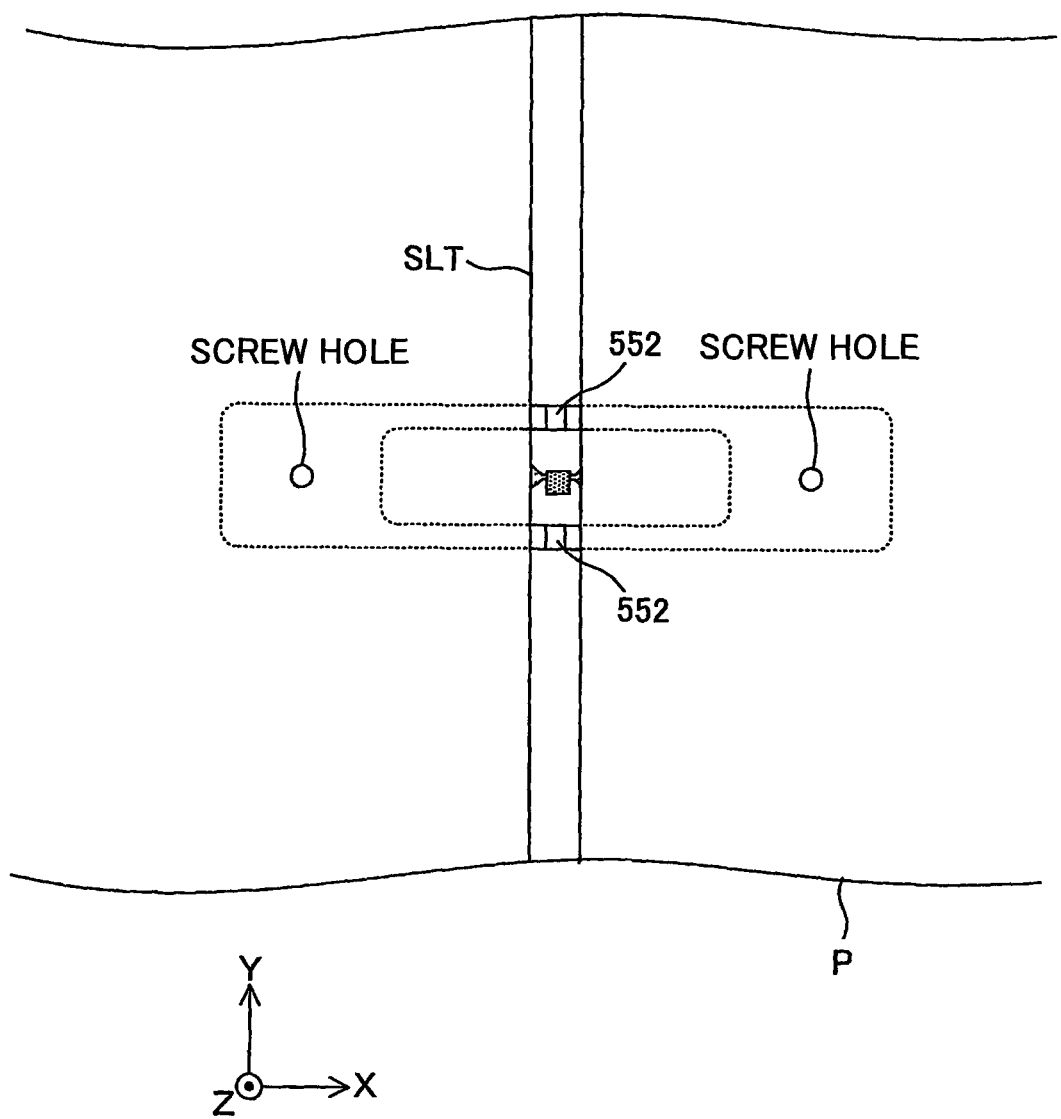
FIG. 21 is a diagram (version 2) illustrating the installation method of the RFID tag.
Figure 22:
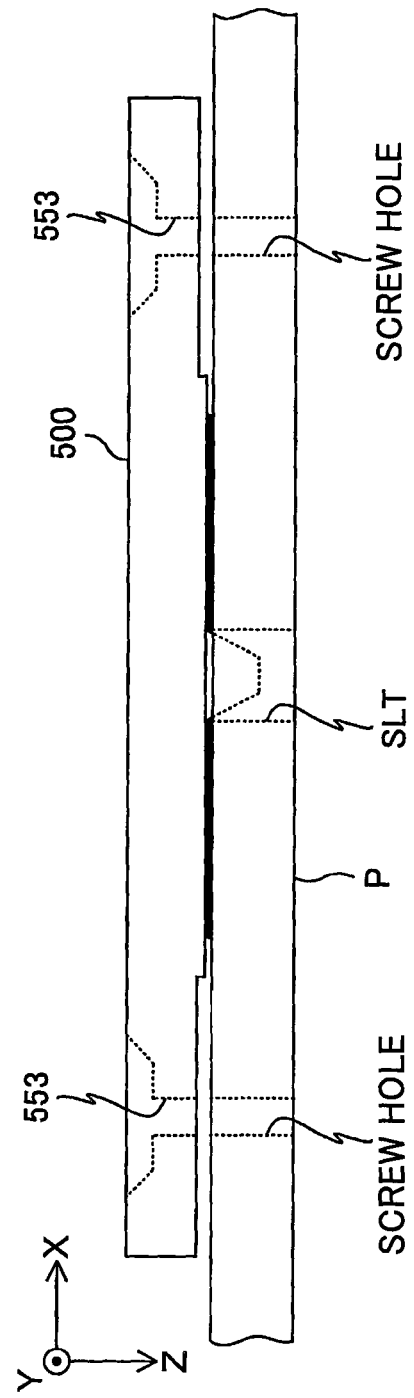
FIG. 22 is a diagram (version 3) illustrating the installation method of the RFID tag.

In FIGS. 18A, 18B, 19A, and 19B, a state is shown where the chip module 510 is adhered to the holding member 550. Here, FIG. 19B shows the A-A cross-section of FIG. 19A.

Next, there will be explained an attachment method of attaching the RFID tag 500 to the metal plate P by an operator at the station ST1.

(1) Hold the RFID tag 500 so that the longitudinal direction of the RFID tag 500 intersects perpendicular to the longitudinal direction of the slit SLT of the metal plate P.

(2) Place the RFID tag 500 closer to the metal plate P (cf. FIG. 20), so that the two protrusions 552 of the RFID tag 500 are inserted into the slit SLT.

(3) After the two protrusions 552 of the RFID tag 500 have been inserted into the slit SLT, move the RFID tag 500 along the Y-axis direction (cf. FIGS. 21 and 22) so that the through holes 553 of the holding member 550 are placed at the −Z side of corresponding screw holes of the metal plate P.

Figure 23:
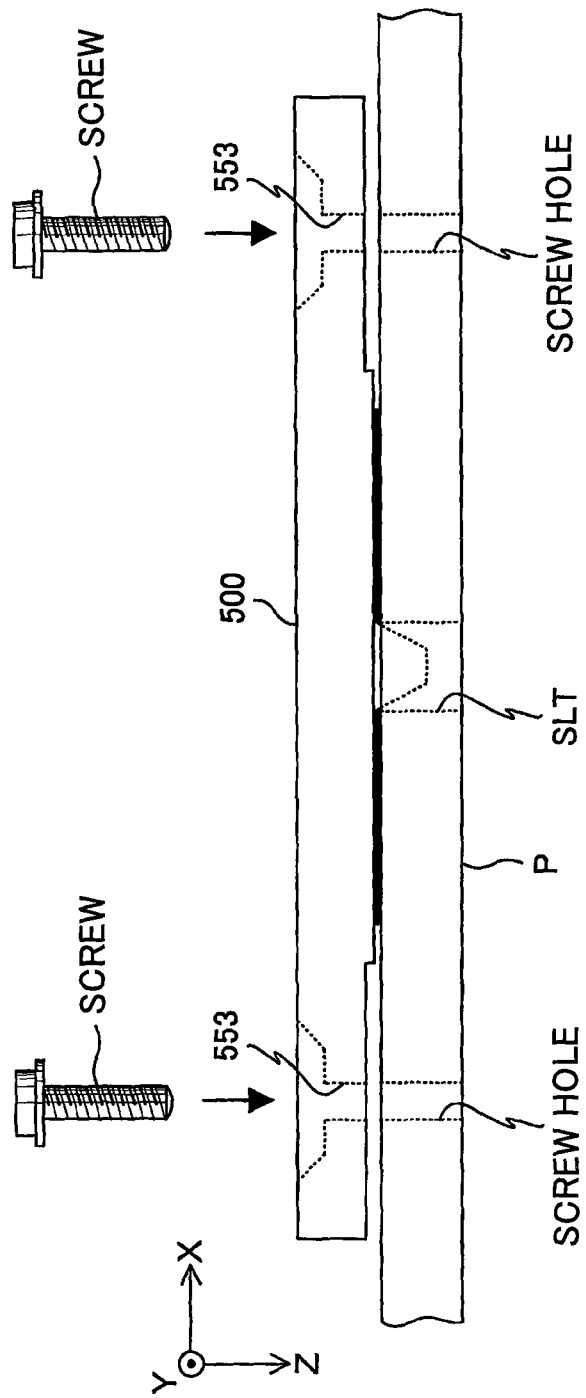
FIG. 23 is a diagram (version 4) illustrating the installation method of the RFID tag.

(4) Insert the screws into the corresponding though holes 553 of the RFID tag 500 (cf. FIG. 23).

(5) Push the screws into the corresponding screw holes of the metal plate P (cf. FIG. 24) using a tool (a screwdriver). At this time, the screws are strongly pushed into the corresponding screw holes so that neighboring portions of the through holes 553 contact the metal plate P (cf. FIG. 25). In this manner, the adherence between the terminal members 520 and the metal plate P can be improved. In FIG. 25, the deformation of the RFID tag 500 is exaggerated to facilitate understanding.

Figure 26:
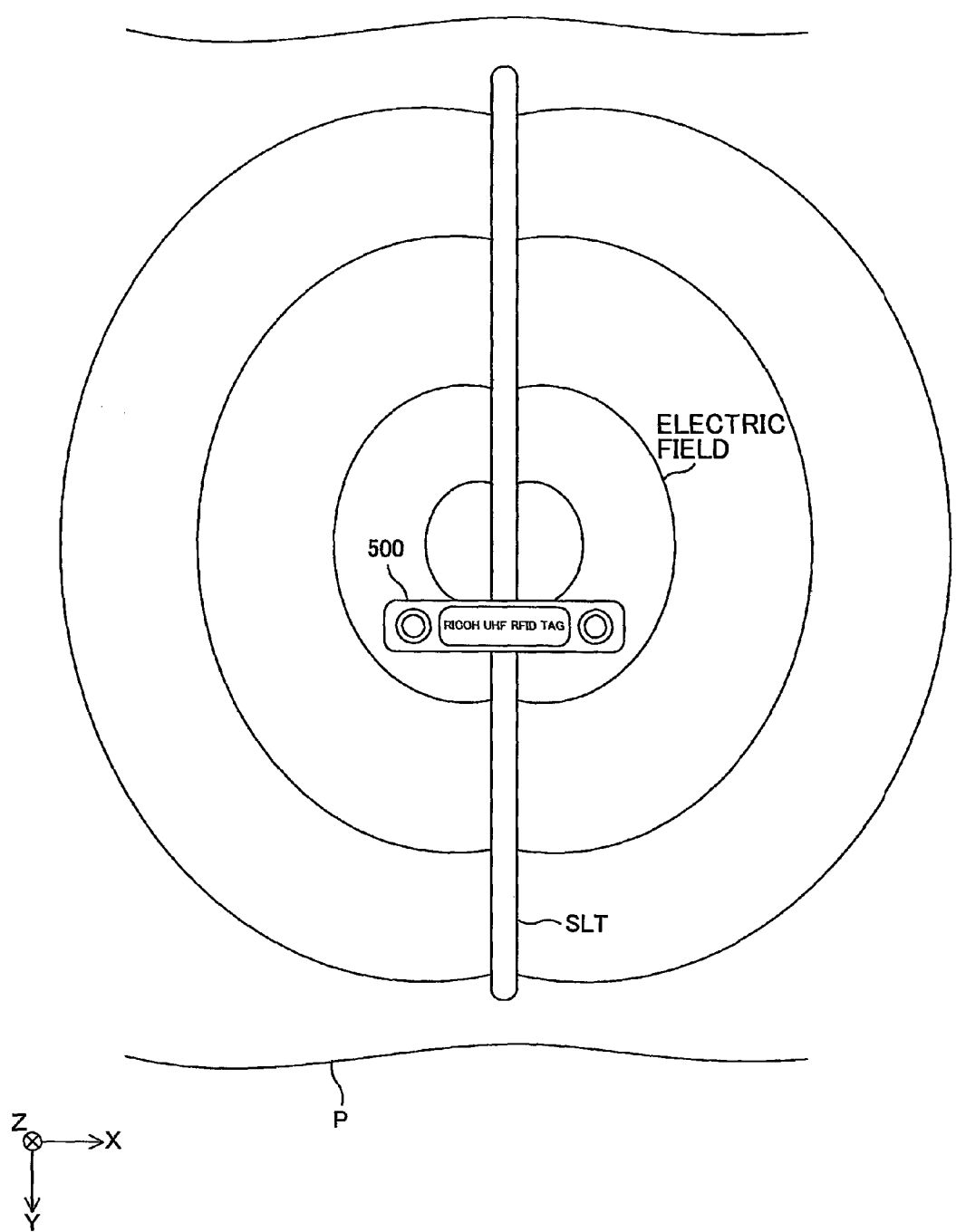
FIG. 26 is a diagram illustrating an electric field in the vicinity of the slit when a radio wave is emitted from a reader/writer.

When linearly polarized radio waves or circularly polarized radio waves are emitted from the reader/writer (any one of the reader/writers 200a-200i) to the slit SLT, an electric field is generated around the slit SLT (cf. FIG. 26). The electric field generates a reverse voltage (alternate-current voltage) across the slit SLT. Therefore, when the RFID tag 500 is attached to cross the slit SLT, a current flows, and the IC chip 511 of the RFID tag 500 is activated.

A communication range of 3 m can be ensured between the reader/writer (any one of the reader/writers 200a-200i) and the RFID tag 500.

As explained above, the RFID tag 500 according to the first embodiment includes the chip module 510 and the holding member 550.

The chip module 510 includes the IC chip 511 and the two terminal members 520. Each of the terminal members 520 includes the thin metal film 521 where the resin films 522 are laminated on both surfaces of the thin metal film 521. The thin metal film 521 included in the corresponding terminal member 520 is connected to the corresponding electrode 512 of the IC chip 511.

In the chip module 510, the thickness d of each of the resin films 522 and the area S of each of the thin metal film 521 are adjusted so that the inequality (6) is satisfied.

In this case, the minimum value of the area S of each of the thin metal films 521 can be evaluated depending on an operating condition. Therefore, the chip module 510 can be prevented from being enlarged more than necessary, and the chip module 510 can be downsized and the cost can be reduced.

The RFID tag 500 is attached to the metal plate P being a part of the product M, while the RFID tag 500 crosses the slit SLT of the metal plate P. Further, the RFID tag 500 utilizes the metal plate P as an antenna. Therefore, it is not necessary to introduce an antenna in the RFID tag 500, thereby enabling the downsizing and the cost reduction. In addition, even if there is a metal object in the vicinity of the RFID tag 500, a desired communication range can be ensured.

Thus, the RFID tag 500 according to the first embodiment can be used with a metal object without decreasing the communication range, while enabling the downsizing and the cost reduction.

Further, since the RFID tag 500 is attached to the metal plate P with the screws, the RFID tag 500 can be reused.

Further, since the RFID tag 500 is attached to the metal plate P with the screws, the attachment of the RFID tag 500 to the metal plate P can be ensured, even if oil is adhered to the surface of the metal plate P.

Additionally, with the RFID system 10 according to the first embodiment, since the RFID system 10 includes the RFID tag 500, the ID number can be read accurately and stably, thereby improving the reliability of the RFID system 10.

Figure 27:
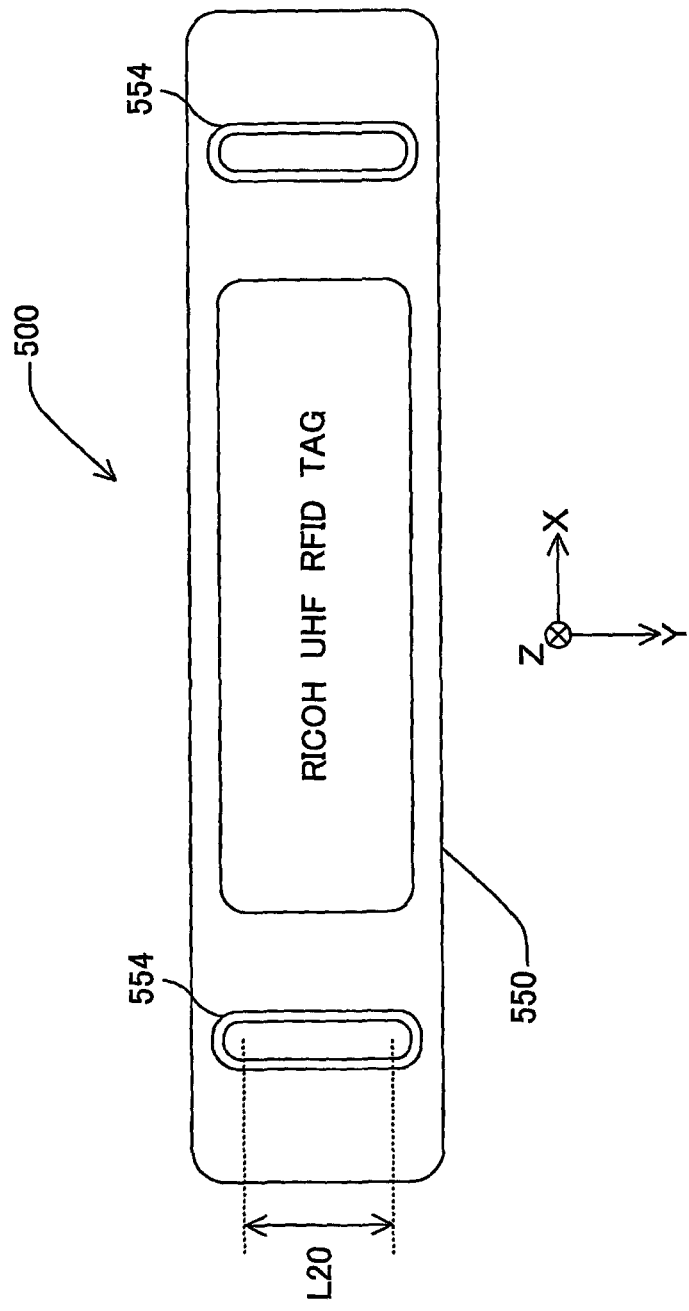
FIG. 27 is a diagram illustrating a first modified example of the holding member.

In the above-described first embodiment, elongated holes 554 may be disposed instead of the through holes 553, as shown in FIG. 27, for example. The longitudinal direction of each of the elongated holes 554 are along the Y-axis direction. In this case, when the RFID tag 500 is attached to the metal plate P, the attached position of the RFID tag 500 may be adjusted within length L20 (for example, L20=10 mm) in the Y-axis direction. Specifically, a position of the RFID tag 500 where the impedance matching is achieved can be searched for by searching for a position where the resistance value is equal to a designated resistance value for the IC chip 511 by moving the position of the RFID tag 500 in the Y-axis direction while measuring the resistance value with a network analyzer. When the position is found where the impedance matching is achieved, the RFID tag 500 is fixed to the position by the screws. In this manner, the RFID tag 500 can be attached to the most suitable position.

Further, in the first embodiment, the case has been explained where the RFID tag 500 is attached to the metal plate P by the screws. However, the first embodiment is not limited to this. For example, when the RFID tag 500 is not reused, the RFID tag 500 may be adhered to the metal plate P.

Further, in the first embodiment, the case has been explained where each of the metal thin plates 521 has the substantially square shape. However, the first embodiment is not limited to this. It suffices that the area S of the each of the metal thin plates 521 is 100 mm².

Further, in the first embodiment, the case has been explained where the RFID tag 500 is attached to the metal plate P, which is included in the product M. However, the first embodiment is not limited to this.

Figure 28:
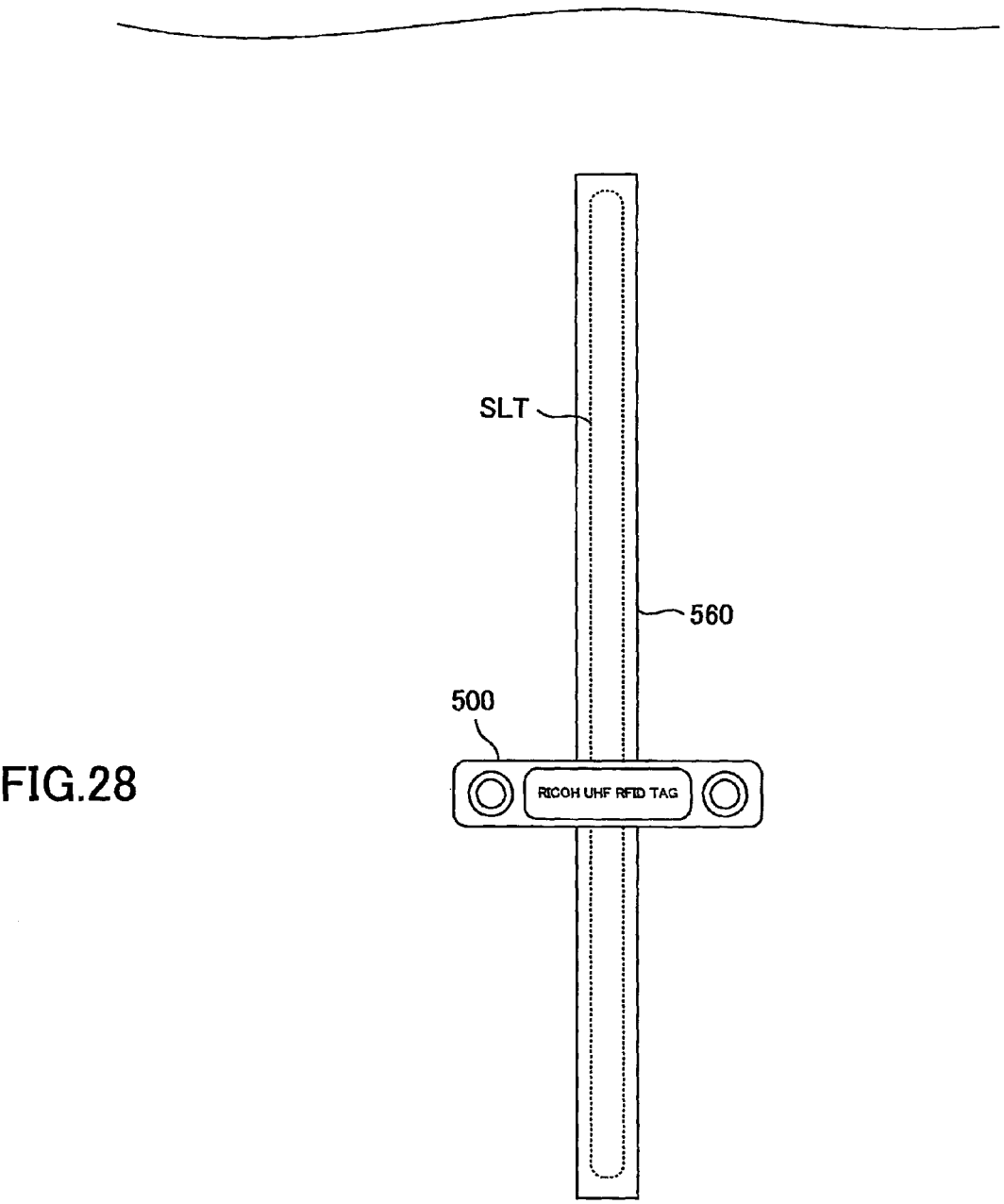
FIG. 28 is a diagram illustrating a dielectric sheet covering the slit.

Further, in the first embodiment, the RFID tag 500 may include a dielectric sheet 560 that covers the slit SLT, as shown in FIG. 28, for example. In the vacuum (which is substantially equal to the air), when the traveling speed of the radio waves is denoted by c, the wavelength λ is expressed as c/f. On the other hand, when the radio waves pass through a dielectric material, the traveling speed c of the radio waves is changed to be $c/(\in_0 \cdot \in_r)^{1/2}$, where $\in_r$ is a dielectric constant of the dielectric material. Thus, the wavelength λ of the radio wave is $(c/(\in_0 \cdot \in_r)^{1/2})/f$. In this case, the length of the slit SLT in the longitudinal direction can be shortened, compared to that of the first embodiment.

Figure 29:
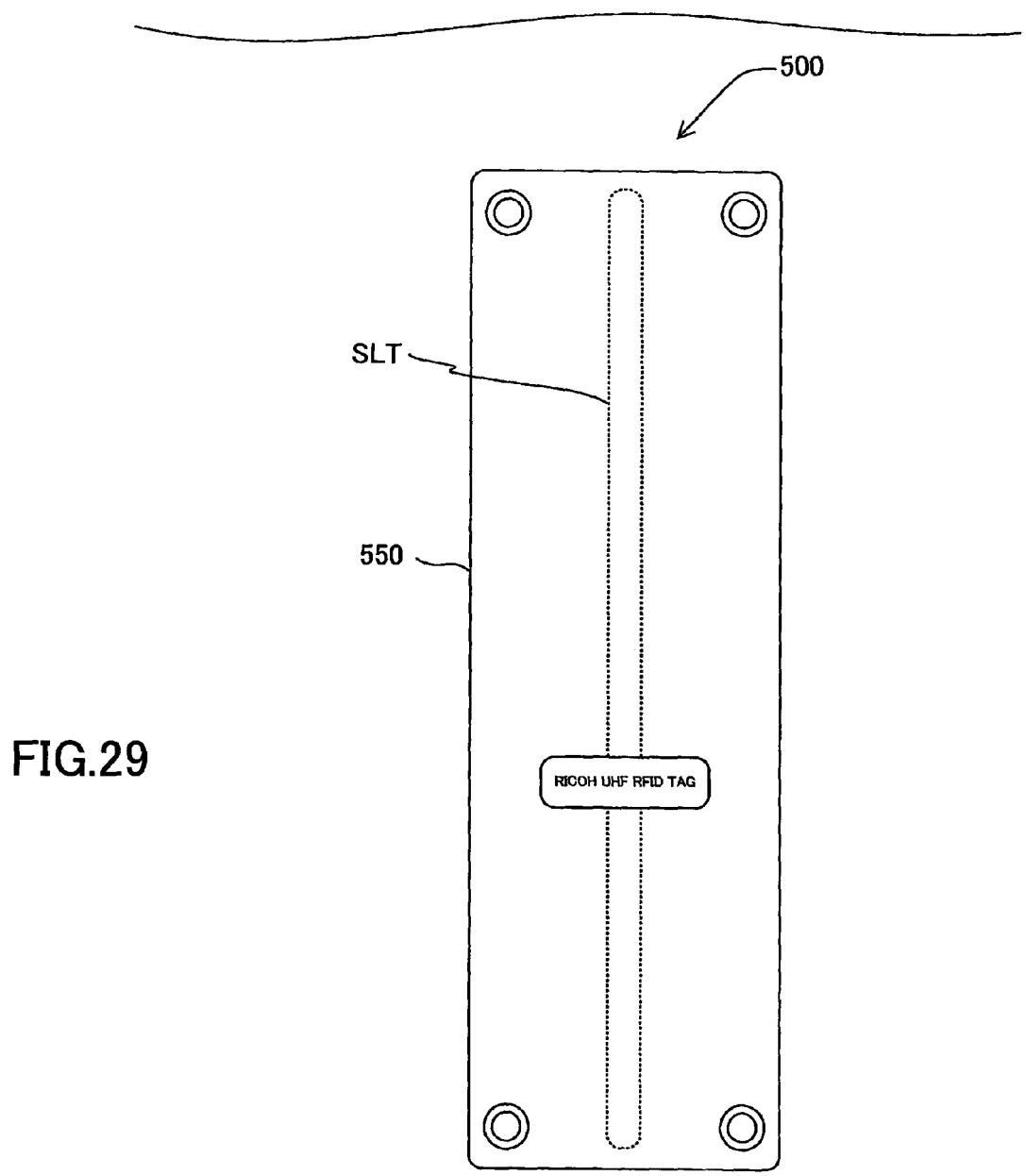
FIG. 29 is a diagram illustrating a second modified example of the holding member.

Alternatively to the dielectric sheet 560, the holding member 550 may have a shape to cover the slit SLT, as shown in FIG. 29, for example.

In the first embodiment, the case has been explained where the RFID tag 500 includes the chip module 510 and the holding member 550. However, the RFID is not limited to this configuration, and the RFID tag that only includes the chip module 510 may be utilized.

For example, as shown in FIGS. 30A and 30B, the chip module 510 may be attached to a tablet package. In the tablet package, tablets are placed in corresponding plural concave portions formed of a resin sheet, and the plural concave portions are sealed by an aluminum sheet. Here, FIG. 30B is the A-A cross-section in FIG. 30A.

Figure 31:
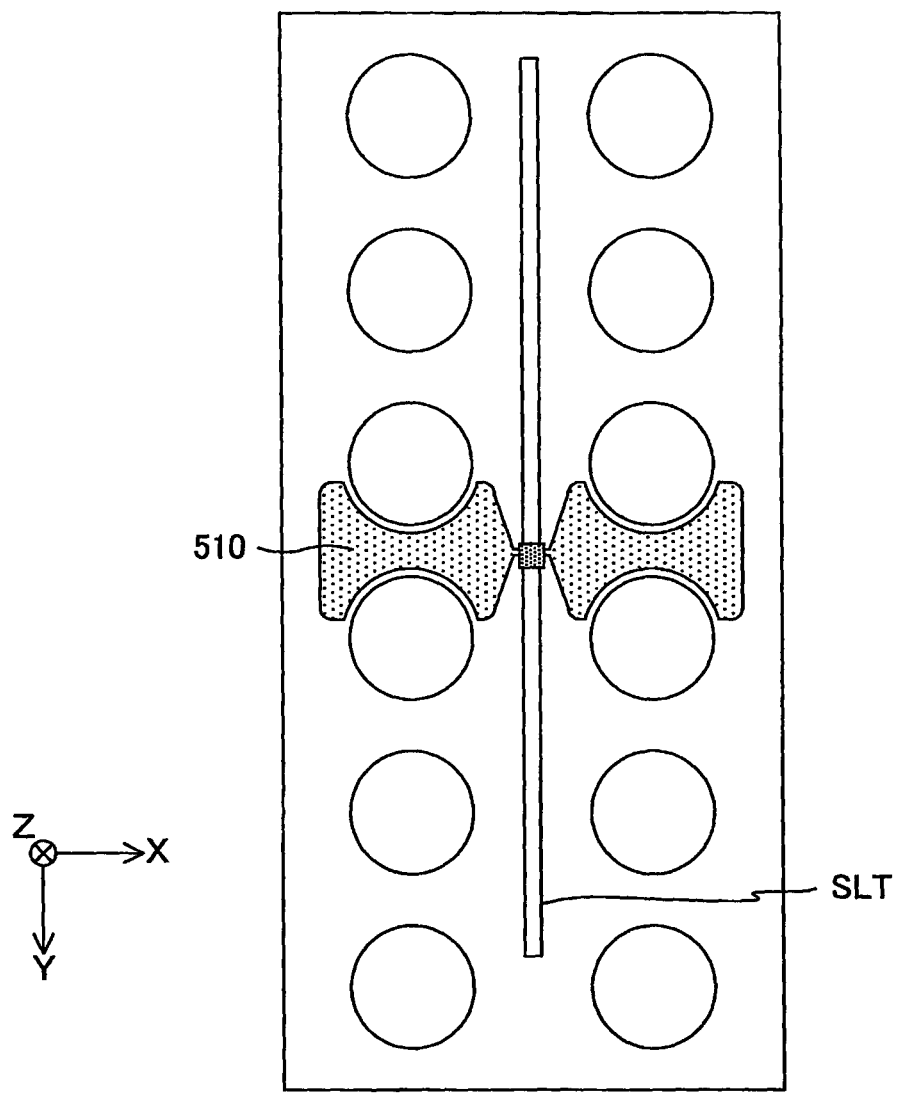
FIG. 31 is a diagram illustrating a slit formed in the tablet package and a chip module attached to the tablet package.

FIG. 31 shows an example case where the chip module 510 is attached to the tablet package, while the chip module 510 crosses a slit SLT formed in the tablet package.

Here, since the chip module 510 is attached to the surface of the resin sheet, as shown in FIG. 32, for example, each of the thin metal films 521 included in the chip module 510 has a shape for avoiding the concaved portions of the resin sheet. The area of the each of the thin metal films 521 is 100 mm$^2$.

Figure 33:
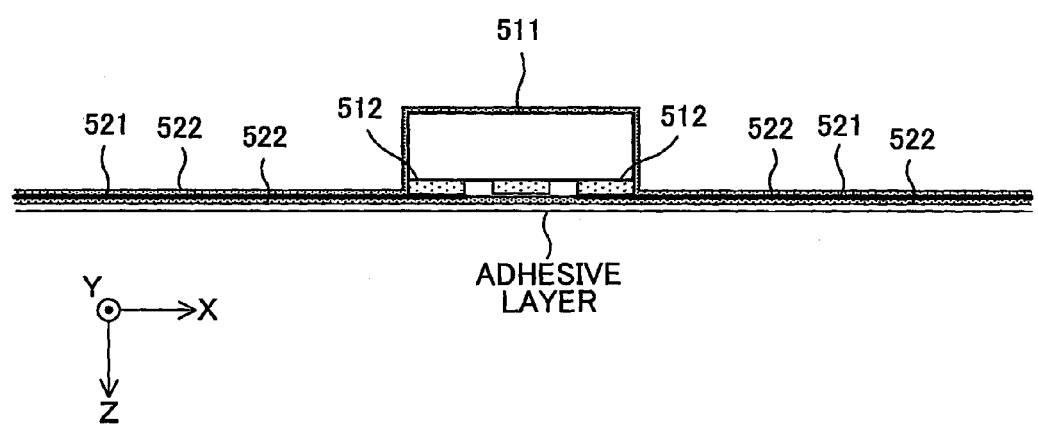
FIG. 33 is a diagram (version 2) illustrating the chip module attached to the tablet package.
Figure 34A:
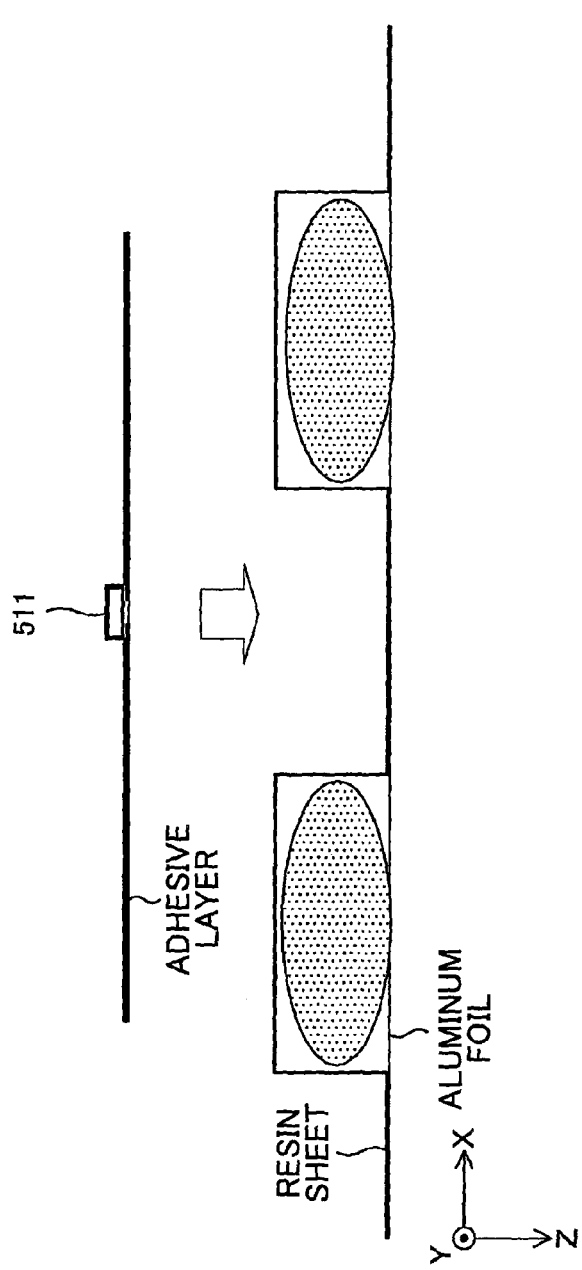
FIGS. 34A and 34B are diagrams illustrating a situation where the chip module is attached to the tablet package.
Figure 34B:
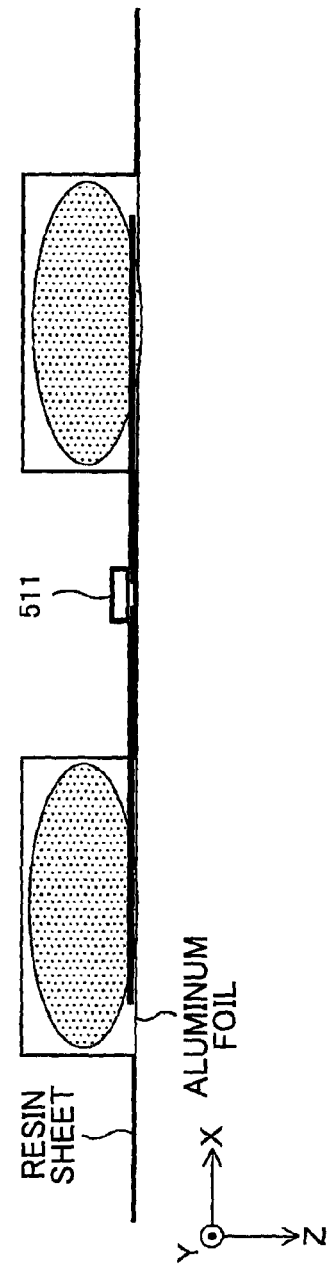

For example, as shown in FIG. 33, the chip module 510 includes an adhesive layer, and the chip module 510 is adhered to the resin sheet through the adhesive layer (cf. FIGS. 34A and 34B). Here, the resin films 522, which are as thin as possible, are utilized to laminate the corresponding sides of each of the thin metal films 521.

Therefore, the resin sheet, the adhesive layer, and the resin film 522 are disposed between the aluminum sheet of the tablet package and each of the thin metal films 521 of the chip module 510. In this case, the layer formed of the resin sheet, the adhesive layer, and the resin film 522 functions as an isolator, and the area of each of the thin metal films 521 is determined based on the corresponding materials and the thickness.

In this case, even if the concave portions are pressed and the corresponding portions of the aluminum sheet are broken to take out the tablets from the tablet package, the chip module 510 does not receive any effect.

In a case where the chip module 510 may be removed when the tablets are taken out from the tablet package, the chip module 510 may be attached to the side of the aluminum film. In such a case, each of the thin metal films 521 may have a substantially square shape, similar to the case of the first embodiment. In such a case, the adhesive layer and the resin film 522 are disposed between the aluminum film of the tablet package and the thin metal films 521 of the chip module 510.

Figure 35:
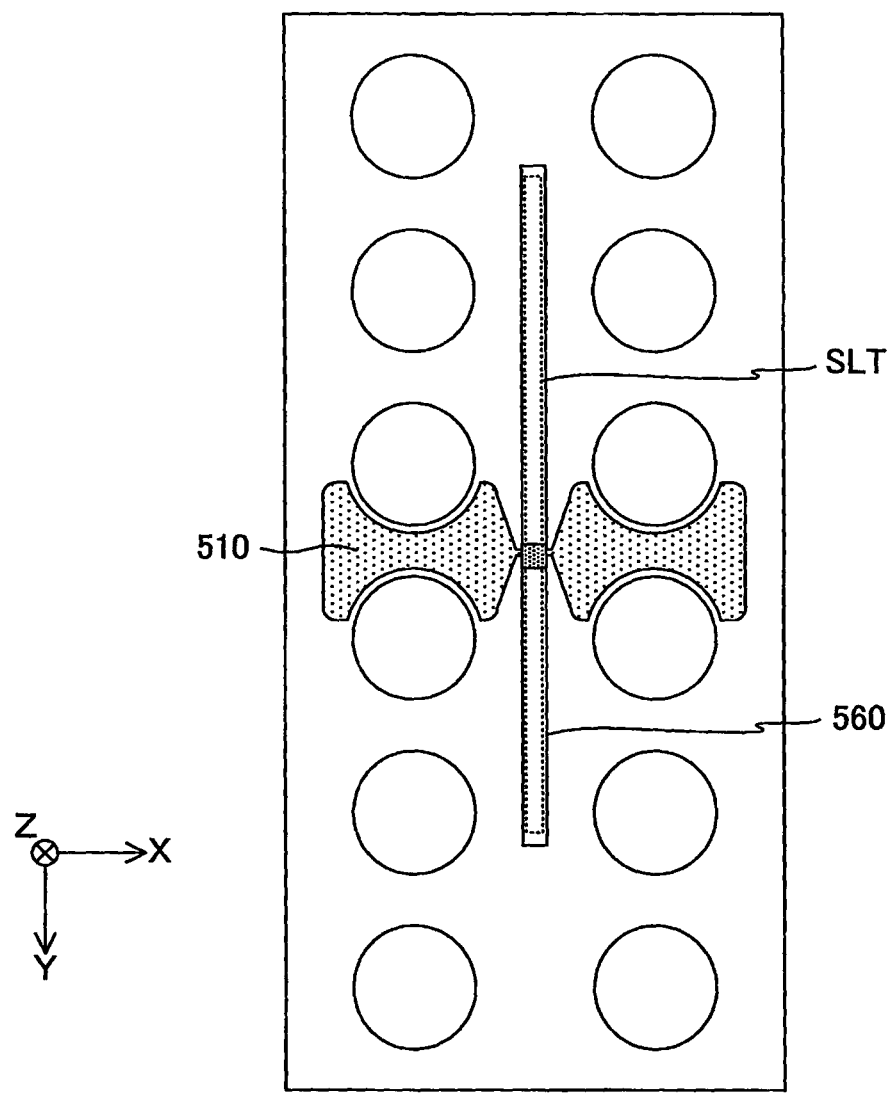
FIG. 35 is a diagram illustrating a modified example of the chip module attached to the tablet package.

Further, in this case, as shown in FIG. 35, for example, the chip module 510 may includes the dielectric sheet 560 to cover the slit SLT. With the dielectric sheet 560, the length of the slit SLT in the longitudinal direction can be shortened, compared to that of FIG. 31.

Figure 93:
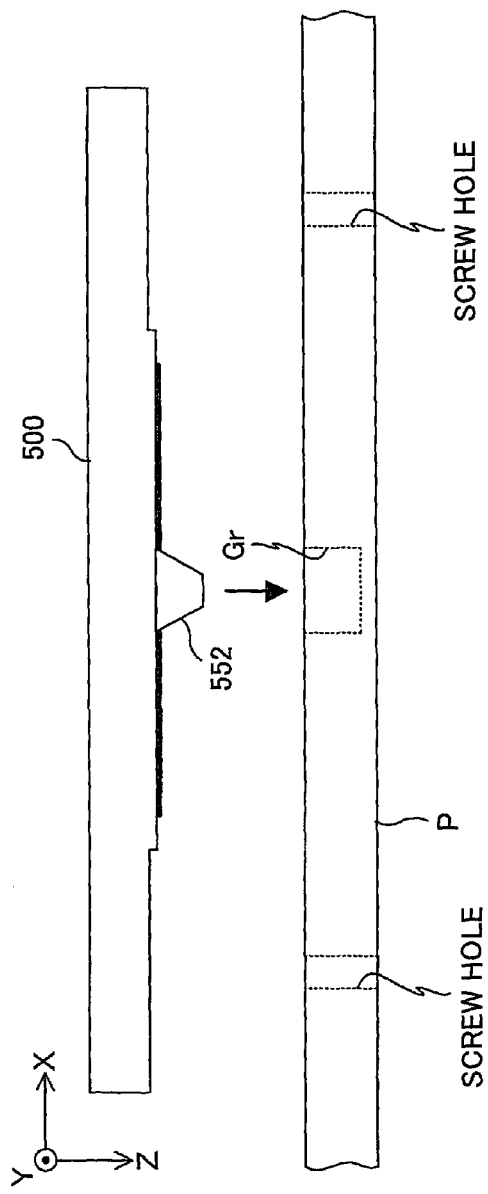
FIG. 93 is a diagram illustrating a groove of the metal plate.
Figure 94:
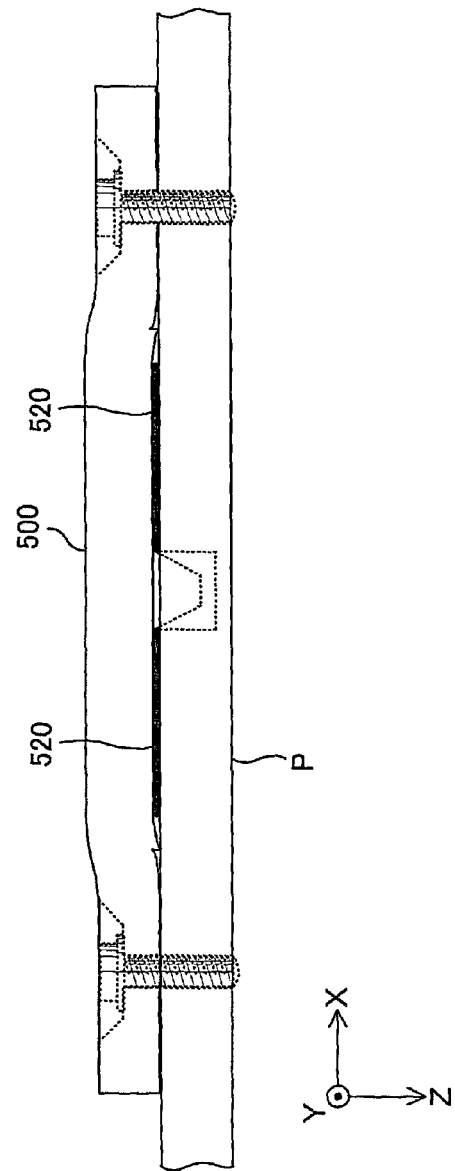
FIG. 94 is a diagram illustrating a state where the RFID tag according to the first embodiment is attached to the metal plate of FIG. 93.

Further, in the first embodiment, alternatively to the slit SLT, a groove Gr may be formed on the metal plate P as shown in FIGS. 93 and 94, for example. In this case, the RFID tag 500 can also be used with a metal object without decreasing the communication range, while enabling the downsizing and the cost reduction.

Figure 95:
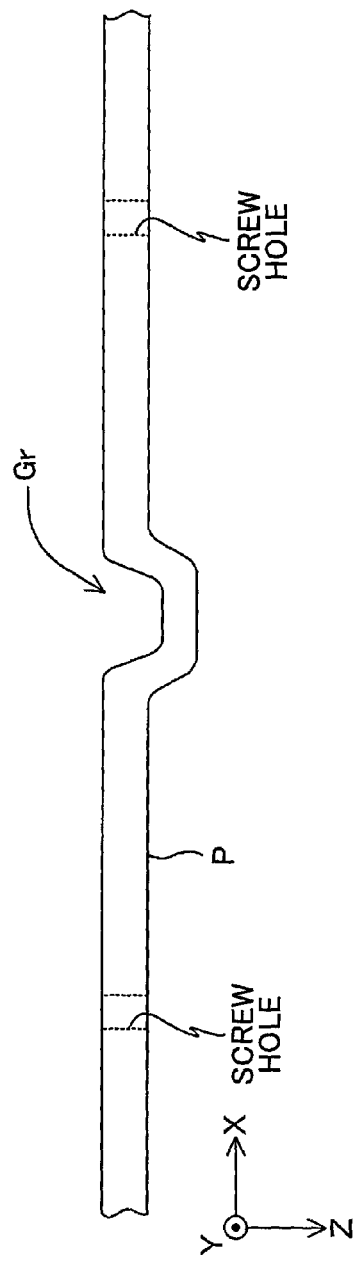
FIG. 95 is a diagram illustrating a groove formed by press working.

Here, as shown in FIG. 95, for example, the groove Gr may be a groove which has been formed by press working the metal plate P.

Figure 96:
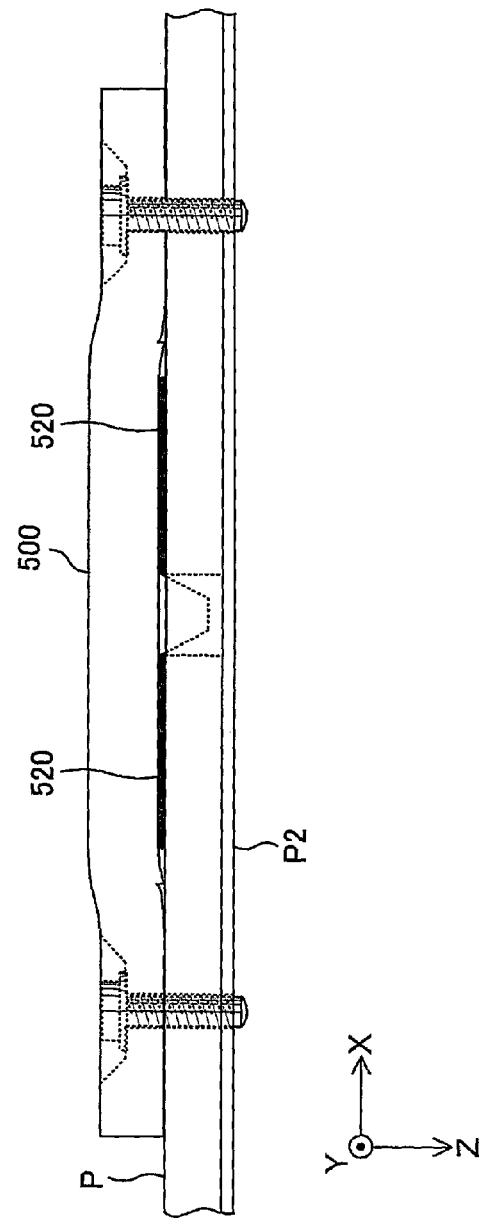
FIG. 96 is a diagram illustrating a groove which has been formed by modifying the slit.

Further, as shown in FIG. 96, for example, the slit SLT may be converted into a groove by attaching a metal thin plate P2 having screw holes to the +Z side of the metal plate P.

Figure 97A:
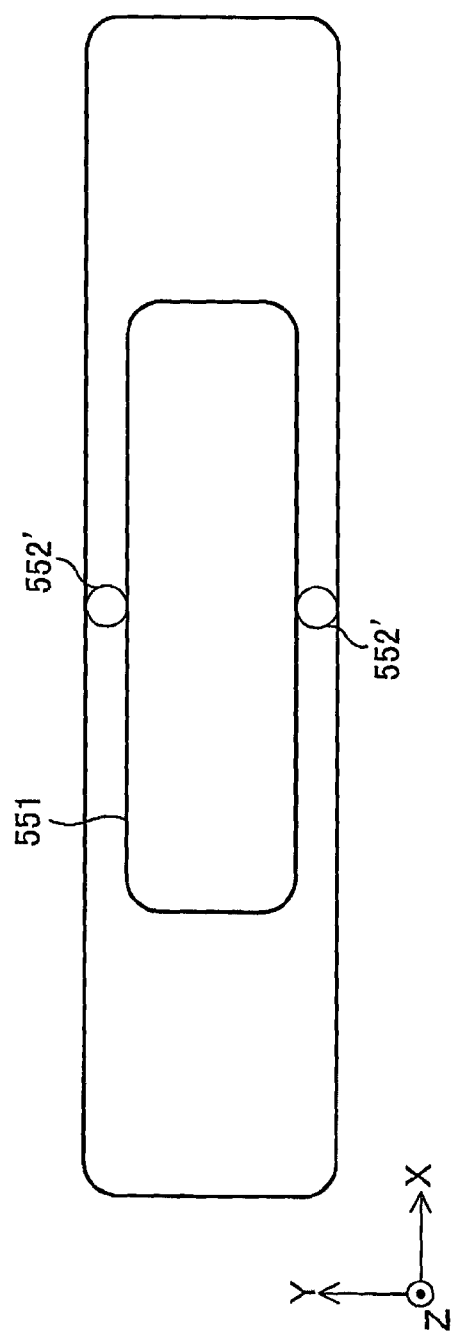
Figure 97B:
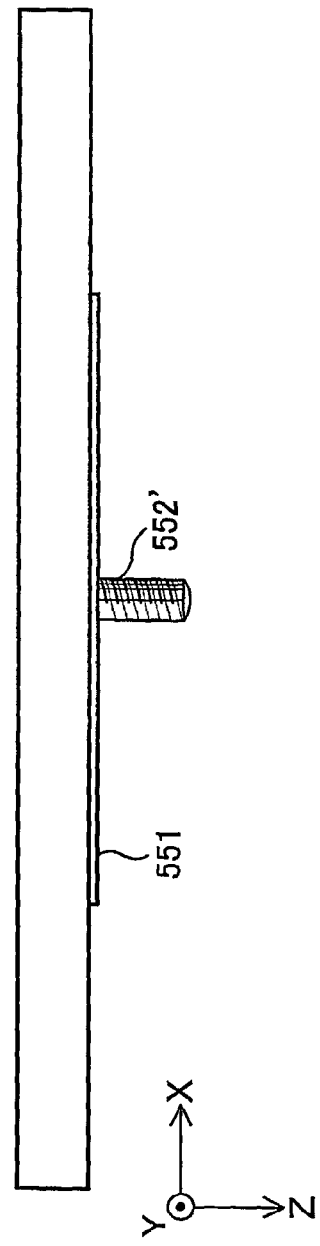

Further, in the first embodiment, as shown in FIGS. 97A-97C, alternatively to the protrusions 552, screw protrusions 552' may be formed. In this case, the through holes 553 of the holding member 550 are unnecessary (cf. FIGS. 97A and 97D).

As shown in FIG. 98, for example, the RFID tag 500 can be fixed on the metal plate P by fitting corresponding nuts Nt to the tips of the screw protrusions 552, which have passed through the slit SLT. In this case, the screw holes of the metal plate P are unnecessary.

Further, in the first embodiment, the case has been explained where the information is written into the RFID tag 500. However, the first embodiment is not limited to this. In a case where information is not written into the RFID tag, a memory area into which information is written may not be included in the IC chip 511. Further, alternatively to the reader/writers 200a-200i, devices dedicated for reading that only perform reading out of ID numbers (readers) may be utilized.

In the first embodiment, the case has been explained in which the assembly line includes the five stations ST1-ST5. However, the number of the stations is not limited to this.

Further, the contents of the detected information and the history information in the first embodiment are for exemplifying purpose only, and the contents are not limited to these. Similarly, the numbers of the digits of the device number and the identification number are not limited to those of the first embodiment.

Further, the contents displayed on the display in the first embodiment are for exemplifying purpose only, and the contents are not limited to these.

Further, in the first embodiment, the case has been explained where the RFID system 10 is utilized in the assembly line. However, the usage of the RFID system 10 is not limited to this. The RFID system 10 may be adjusted to the purpose for which an RFID system is currently utilized. In this case, the reliability of the system can be improved without leading to higher cost. Further, by separately preparing a metal plate that functions as the metal plate P, the RFID system 10 may be applied to an object that does not include any metal member.

In the first embodiment, the case has been explained where the frequency band is the UHF band. However, the frequency band is not limited to this.

<Second Embodiment>

Figure 36:
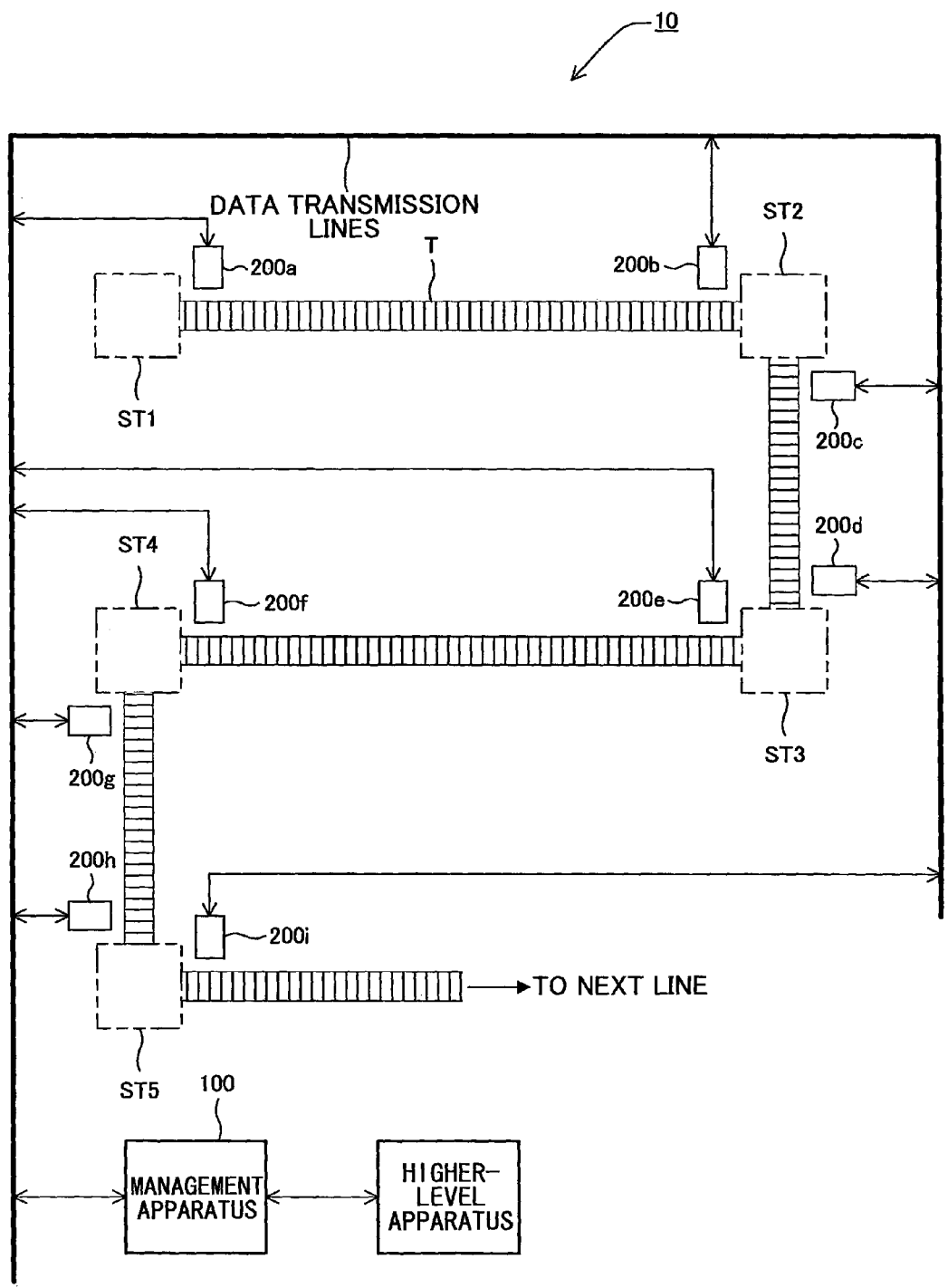
FIG. 36 is a diagram illustrating a schematic configuration of an RFID system according to a second embodiment of the present invention.

Hereinafter, a second embodiment of the present invention will be explained by referring to FIGS. 36-62. FIG. 36 shows a schematic configuration of an RFID system 10 according to the second embodiment.

The RFID system 10 is an RFID system where a passive tag is utilized, and the RFID system 10 is for a UHF band (860 MHz-960 MHz).

Figure 37:
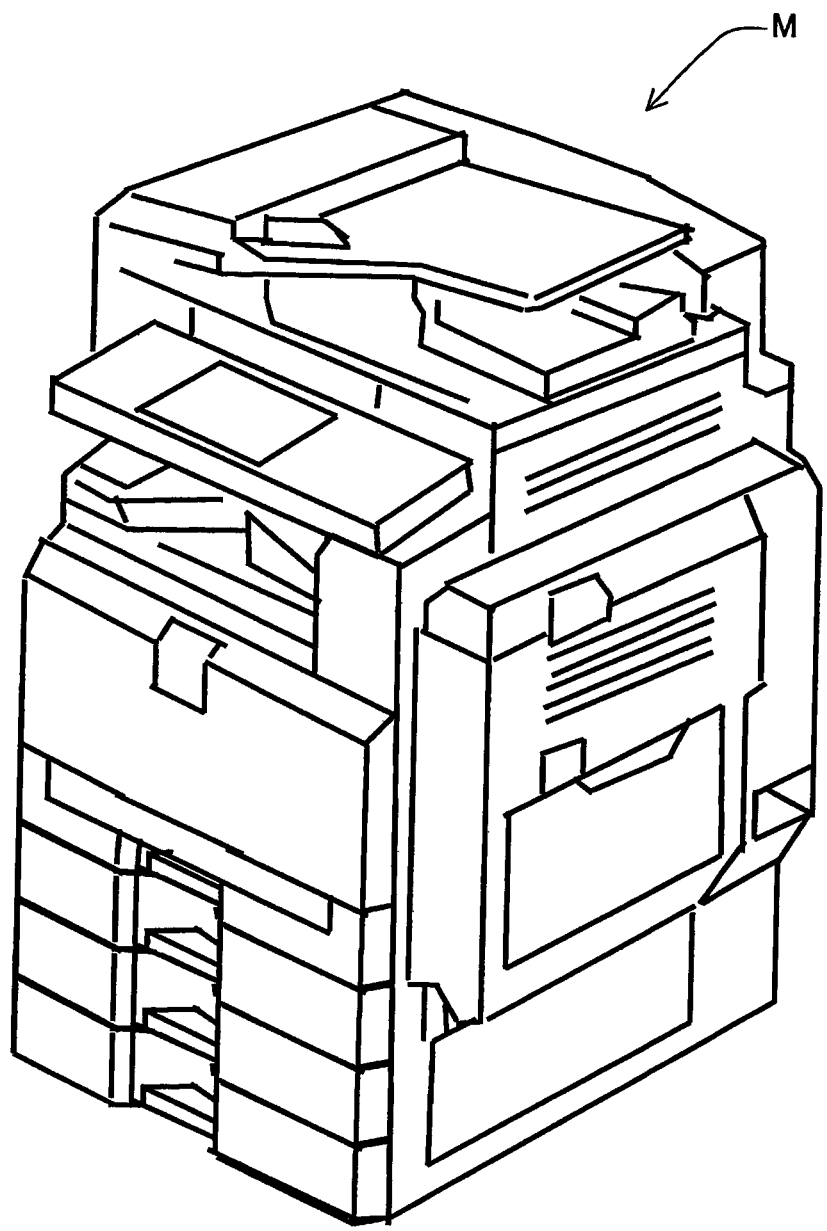
FIG. 37 is a diagram (version 1) illustrating a multifunction peripheral M.

The RFID system 10 is adopted to an assembly line for manufacturing a multifunction peripheral M (cf. FIG. 37).

Figure 38:
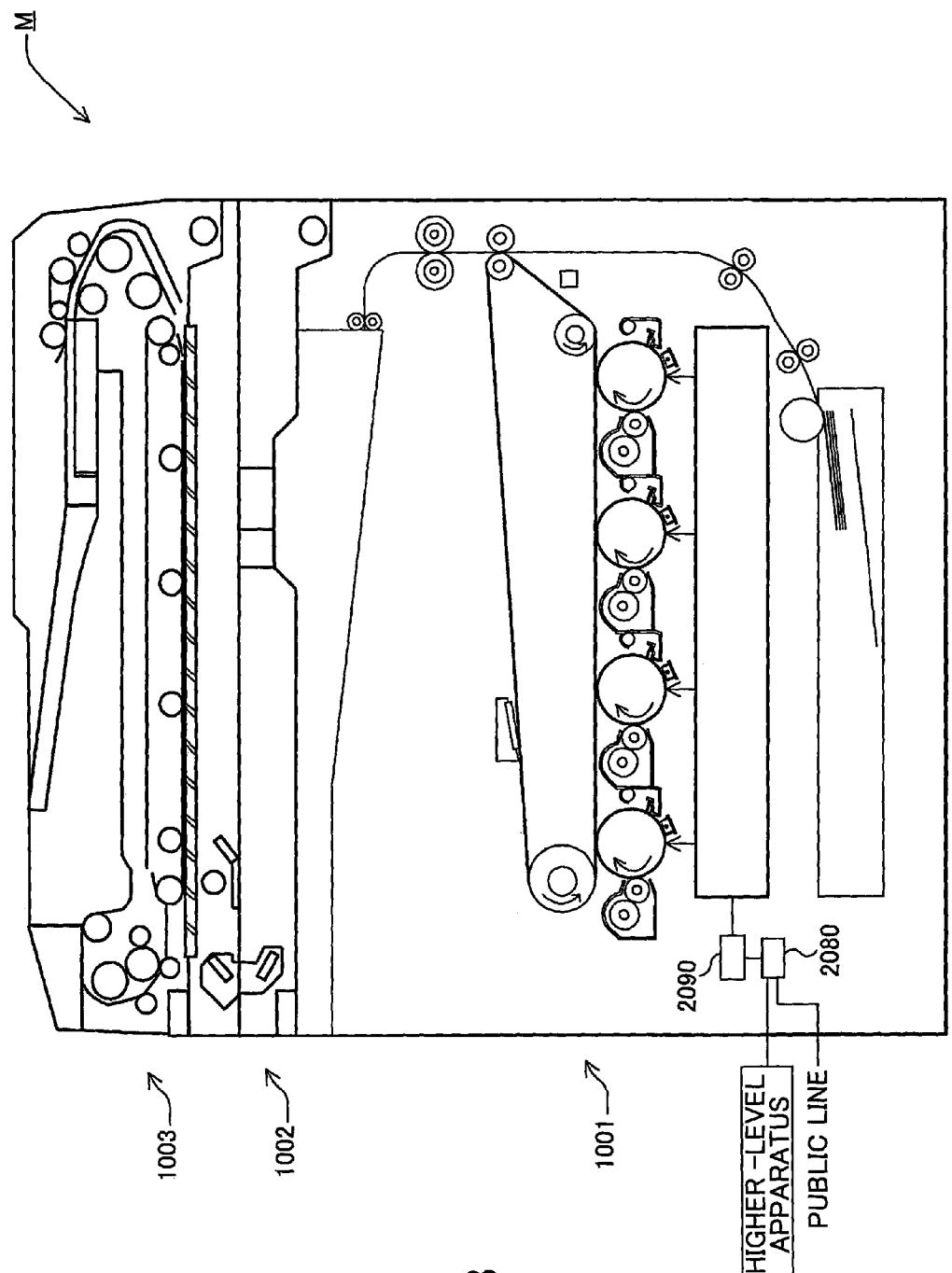
FIG. 38 is a diagram (version 2) illustrating the multifunction peripheral M.

The multifunction peripheral M includes functions of a copier, a printer, and a facsimile machine. For example, as shown in FIG. 38, the multifunction peripheral M includes a main body device 1001; a reading device 1002; and an automatic document feeder 1003.

The main body device 1001 is a tandem-type multi-color printer that forms a full color image by superposing four color images of a black image, a cyan image, a magenta image, and a yellow image. The main body device 1001 includes an optical scanner; four photosensitive drums; four cleaning units; four charging devices; four developing rollers; an intermediate transfer belt; a transfer roller; a fixing roller; a paper feeding tray; a paper discharging tray; a communication control device 2080; and a main control device 2090 that integrally controls the above-described components.

The reading device 1002 is disposed above the main body device 1001, and the reading device 1002 reads a document. Namely, the reading device 1002 is a scanner. Here, the image information of the document that has been read by the reading device 1002 is transmitted to the main control device 2090.

The automatic document feeder 1003 is disposed above the reading device 1002, and the automatic document feeder 1003 sends out a document that has been set toward the reading device. The automatic document feeder 1003 is usually referred to as an "ADF."

The communication control device 2080 controls bidirectional communication between the multifunction peripheral M and a higher-level apparatus (such as a personal computer) through a network.

The main control device 2090 includes a CPU; a ROM; a RAM; and an A/D conversion circuit. The ROM stores programs that are described in code that can be interpreted by the CPU and various types of data that are utilized for executing the programs. The RAM is a memory for processing data. The A/D conversion circuit converts analog data into digital data. The main control device 2090 transmits the image information from the reading device 1002 or from the communication control device 2080 to the optical scanner.

Referring to FIG. 36, the assembly line includes a conveyance system T and five stations (ST1-ST5) where corresponding first to fifth assembling steps are performed. Hereinafter, for convenience, a product that has been assembled at the station ST1 is referred to as "an assembly M1," a product that has been assembled at the station ST2 is referred to as "an assembly M2," a product that has been assembled at the station ST3 is referred to as "an assembly M3," a product that has been assembled at the station ST4 is referred to as "an assembly M4," and a product that has been assembled at the station ST5 is referred to as "an assembly M5."

The RFID system 10 includes a management apparatus 100, nine reader/writers (200a-200i), plural RFID tags 500, and data transmission lines. The management apparatus 100 and the nine reader/writers (200a-200i) are connected through the data transmission lines.

Structures of the plural RFID tags are the same, but each of the RFID tags stores a unique identification (ID) number. Since it is not necessary to distinguish the plural RFID tags, hereinafter, the RFID tags are collectively referred to as the RFID tag 500. Details of the RFID tag 500 will be described later.

At the station ST1, the RFID tag 500 is attached to a metal plate P of the assembly M1. The metal plate P is a part of a chassis that stores the main control device 2090 of the multifunction peripheral M.

Hereinafter, the second embodiment is explained while assuming that a direction perpendicular to a plate surface of the metal plate P is the Z-axis direction in the XYZ three-dimensional orthogonal coordinate system. Further, it is assumed that a surface of the metal plate P at the −Z side is a part of an inner surface of the chassis, and that the main control device 2090 is disposed at the −Z side of the metal plate P.

As shown in FIG. 39, for example, the metal plate P includes a slit SLT and two screw holes. A longitudinal direction of the slit SLT corresponds to a Y-axis direction, and the short direction of the slit SLT corresponds to an X-axis direction. The two screw holds for attaching the RFID tag 500 to the metal plate P have been formed in advance.

When the length (the length in the longitudinal direction) Ly of the slit SLT is equal to a half of a wavelength $\lambda$ of a radio wave that is utilized in the RFID system, a voltage that is induced between both ends of the slit SLT in an X-axis direction is maximized. The voltage is induced by receiving the radio wave. For example, when the frequency of the radio wave is 950 MHz, the length Ly is 160 mm.

The width (the length in the short direction) Lx of the slit SLT relates to a frequency band width, within which the slit SLT can obtain a desired gain (a good antenna performance) as an antenna. Namely, as the width Lx becomes smaller, the frequency band width, within which the desired gain can be obtained, becomes smaller. Conversely, as the width Lx becomes greater, the frequency band width, within which the desired gain can be obtained, becomes greater. However, as the width Lx becomes greater, impedance becomes greater. Accordingly, the efficiency of the antenna is lowered.

In general, the slit SLT is formed by a punching process using metal molds. The slit SLT is shaped by a secondary process depending on necessity. In this case, when the width Lx is too small, it is difficult to form the slit SLT having the desired width with a predetermined accuracy. Therefore, the slit SLT may be formed by laser processing. However, in this case, the cost may become higher. Furthermore, when the width Lx is too small, a foreign material such as a metal piece may be caught in the slit SLT, and it is possible that the antenna performance is degraded. Therefore, when the frequency of the radio wave is 950 MHz, the width Lx is preferably set to be within a range from 2 mm to 3 mm. In the second embodiment, when the frequency of the radio wave is 950 MHz, the slit having the length Ly of 160 mm and the width Lx of 2 mm is formed.

As for the two screw holes, one of the screw holes is formed at the −X side of the slit SLT, and the other one of the screw holes is formed at the +X side of the slit SLT. With respect to the Y-axis direction, the two screw holes are formed at the same positions. The position in the Y-axis direction of the RFID tag 500 is a position where impedance matching is achieved. The position is shifted from the center of the slit SLT.

Referring to FIG. 36, the reader/writer 200a is disposed in the vicinity of an exit of the station ST1. The reader/writer 200b is disposed in the vicinity of an entrance of the station ST2, and the reader/writer 200c is disposed in the vicinity of an exit of the station ST2.

The reader/writer 200d is disposed in the vicinity of an entrance of the station ST3, and the reader/writer 200e is disposed in the vicinity of an exit of the station ST3.

The reader/writer 200f is disposed in the vicinity of an entrance of the station ST4, and the reader/writer 200g is disposed in the vicinity of an exit of the station ST4.

The reader/writer 200h is disposed in the vicinity of an entrance of the station ST5, and the reader/writer 200i is disposed in the vicinity of an exit of the station ST5.

Each of the reader/writers 200a-200i functions as a reading device for reading information stored in the RFID tag 500, and functions as a writing device for writing information into the RFID tag 500. The space where each of the reader/writers 200a-200i can communicate with the RFID tag 500 is also referred to as the "effective communication area."

The reader/writers 200a-200i have corresponding unique device numbers. Hereinafter, the unique device number of each of the reader/writers 200a-200i is referred to as a device's own number.

When each of the reader/writers 200a-200i reads out an ID number from the RFID tag 500, the reader writer reports the ID number together with the date and time of the reading and the device's own number as the detected information to the management apparatus 100 through the data transmission lines. Hereinafter, the date and time of the reading is referred to as the detection time.

Each of the reader/writers 200a-200i writes the detection time and the device's own number into the RFID tag 500 as the history information.

The management apparatus 100 includes a CPU; a ROM; a RAM; a hard disk drive; an input device; and a display. The ROM is a memory that stores programs that are described in code that can be interpreted by the CPU and various types of data used for executing the programs. The RAM is a memory for processing data. As the management apparatus 100, a personal computer may be utilized.

The had disk drive includes a hard disk that stores information, and a disk drive that reads the information stored in the hard disk and that writes information into the hard disk in accordance with instructions from the CPU.

The input device includes at least one input medium, such as a key board, a mouse, a tablet, a light pen, and a touch panel. The input device reports various types of information input by an operator through the input medium to the CPU. The information from the input medium may be wirelessly input to the input device.

The display includes a display unit that utilizes, for example, a CRT, a liquid crystal display (LCD) and/or a plasma display panel (PDP). The display indicates various types of information instructed by the CPU. An LCD with a touch panel is an example of a device where the display and the input device are integrated.

The management apparatus 100 has a configuration such that, when a notification is received from corresponding one of the reader/writers 200a-200i, an interrupt is caused. The management apparatus 100 is connected to a higher-level apparatus (e.g., a host computer). In response to a request from the higher-level apparatus, the management apparatus 100 transmits various types of information to the higher-level apparatus.

Hereinafter, there will be explained operation of the RFID system 10. During a waiting mode, each of the reader/writers 200a-200i transmits a command signal at every predetermined timing. When one of the reader/writers 200a-200i receives a response to the command signal from the RFID tag 500, the operating mode of the one of the reader/writers 200a-200i switches to a communication mode for communicating with the RFID tag 500. When the one of the reader/writers 200a-200i does not receive any response from the RFID tag 500, the operating mode of the one of the reader/writers 200a-200i switches to the waiting mode.

First, a primary assembly process is performed at the station ST1. Subsequent to the completion of the assembly process at the station ST1, the assembly M1 is conveyed toward the station ST2 by the conveyance system T.

Figure 40:
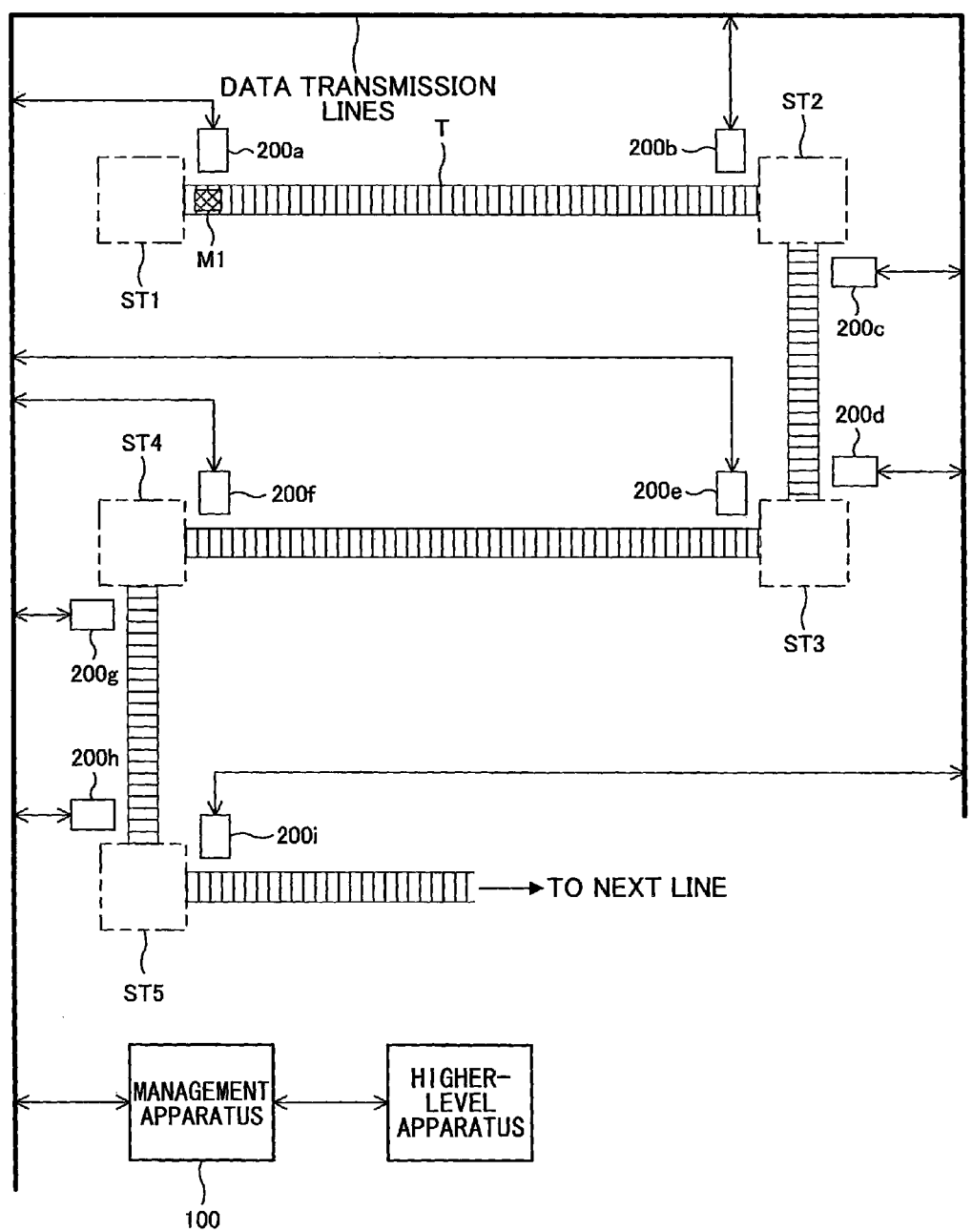
FIG. 40 is a diagram (version 1) illustrating an operation of the RFID system according to the second embodiment.
Figure 41:
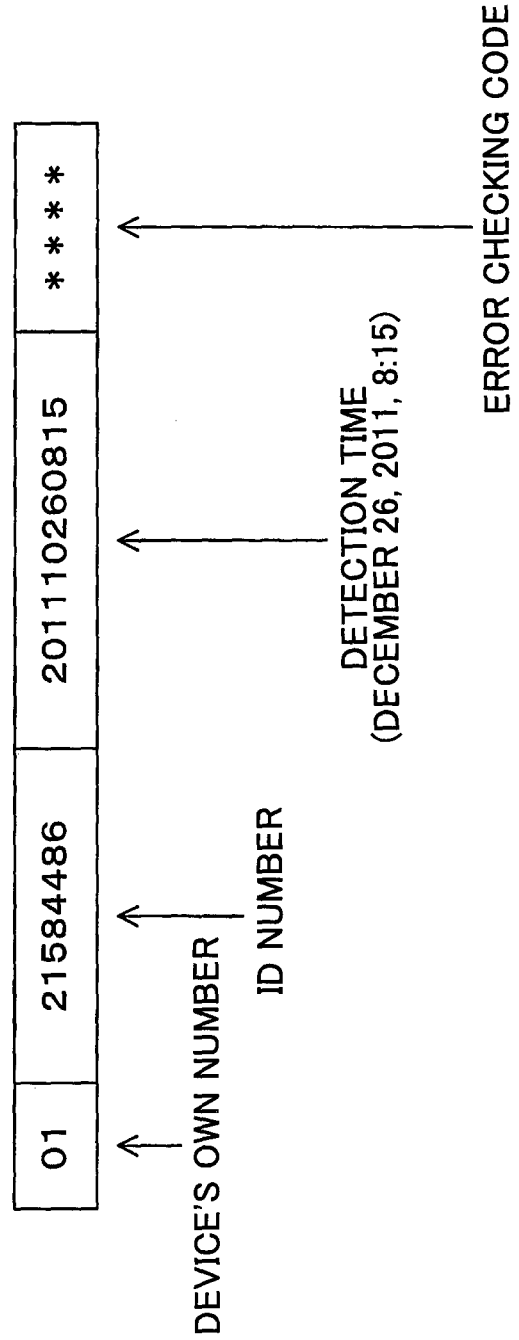
FIG. 41 is a diagram illustrating detected information according to the second embodiment.

As shown in FIG. 40, when the RFID tag 500 of the assembly M1 enters an effective communication area of the reader/writer 200a, the RFID tag 500 transmits a signal including the ID number of the RFID tag 500 in response to a command signal from the reader/writer 200a.

When the reader/writer 200a receives the signal from the RFID tag 500, the reader/writer 200a extracts the ID number included in the signal, and transmits the detected information (cf. FIG. 41) to the management apparatus 100. At the same time, the reader/writer 200a writes the history information into the RFID tag 500.

Figure 42:
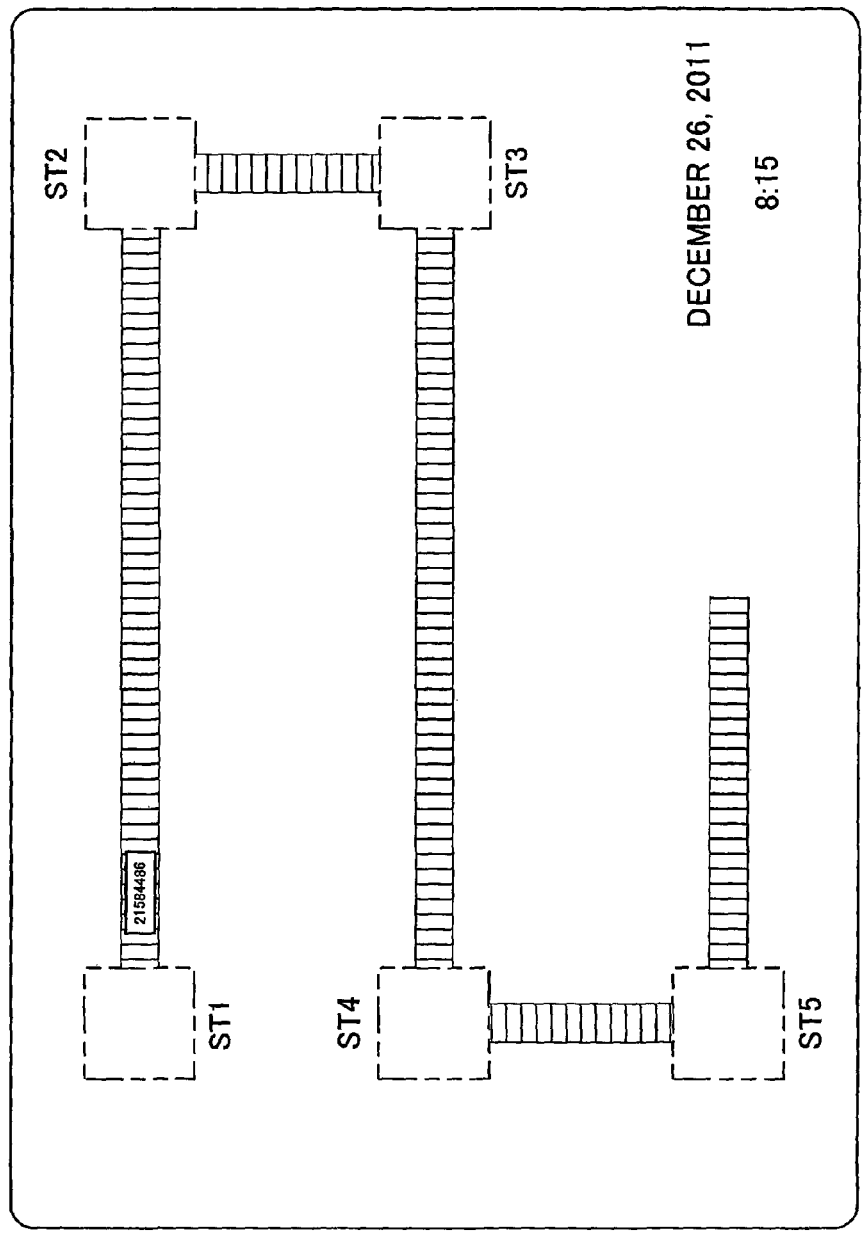
FIG. 42 is a diagram (version 2) illustrating the operation of the RFID system.

The management apparatus 100 records the received information into the hard disk, and indicates the situation on the display unit of the display (cf. FIG. 42). With this, an operator can find that the primary assembly process has been completed for the multifunction peripheral M having the ID number of "21584486."

Here, the primary assembly process for a next multifunction peripheral M is continued at the station ST1. However, for the simplicity of the explanation, the explanation will be continued while assuming that the primary assembly process for the next multifunction peripheral M is not continued at the station ST1.

When the RFID tag 500 of the assembly M1 enters an effective communication area of the reader/writer 200b, the RFID tag 500 transmits a signal including the ID number, in response to a command signal from the reader/writer 200b.

When the reader/writer 200b receives the signal from the RFID tag 500, the reader/writer 200b extracts the ID number included in the signal, and transmits the detected information to the management apparatus 100. At the same time, the reader/writer 200b writes the history information into the RFID tag 500. Here, the time included in the detection time indicates the start time of an assembly process at the station ST2.

Figure 43:
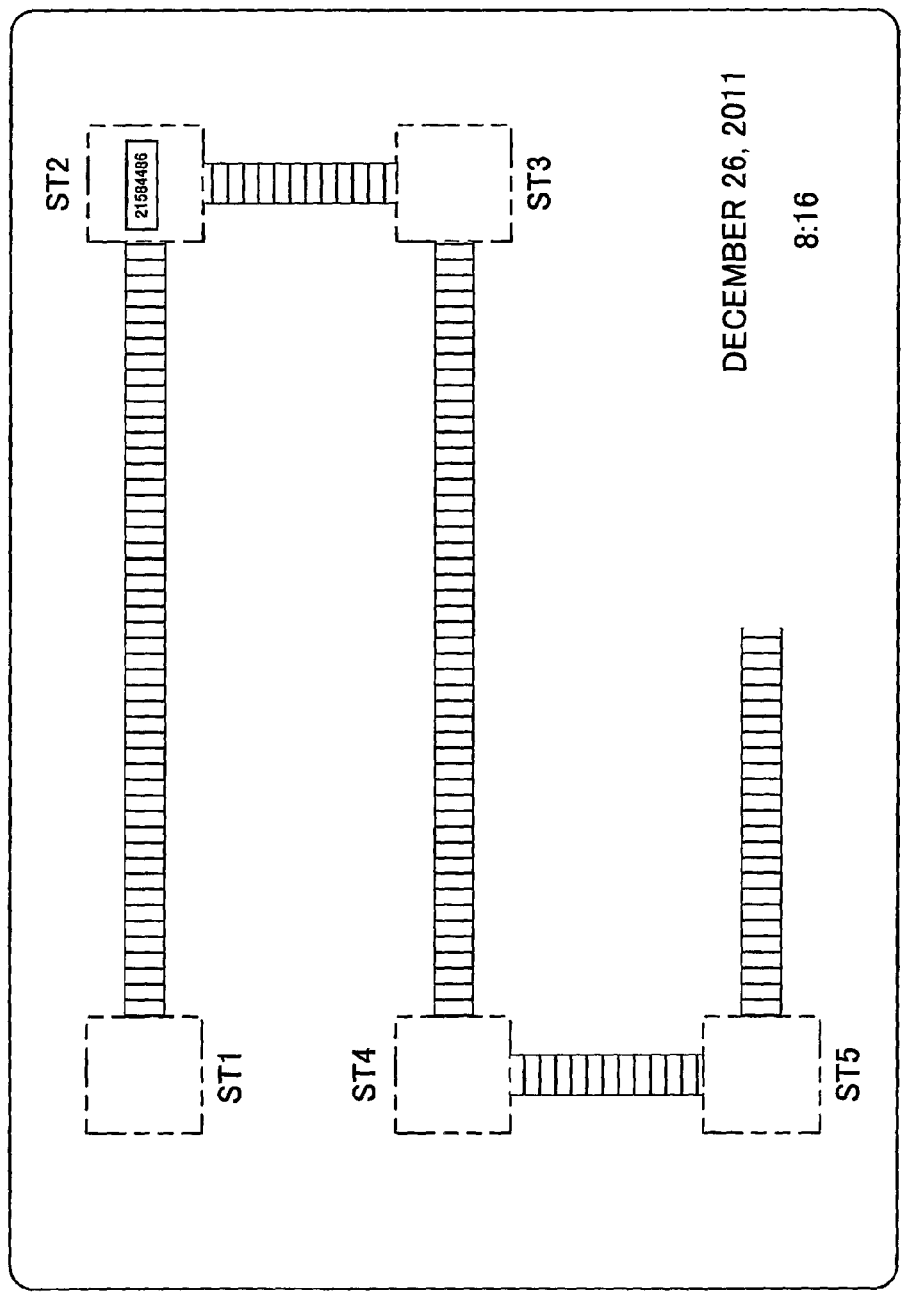
FIG. 43 is a diagram (version 3) illustrating the operation of the RFID system.
Figure 44:
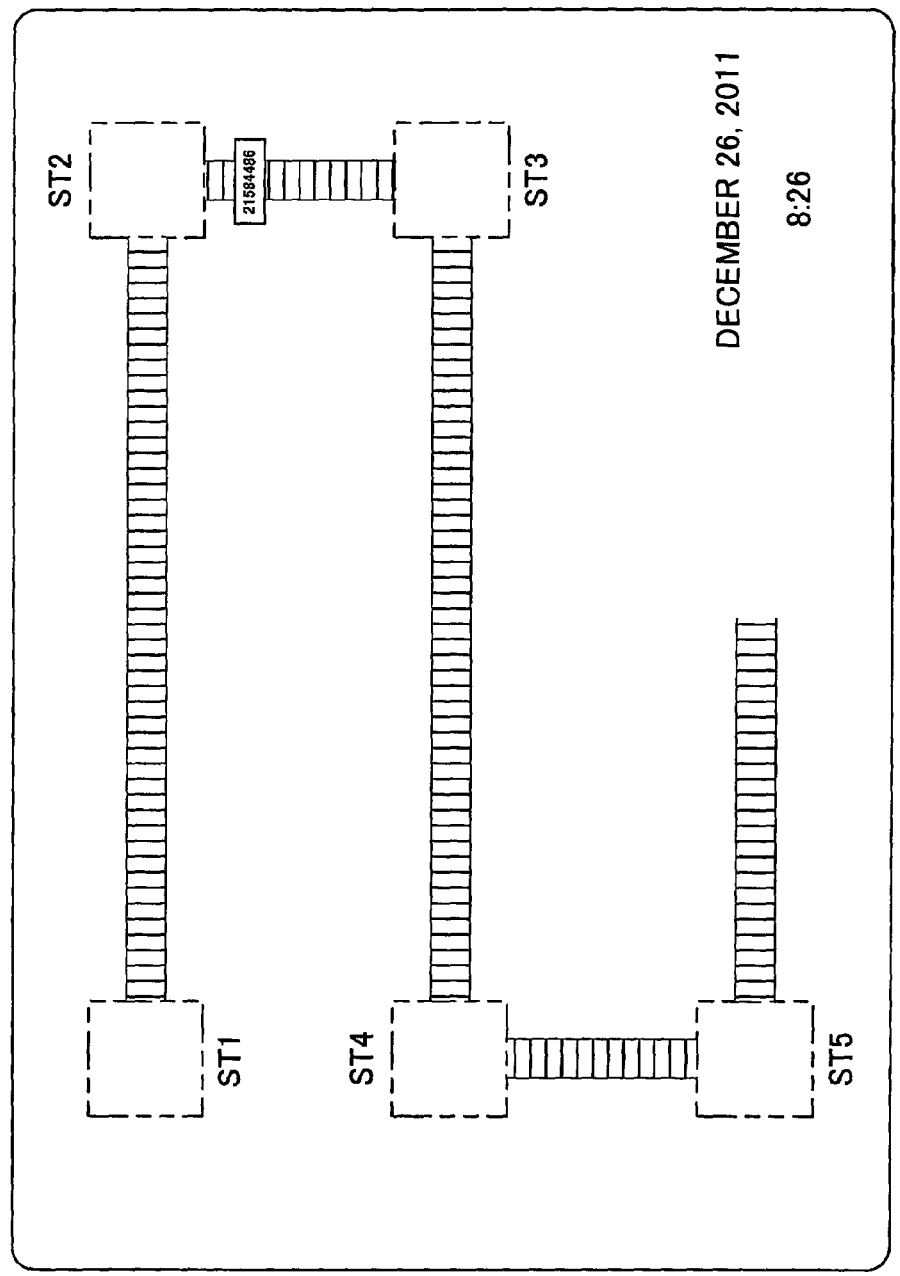
FIG. 44 is a diagram (version 4) illustrating the operation of the RFID system.

The management apparatus 100 records the received detected information into the hard disk, and causes the display unit of the display to indicate the situation (cf. FIG. 43). With this, the operator can find that the multifunction peripheral having the ID number of "21584486" is located at the station ST2.

Next, the secondary assembly process is performed at the station S 2. When the secondary assembly process is completed at the station ST2, the assembly M2 is conveyed toward the station ST3 by the conveyance system T.

When the RFID tag 500 of the assembly M2 enters the effective communication area of the reader/writer 200c, the RFID tag 500 transmits a signal including the ID number, in response to a command signal from the reader/writer 200c.

When the reader/writer 200c receives the signal from the RFID tag 500, the reader/writer 200c extracts the ID number included in the signal, and transmits the detected information to the management apparatus 100. At the same time, the reader/writer 200c writes the history information into the RFID tag 500. The detection time at this time indicates the termination time of the assembly process at the station ST2. Therefore, the time spent for the assembly process at the station ST2 (an assembly time) can be obtained from the detection time by the reader/writer 200c and the detection time by the reader/writer 200b.

The management apparatus 100 records the received detected information into the hard disk. At the same time, the management apparatus 100 causes the display unit of the display to indicate the situation (cf. FIG. 44). With this, the operator can find that the secondary assembly process has been completed for the multifunction peripheral M having the ID number of "21584486."

When the RFID tag 500 of the assembly M2 enters an effective communication area of the reader/writer 200d, the RFID tag 500 transmits a signal including the ID number, in response to a command signal from the reader/writer 200d.

When the reader/writer 200d receives the signal from the RFID tag 500, the reader/writer 200d extracts the ID number included in the signal, and reports the detected information to the management apparatus 100. At the same time, the reader/writer 200d writes the history information into the RFID tag 500. The detection time at this time indicates the start time of an assembly process at the station ST3.

The management apparatus 100 records the received detected information into the hard disk. At the same time, the management apparatus 100 causes the display unit of the display to indicate the situation. With this, the operator can find that the multifunction peripheral M having the ID number of "21584486" is located at the station ST3.

The third assembly process is performed at the station ST3. When the third assembly process at the station ST3 is completed, the assembly M3 is conveyed toward the station ST4 by the conveyance system T.

When the RFID tag 500 of the assembly M3 enters an effective communication area of the reader/writer 200e, the RFID tag 500 transmits a signal including the ID number, in response to a command signal from the reader/writer 200e.

When the reader/writer 200e receives the signal from the RFID tag 500, the reader/writer 200e extracts the ID number included in the signal, and reports the detected information to the management apparatus 100. At the same time, the reader/writer 200e writes the history information into the RFID tag 500. The detection time at this time indicates the termination time of the assembly process at the station ST3. Therefore, an assembly time at the station ST3 can be obtained from the detection time by the reader/writer 200e and the detection time by the reader/writer 200d.

The management apparatus 100 records the received detected information into the hard disk. At the same time, the management apparatus 100 causes the display unit of the display to indicate the situation. With this, the operator can find that the third assembly process has been completed for the multifunction peripheral M having the ID number of "21584486."

When the RFID tag 500 of the assembly M3 enters an effective area of the reader/writer 200f, the RFID tag 500 transmits a signal including the ID number, in response to a command signal from the reader/writer 200f.

When the reader/writer 200f receives the signal from the RFID tag 500, the reader/writer 200f extracts the ID number included in the signal, and reports the detected information to the management apparatus 100. At the same time, the reader/writer 200f writes the history information into the RFID tag 500. The detection time at this time indicates the start time of an assembly process at the station ST4.

The management apparatus 100 records the received detected information into the hard disk. At the same time, the control apparatus 100 causes the display unit of the display to indicate the situation. With this, the operator can find that the multifunction peripheral having the ID number of "21584486" is located at the station ST4.

The fourth assembly process is performed at the station ST4. When the fourth assembly process at the station ST4 is completed, the assembly M4 is conveyed toward the station ST5 by the conveyance system T.

When the RFID tag 500 of the assembly M4 enters an effective communication area of the reader/writer 200g, the RFID tag 500 transmits a signal including the ID number, in response to a command signal from the reader/writer 200g.

When the reader/writer 200g receives the signal from the RFID tag 500, the reader/writer 200g extracts the ID number included in the signal, and reports the detected information to the management apparatus 100. At the same time, the reader/writer 200g writes the history information into the RFID tag 500. The detection time at this time indicates the termination time of the assembly process at the station ST4. Therefore, an assembly time at the station ST4 can be obtained from the detection time by the reader/writer 200g and the detection time by the reader/writer 200f.

The management apparatus 100 records the received detected information into the hard disk. At the same time, the management apparatus 100 causes the display unit of the display to indicate the situation. With this, the operator can find that the fourth assembly process has been completed for the multifunction peripheral M having the ID number of "21584486."

When the RFID tag 500 of the assembly M4 enters an effective communication area of the reader/writer 200h, the RFID tag 500 transmits a signal including the ID number, in response to a command signal from the reader/writer 200h.

When the reader/writer 200h receives the signal from the RFID tag 500, the reader/writer 200h extracts the ID number included in the signal, and reports the detected information to the management apparatus 100. At the same time, the reader/writer 200h writes the history information into the RFID tag 500. The detection time at this time indicates the start time of an assembly process at the station ST5.

The management apparatus 100 records the received detected information into the hard disk. At the same time, the management apparatus 100 causes the display unit of the display to indicate the situation. With this, the operator can find that the multifunction peripheral M having the ID number of "21584486" is located at the station ST5.

The fifth assembly process is performed at the station ST5. When the assembly process at the station ST5 is completed, the assembly M5 is conveyed toward a next line by the conveyance system T.

When the RFID tag 500 of the assembly M5 enters an effective communication area of the reader/writer 200i, the RFID tag 500 transmits a signal including the ID number, in response to a command signal from the reader/writer 200i.

When the reader/writer 200i receives the signal from the RFID tag 500, the reader/writer 200i extracts the ID number included in the signal, and reports the detected information to the management device 100. At the same time the reader/writer 200i writes the history information into the RFID tag 500. The detection time at this time indicates the termination time of the assembly process at the station ST5. Therefore, an assembly time at the station ST5 can be obtained by the detection time by the reader/writer 200i and the detection time by the reader/writer 200h.

The management apparatus 100 records the received detected information into the hard disk. At the same time, the control apparatus causes the display unit of the display to indicate the Situation. With this, the operator can find that the fifth assembly process has been terminated for the multifunction apparatus M having the ID number of "21584486."

In this manner, in the RFID system 10, the operator can find a processing state of the multifunction peripheral M in real time. Further, in the RFID system 10, the operator can find the assembly time in each of the stations ST1-ST5 in real time.

In this case, the congestion of the products under processing can be avoided by allocating workforces so that the assembly time in each of the stations ST1-ST5 becomes substantially the same. Therefore, the multifunction peripheral M can be efficiently assembled.

Figure 45:
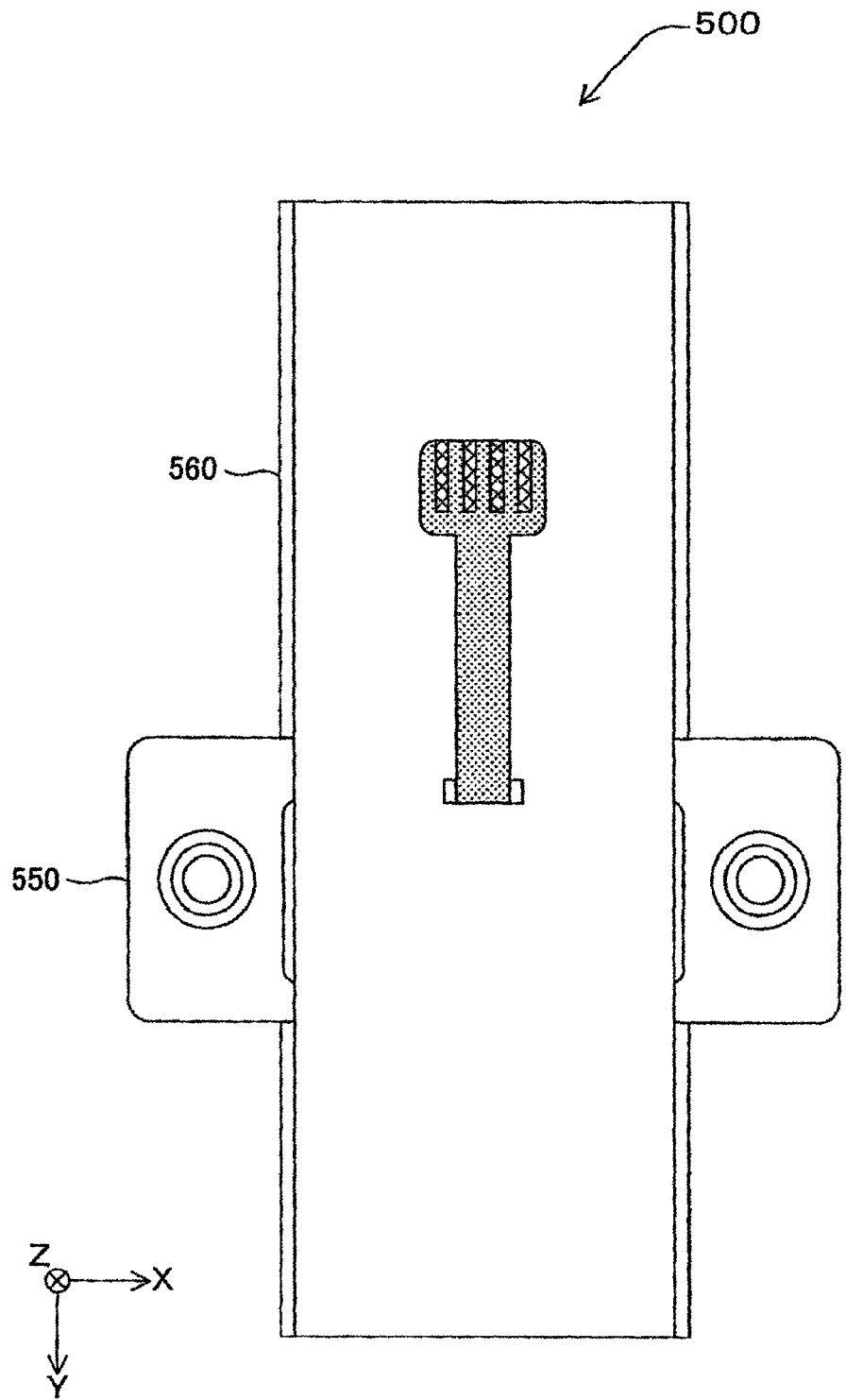
FIG. 45 is a diagram (version 1) illustrating an RFID tag according to the second embodiment.
Figure 46:
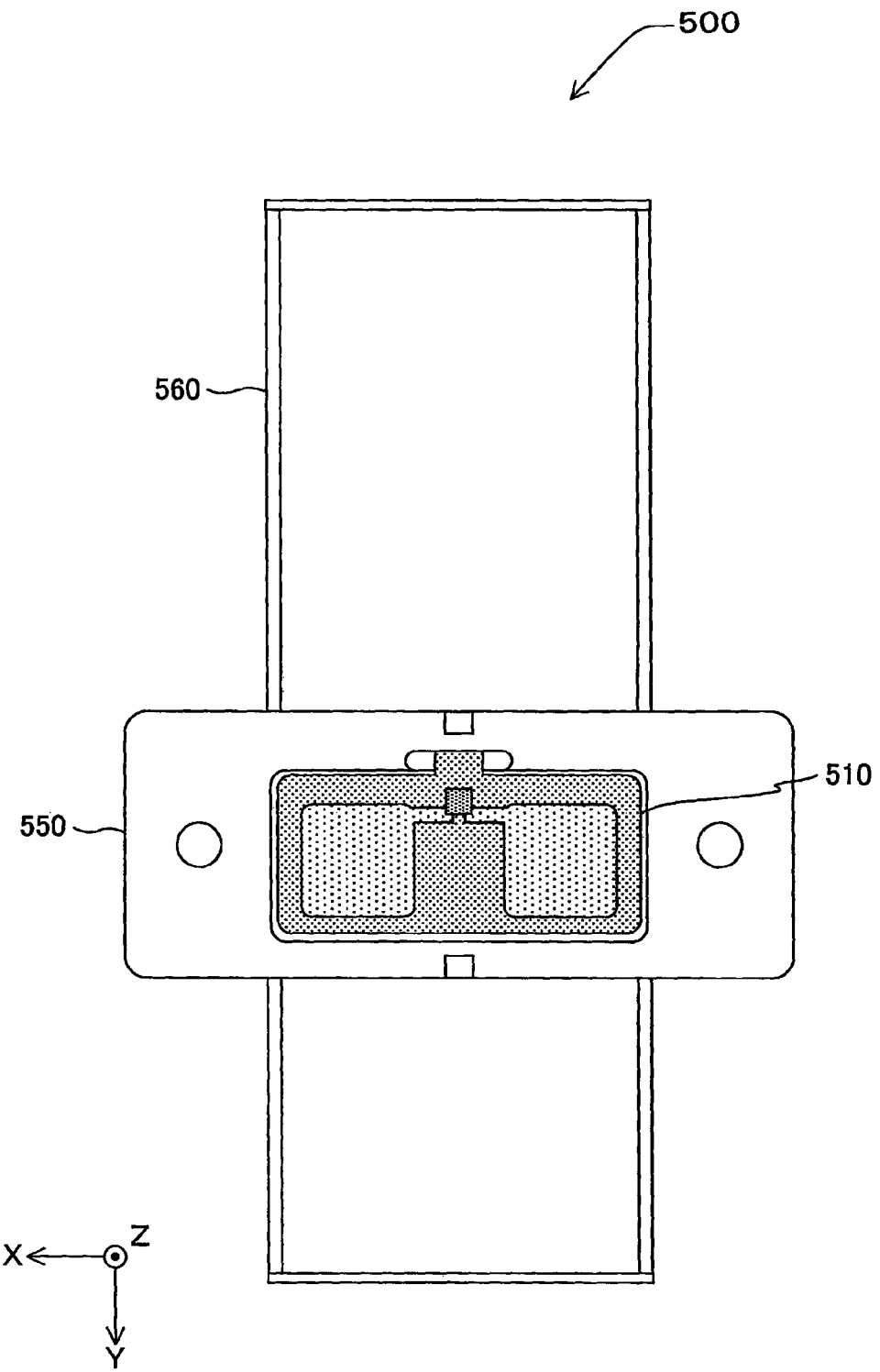
FIG. 46 is a diagram (version 2) illustrating the RFID tag.

Next, the RFID tag 500 will be explained in detail. As shown in FIGS. 45 and 46, the chip module 510 includes a holding member 550 and a shield member 560.

Figure 47:
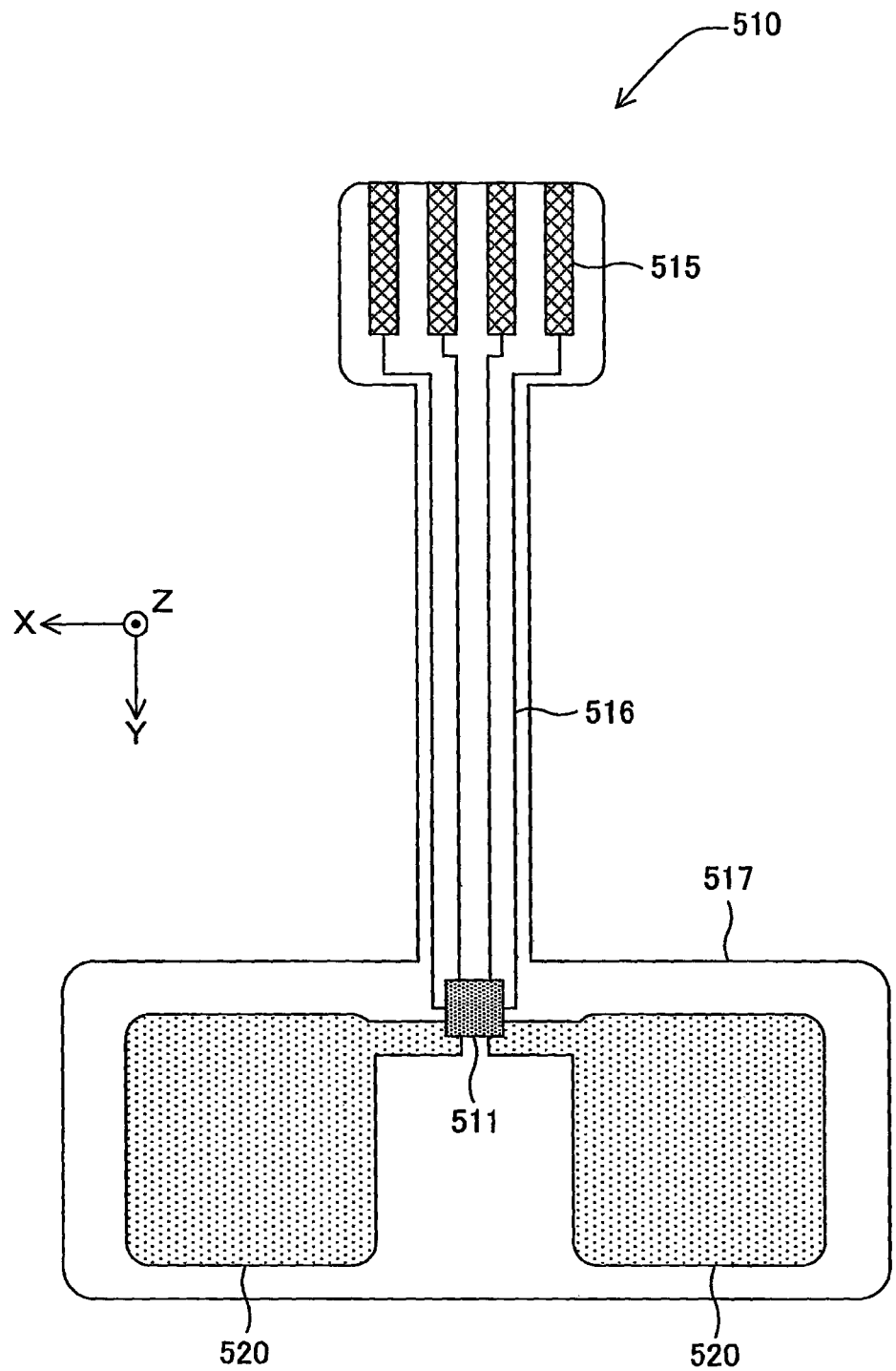
FIG. 47 is a diagram (version 1) illustrating a chip module according to the second embodiment.

As shown in FIG. 47, for example, the chip module 510 includes an IC chip 511 and two terminal members 520.

The IC chip 511 is a so-called "dual interface IC chip," and the IC chip 511 includes six terminals.

The four external terminals 515 are I/O terminals for reading and writing data through wired connection (serial transmission).

Figure 48:
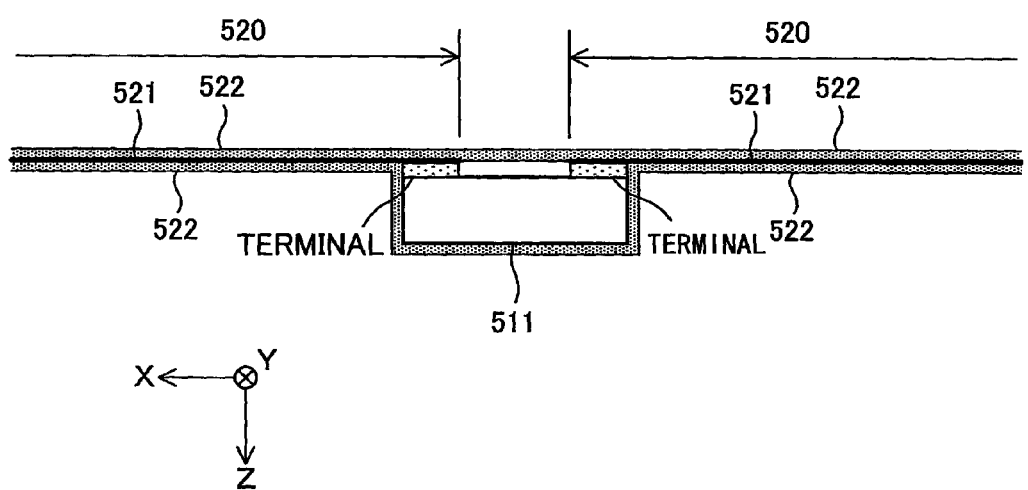
FIG. 48 is a diagram (version 2) illustrating the chip module.
Figure 49B:
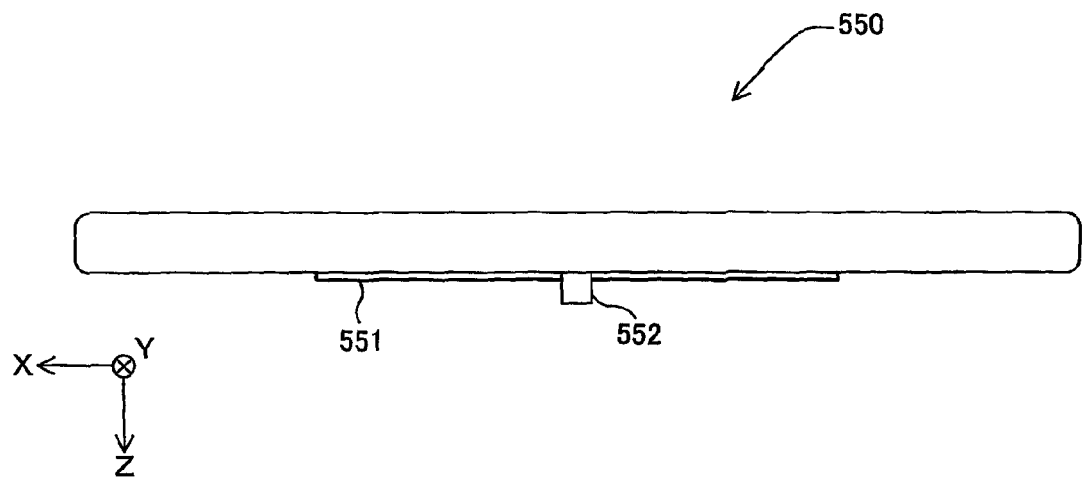
Figure 50A:
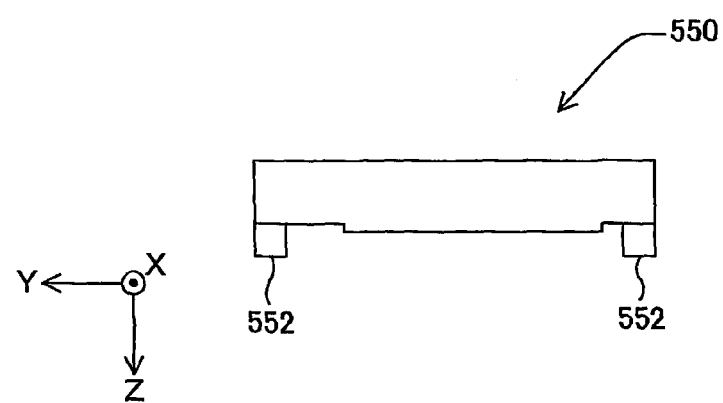

As shown in FIG. 48, for example, each of the terminal members 520 includes a thin metal film (aluminum foil) 521; and resin films 522 that are laminated on both sides of the thin metal film 521. The resin film 522 functions as an isolator disposed between the metal plate P and the thin metal film 521. Additionally, the resin films 522 function as protecting films for protecting the thin metal film 521 from pollution and damage.

The IC chip 511, the wiring member 516, the four external terminals 515 and the two terminal members 520 are fixed on a flexible isolation sheet 517 (cf. FIG. 47).

For example, as shown in FIGS. 49A, 49B, 50A, and 50B, the holding member 550 is a planer member formed of a ceramic material or a resin material. The holding member 550 has a substantially rectangular shape.

Figure 51:
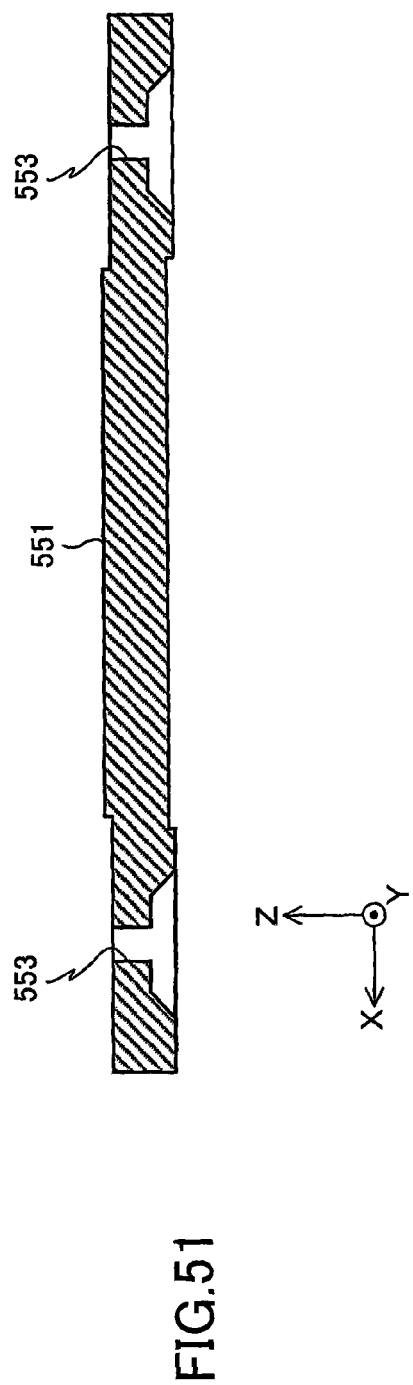
FIG. 51 is a diagram showing an A-A cross-section of FIG. 49A.

The holding member 550 includes two through holes 553, into which corresponding screws are inserted. One of the through holes 553 is formed in the vicinity of an edge in the X-axis direction of the holding member 550, and the other through hole 553 is formed in the vicinity of the other edge in the X-axis direction. As shown in FIG. 51, for example, at the end portions of the through holes 553 in the −Z side, counter boring has been performed so that the corresponding heads of the screws can be embedded. FIG. 51 is the A-A cross-sectional view of FIG. 49A.

Figure 52:
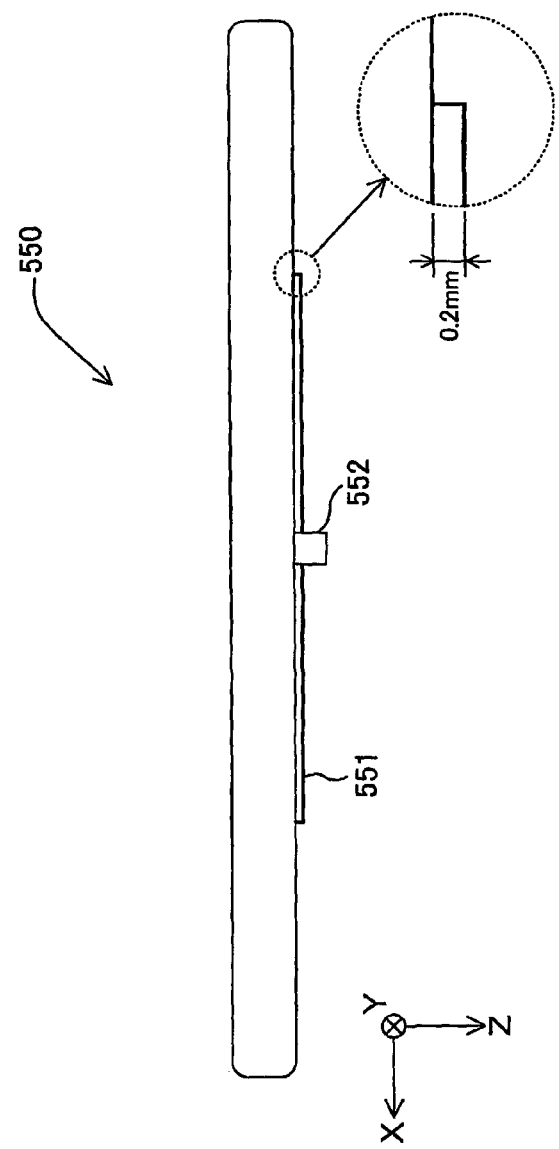
FIG. 52 is a diagram (version 3) illustrating the holding member.

The holding member 550 includes a planer portion 551 disposed at a center portion of the surface of the holding member 550 at the +Z side. The chip module 510 is attached to the planer portion 551. As shown in FIG. 52, for example, the planer portion 551 protrudes by about 0.2 mm relative to the surrounding portion.

Referring to FIG. 49A, protrusions 552 are disposed at the +Y side of the planer portion 551 and the −Y side of the planer portion 551, respectively. The protrusions 552 function to align the RFID tag 500, when the RFID tag 500 is attached to the metal plate P. Further, the protrusions 552 function to prevent the metal plate P from being twisted, when the RFID tag 500 is attached to the metal plate P. Especially, the protrusions 552 are quite effective to prevent twisting, when self tapping screws are utilized to attach the RFID tag 500 to the metal plate P. Further, the protrusions 552 function to protect the IC ship 511 from being collided with an object and being damaged.

Further, an window 554 has been formed at the +Y side of the planer portion 551 so that the four external terminals 515 of the chip module 510 are pulled out toward the −Z side of the holding member 550 together with the isolation sheet 517 (cf. FIG. 45).

A seal is adhered to the center portion of the surface of the holding member 550 at the −Z side. For example, the name of the product is printed on the seal.

Figure 53A:
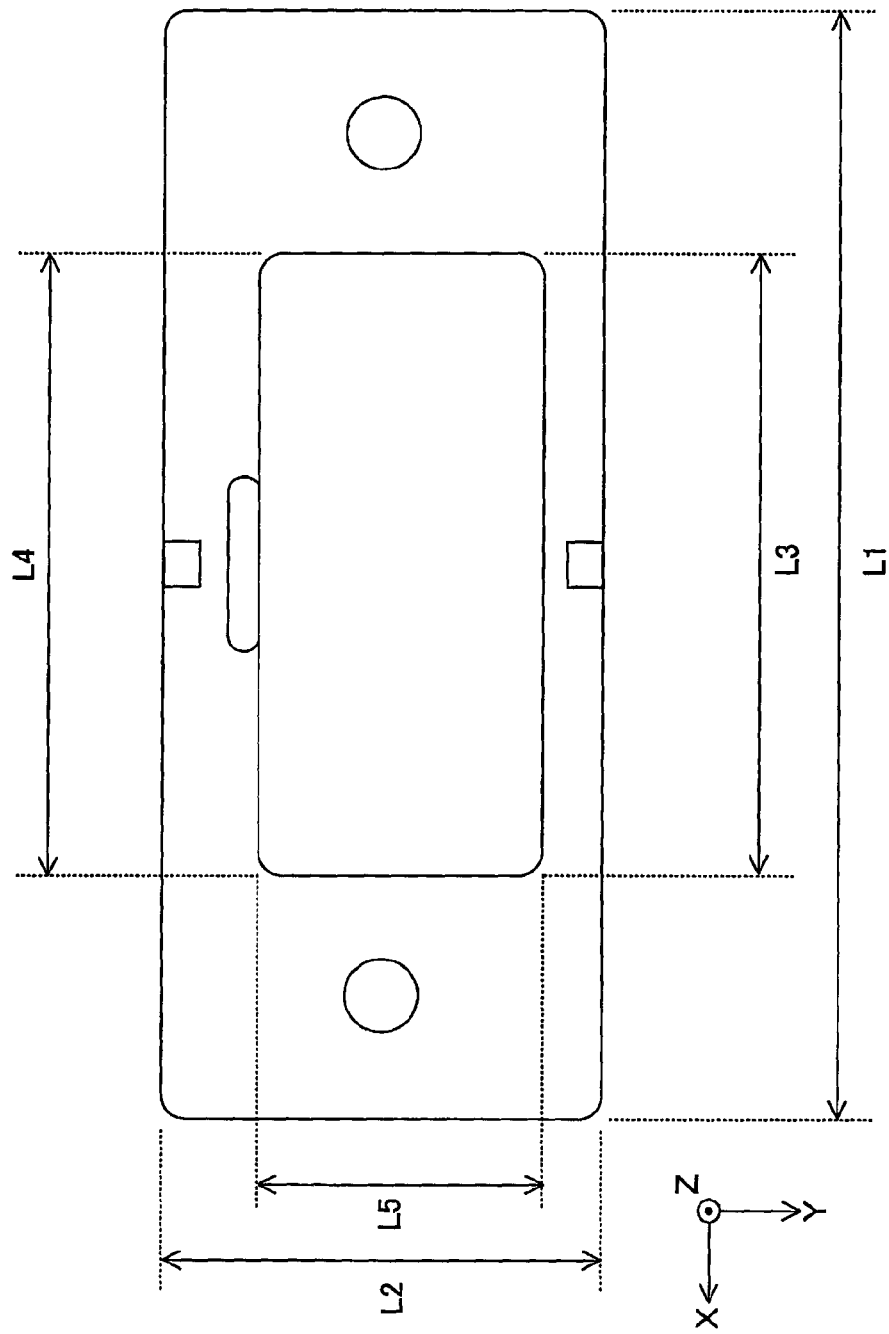

Hereinafter, there will be explained a specific example of dimensions of the holding member 550 by referring to FIGS. 53A-53C. Here, it is assumed that the frequency of the radio wave that is utilized for the communication is 950 MHz.

The holding member 550 has a length L1 of 55 mm in the X-axis direction, and a length L2 of 20 mm in the Y-axis direction. A distance between the centers of the two through holes 553 in the X-axis direction is 40 mm. The planer portion 551 has a length L4 of 35 mm in the X-axis direction, and a length L5 of 14 mm in the Y-axis direction.

The holding member 550 has a length L6 of 5 mm in the Z-axis direction. Each of the protrusions 552 has a length L7 of 1.8 mm in the X-axis direction, a length L8 of 2 mm in the Z-axis direction, and a length L9 of 2 mm in the Y-axis direction. The length L7 in the X-axis direction of each of the protrusions 552 is defined to be slightly smaller than the width Lx of the slit SLT. Such a configuration facilitates the alignment in the X-axis direction, when the RFID tag 500 is attached to the metal plate P. The value of the length L9 in the Y-axis direction of each of the protrusions 552 is not strictly defined. However, if the value is too small, it is possible that the protrusions 552 are broken. Further, a diameter of each of the through holes 553 is 3.5 mm.

A transmissible distance depends on sizes of the thin metal films 521 of the corresponding terminal members 520 and thickness of the isolator such as the protection layer and the adhesive layer disposed between the thin metal films 521 and the metal plate P. Namely, the transmissible distance can be extended by lowering the capacitive coupling impedance Z. The capacitive coupling impedance Z can be lowered by adjusting the sizes of the thin metal films 521 depending on the thickness of the isolator.

The impedance Z can be expressed by the formula (1) below.

$$Z = 1/(\omega \cdot C) \tag{1}$$

In the formula (1), $\omega$ is an angular frequency, and C is a capacitance. The angular frequency $\omega$ is expressed by the formula (2) below, and the capacitance C is expressed by the formula (3) below.

$$\omega = 2\pi f \tag{2}$$

$$C = S \cdot \epsilon_0 \cdot \epsilon_r / d \tag{3}$$

Here, f is a frequency of the radio wave that is utilized for the communication, S is an area of the thin metal film 521, $\epsilon_0$ is the dielectric constant of vacuum, $\epsilon_r$ is a dielectric constant of the isolator, and d is the thickness of the isolator.

The formula (1) can be rewritten as the formula (4) below.

$$Z = d/(2\pi f \cdot S \cdot \epsilon_0 \cdot \epsilon_r) \tag{4}$$

The electric power W supplied from the terminal members 520 to the IC chip 511 can be expressed by the formula (5) below.

$$W = Wa - 2 \cdot V \cdot A = Wa - 2 \cdot V^2/Z \tag{5}$$

In the formula (5), Wa is the electric power induced between the edges in the X-axis direction of the slit SLT during the communication, V is a voltage induced between the edges in the X-axis direction of the slit SLT during the communication, and A is a current supplied from the two terminal members 520 to the IC chip 511. Namely, the electric power supplied to the IC chip 511 is obtained by subtracting the electric power consumed by the connecting portion (the portion of the isolator) from the electric power induced at the antenna.

When the electric power required to realize a desired communication range is defined to be Wmin, the area S of each of the thin metal films 521 is adjusted so that the inequality (6) below is satisfied.

$$W\mathrm{min} \leq Wa - 2 \cdot V^2/Z = Wa - 4\pi f \cdot S \cdot \epsilon_0 \cdot \epsilon_r \cdot V^2/d \tag{6}$$

Here, Wmin is a value that is uniquely determined when the type of the IC chip to be utilized and the desired communication range are determined.

For example, for a case where f is 950 MHz, the isolator is polyethylene-telephthalate (PET), and d is 20 μm, the formula (6) is satisfied if S is equal to 100 mm$^2$.

Therefore, in the second embodiment, a PET film having thickness of 20 μm is utilized as the resin film 522. As shown in FIG. 54, for example, each of the thin metal films 521 has a substantially square shape with a side length L10 of 10 mm. When a non-conductive protection material is applied to or laminated on the surface of the metal plate P, the thickness of the resin film 522 is determined depending on the type and the thickness of the protection material. For example, when the protection material is the PET film, the total of the thickness of the protection material and the thickness of the resin film 522 is 20 μm.

Figure 55A:
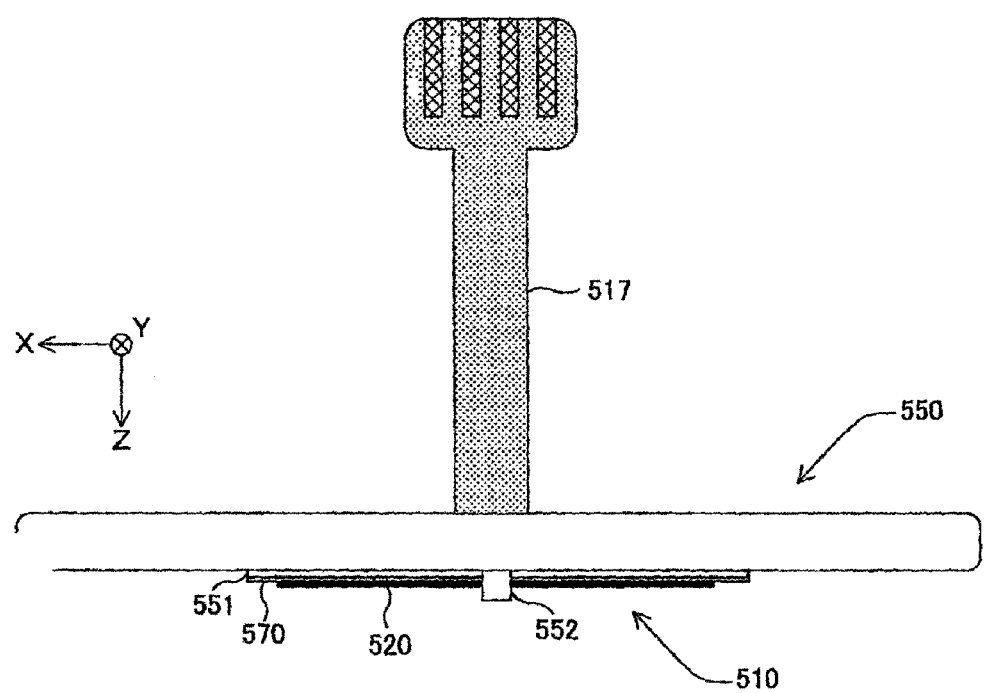
FIGS. 55A and 55B are diagrams (version 1) illustrating a state where the chip module is attached to the holding member.
Figure 55B:
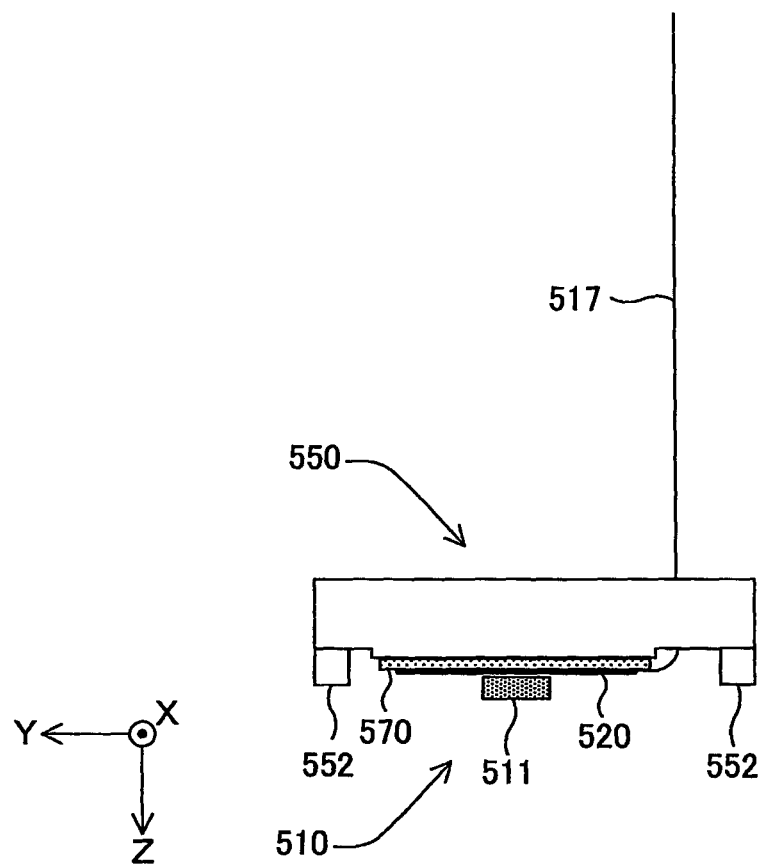

As shown in FIGS. 55A and 55B, for example, the chip module 510 is attached to the holding member 550 through a sponge 570.

Figure 56:
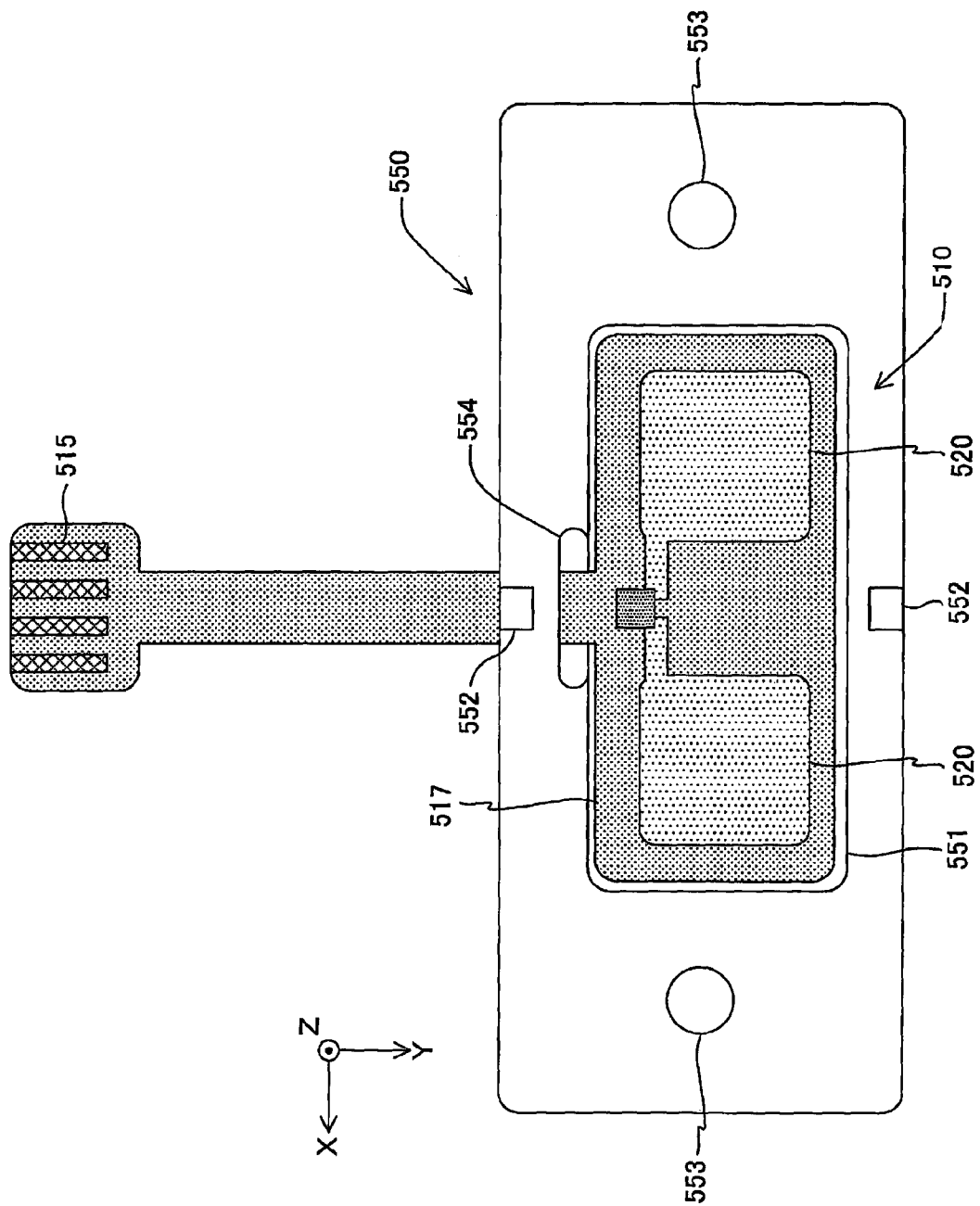
FIG. 56 is a diagram (version 2) illustrating the state where the chip module is attached to the holding member.

FIG. 56 shows a state where the chip module 510 is attached to the holding member 550.

Referring to FIG. 45, the shield member 560 is attached to the surface of the holding member 550 at the −Z side. Here, as the shield member 560, an aluminum plate is utilized.

As shown in FIG. 57A, for example, the shield member 560 has a rectangular shape, where the Y-axis direction corresponds to the longitudinal direction and the X-axis direction corresponds to the short direction. End portions of the shield member 560 are folded toward the +Z direction. However, as shown in FIG. 57B, for example, the folded portions that face the holding member 550 have been cut out. Further, the shield member 560 includes an opening 562 that has been formed so that the four external terminals 515 can be pulled out together with the isolation sheet 517.

Figure 58A:
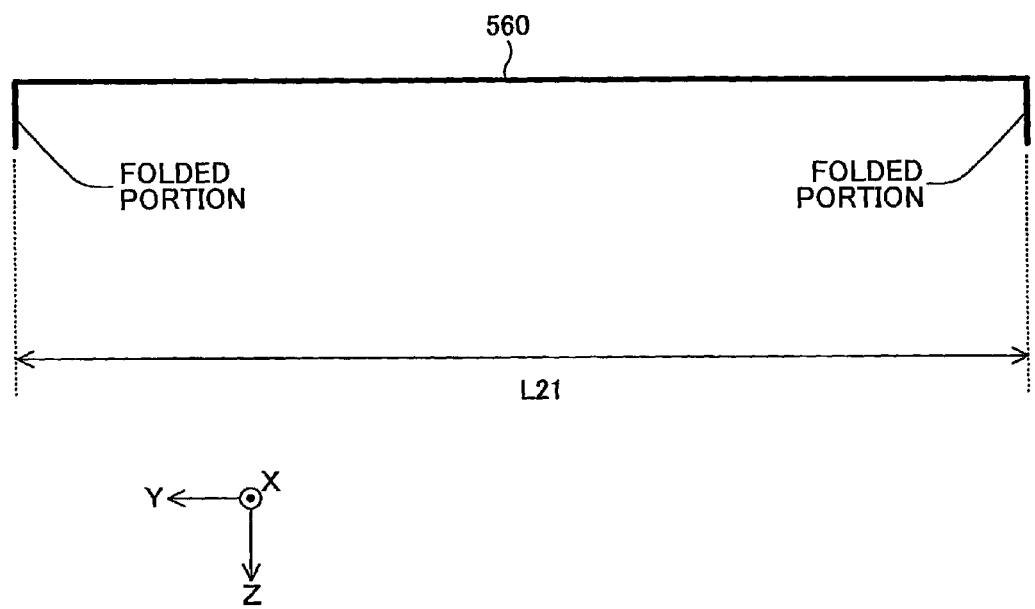
FIG. 58A is a diagram showing an A-A cross section of FIG. 57A.
Figure 58B:
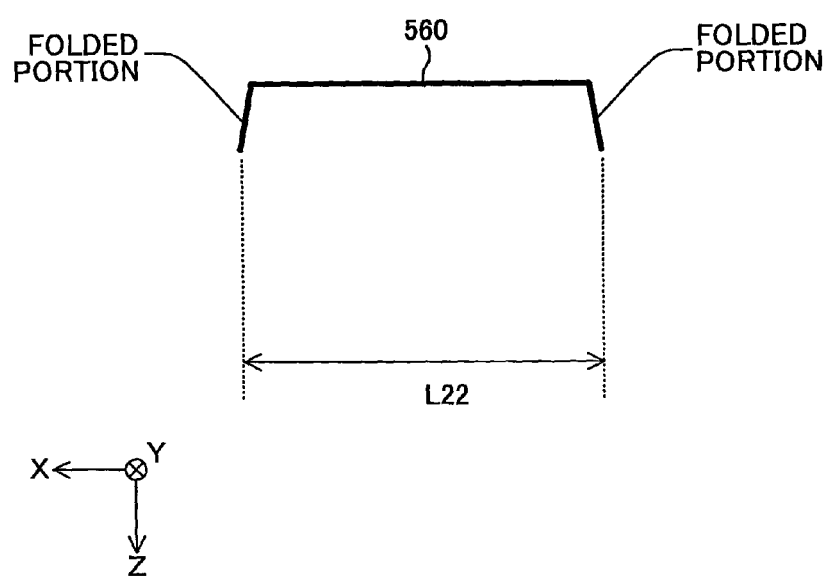
FIG. 58B is a diagram showing a B-B cross section of FIG. 57A.

FIG. 58A shows the shape of the A-A cross-section of FIG. 57A. FIG. 58B shows the shape of the B-B cross-section of FIG. 57A. A length L21 in the Y-axis direction of the shield member 560 has a value that is obtained by adding 2 cm to the Ly. Further, a length L22 in the X-axis direction of the shield member 560 is 35 mm.

Figure 59B:
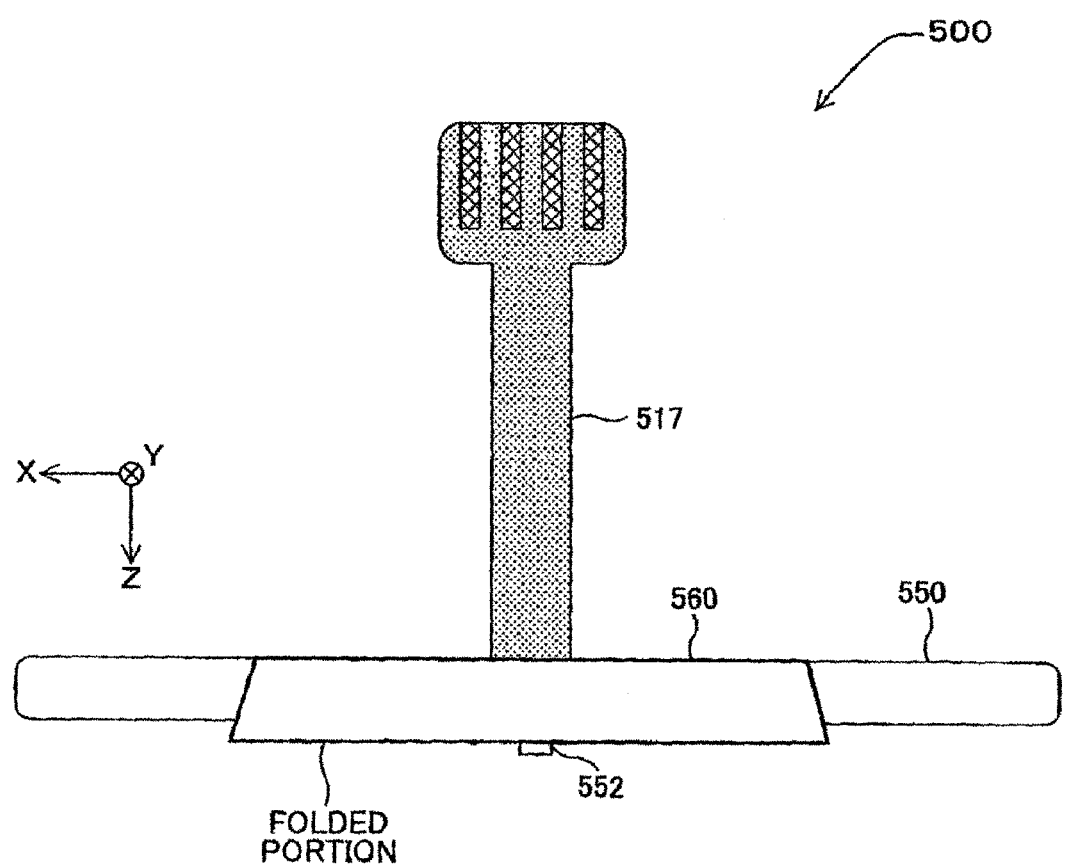

FIGS. 59A and 59B show a state where the shield member 560 is attached to the holding member 550.

Next, there will be explained an attachment method of attaching the RFID tag 500 to the metal plate P by an operator at the station ST1.

(1) Hold the RFID tag 500 so that the longitudinal direction of the holding member 550 intersects perpendicular to the longitudinal direction of the slit SLT of the metal plate P.

(2) Place the RFID tag 500 closer to the −Z side of the metal plate P, so that the RFID tag 500 is attached to the −Z side of the metal plate P.

(3) Insert the two protrusions 552 of the holding member 550 into the slit SLT.

(4) After the two protrusions 552 have been inserted into the slit SLT, move the RFID tag 500 in the Y-axis direction so that the through holes of the holding member 550 are placed at the −Z side of the corresponding screw holes of the metal plate P.

(5) Insert the screws into the corresponding through holes of the holding member 550.

(6) Push the screws into the corresponding screw holes of the metal plate P using a tool (a screwdriver).

Figure 60:
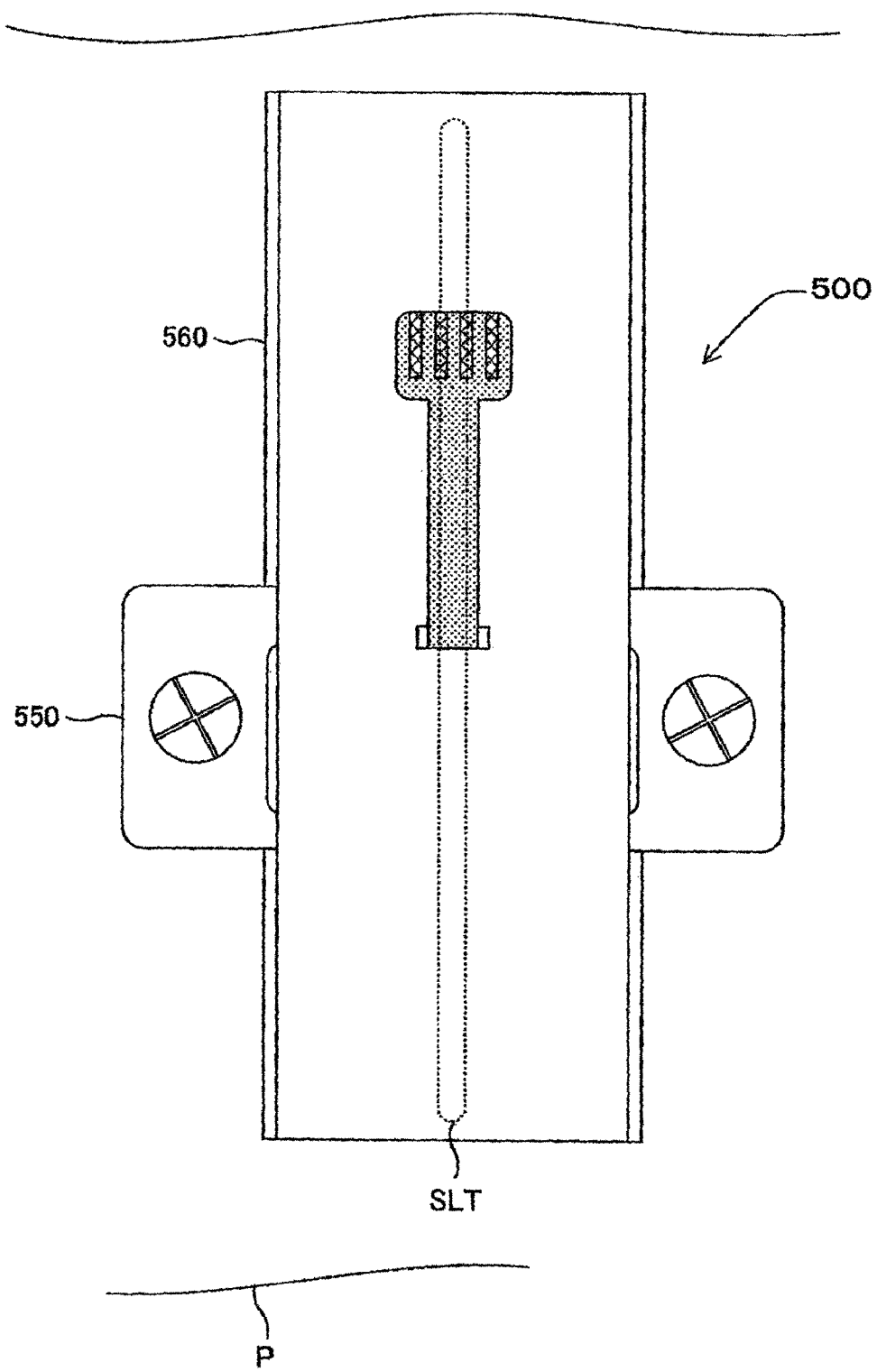
FIG. 60 is a diagram (version 1) illustrating a state where the RFID tag is attached to the metal plate P.
Figure 61:
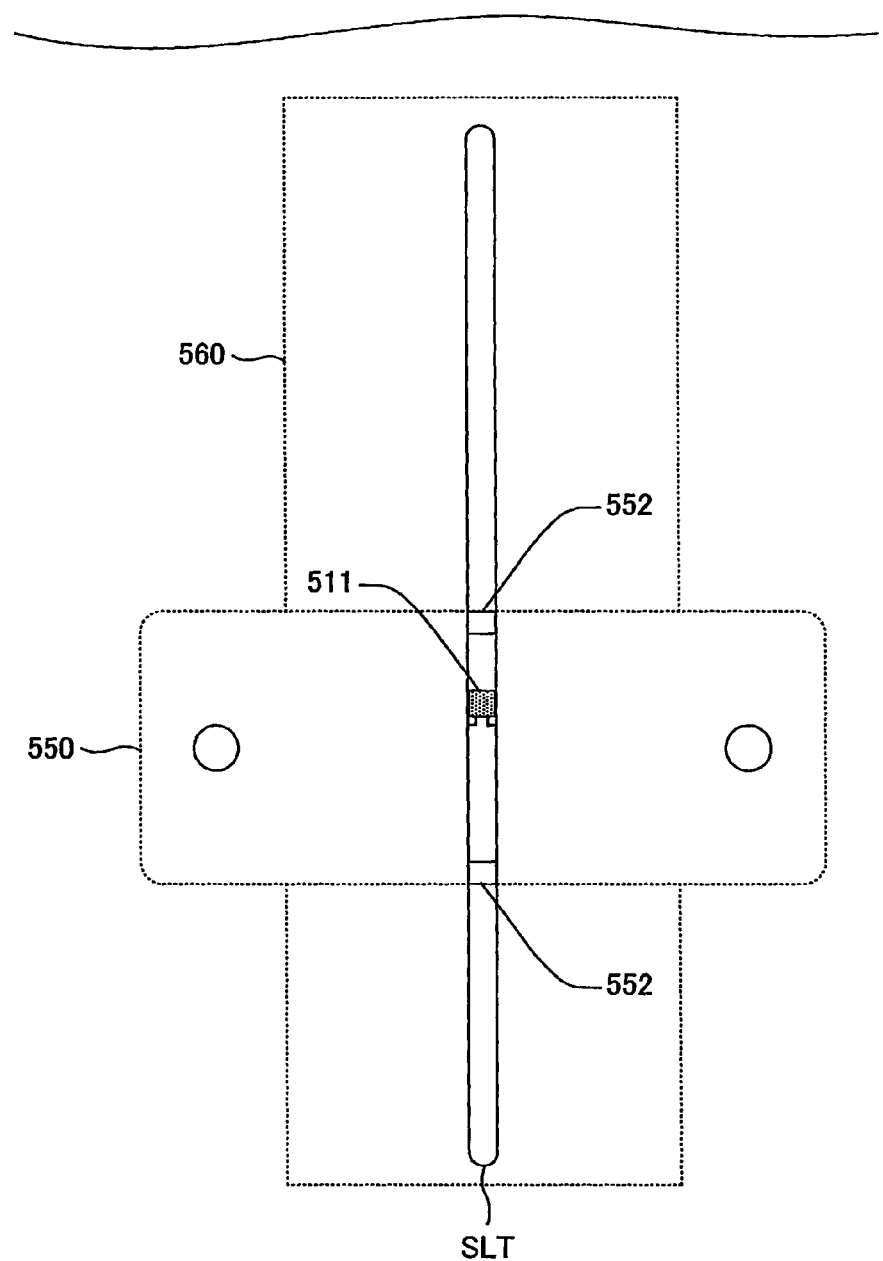
FIG. 61 is a diagram (version 2) illustrating the state where the RFID tag is attached to the metal plate P.

FIGS. 60 and 61 shows a state where the RFID tag 500 is attached to the metal plate P. The slit SLT of the metal plate P is covered with the shield member 560.

In this case, radio waves (noise) generated by the main control device 2090 can be prevented from leaking outside the chassis, without shortening the communication range of the RFID tag 500. Further, it is possible to prevent external radio waves (noise) from entering inside the chassis.

Figure 62:
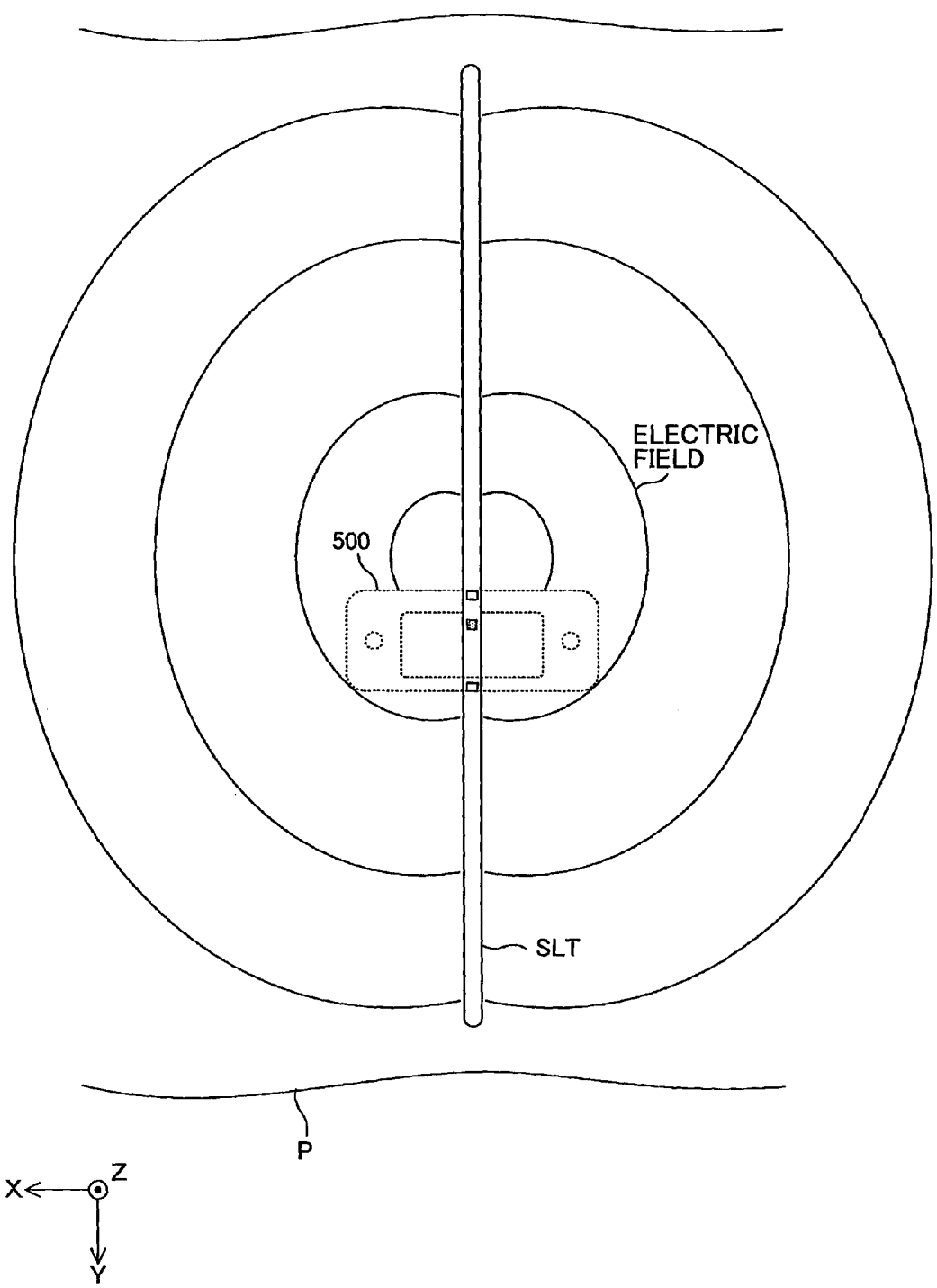
FIG. 62 is a diagram illustrating an electric field around the slit when radio waves are emitted from a reader/writer.

When linearly polarized radio waves or circularly polarized radio waves are emitted from the reader/writer (any one of the reader/writers 200a-200i) to the slit SLT, an electric field is generated around the slit SLT (cf. FIG. 62). The electric field generates a reverse voltage (alternate-current voltage) across the slit SLT. Therefore, when the terminal members 520 contact corresponding portions of the slit SLT at the +X side and at the −X side, a current flows, and the IC chip 511 of the RFID tag 500 is activated.

A communication range of 3 m can be ensured between the reader/writer (any one of the reader/writers 200a-200i) and the RFID tag 500. The multifunction peripheral M is shipped to a customer while the RFID tag 500 is attached to the metal plate P.

When the multifunction peripheral M is installed in the customer's premises, an operator sets up, for example, a device name and an IP address of the multifunction peripheral using a maintenance device having terminals to which the external terminals 515 of the RFID tag 500 can be connected. The installation can be performed after activating the multifunction peripheral M. When the installation is completed, the operator connects the external terminals 515 to a circuit board of the main control device 2090.

When the multifunction peripheral M is operated, the main control device 2090 stores a counter value indicating the number of the printed sheets into a memory of the IC chip 511. The data stored in the memory of the IC chip 511 can be read out by using a reader/writer or the maintenance device.

As explained above, the RFID tag 500 according to the second embodiment includes the chip module 510, the holding member 550, and the shield member 560.

The chip module 510 includes the IC chip 511 and the two terminal members 520. Each of the terminal members 520 includes the thin metal film 521, where both sides of the thin metal film 521 are covered with the corresponding resin films 522. The thin metal films 521 of the corresponding terminal members 520 are connected to the corresponding electrodes of the IC chip 511.

Inside the chassis, the shield member 560 covers the slit SLT. In this case, it is possible to prevent radio waves (noise) generated by the main control device 2090 from leaking outside the chassis. Further, it is possible to prevent external radio waves (noise) from entering the chassis.

The RFID tag 500 can be used for a metal object without reducing a communication range. The RFID 500 can be used for any device having a metal plate.

Further, in the chip module 510, the thickness d of the resin film 522 and the area S of the metal thin plate 521 have been set so that the inequality (6) is satisfied.

In this case, the minimum value of the area S of the each of the thin metal films 521 can be evaluated depending on an operating condition. Therefore, the chip module 510 can be prevented from being enlarged more than necessary, and the chip module 510 can be downsized and the cost can be reduced.

Further, the RFID tag 500 utilizes the metal plate P as an antenna. Therefore, it is not necessary to introduce an antenna in the RFID tag 500, thereby enabling the downsizing and the cost reduction.

Further, since the RFID tag 500 is attached to the metal plate P with the screws, the RFID tag 500 can be reused.

Further, since the RFID tag 500 is attached to the metal plate P with the screws, the attachment of the RFID tag 500 to the metal plate P can be ensured, even if oil is adhered to the surface of the metal plate P.

Additionally, with the RFID system 10 according to the second embodiment, since the RFID system 10 includes the RFID tag 500, the ID number can be read accurately and stably, thereby improving the reliability of the RFID system 10.

In the second embodiment, the case has been explained where the aluminum plate is used as the shield member 560. However, the shield member 560 is not limited to the aluminum plate. It suffices if the shield member 560 can prevent radio waves (noise) from leaking outside the chassis through the slit SLT, and can prevent external radio waves (noise) from entering inside the chassis.

Further, in the second embodiment, the case has been explained where the slit SLT is linear. However, the second embodiment is not limited to this. For example, a portion of the slit SLT may be bent (cf. FIG. 63).

Further, in the second embodiment, the case has been explained where the IC chip 511 is the dual-interface IC chip. However, the IC chip is not limited to this, and an IC chip for a normal RFID may be utilized. In this case, the holding member 550 may not include the window 554, and the shield member 560 may not include the opening 562.

Figure 64:
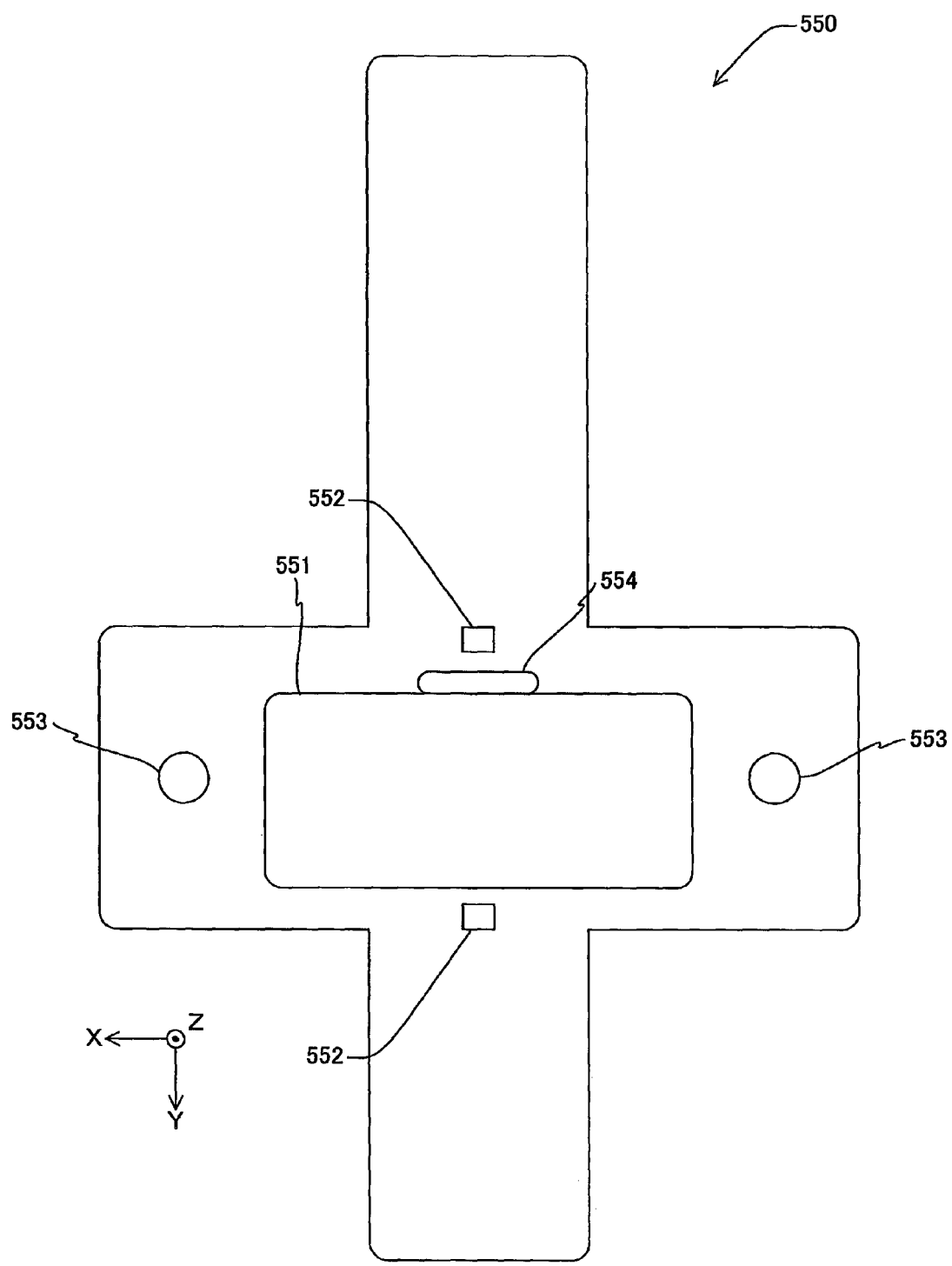
FIG. 64 is a diagram illustrating a first modified example of the holding member.
Figure 65:
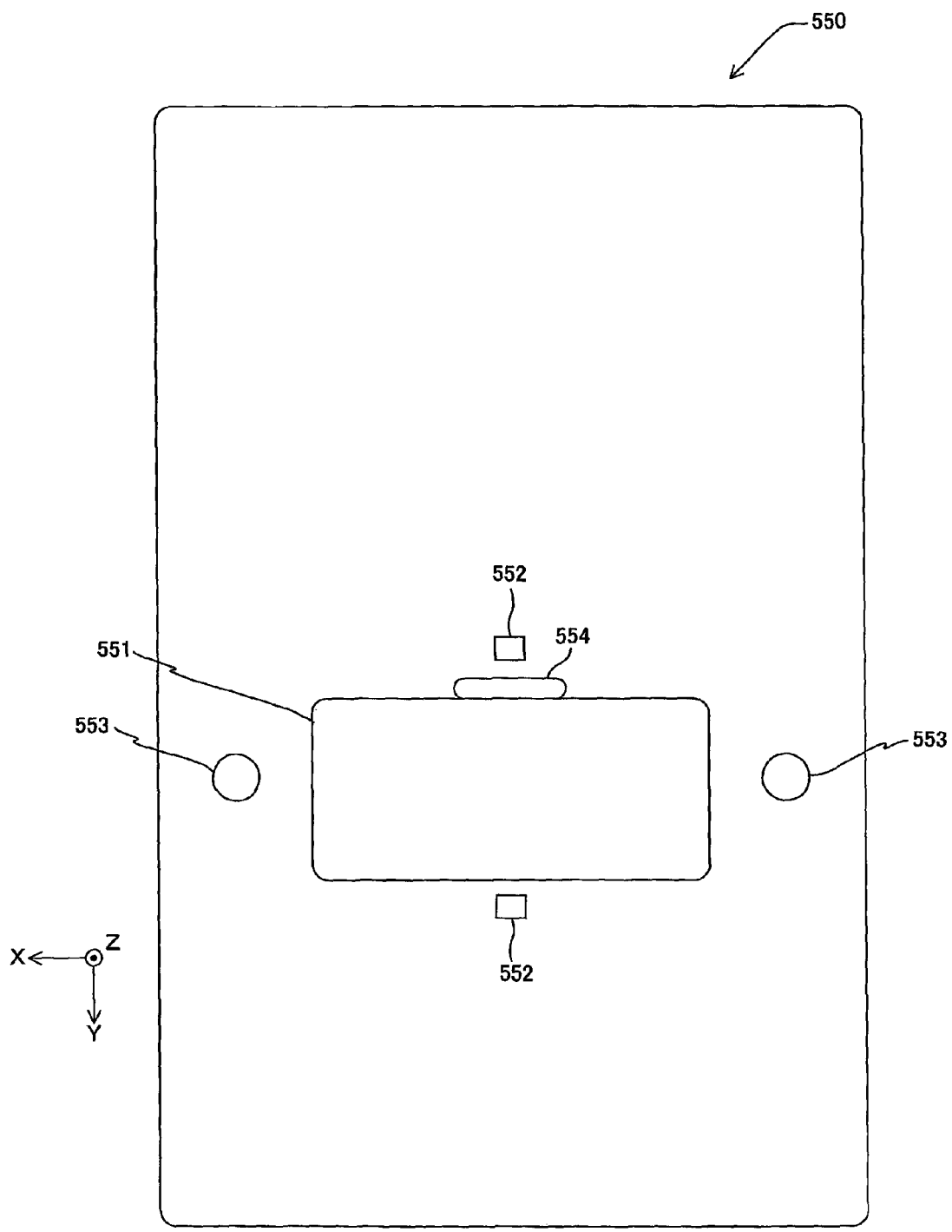
FIG. 65 is a diagram illustrating a second modified example of the holding member.

Further, the shape of the holding member 550 according to the second embodiment is for exemplifying purpose only, and the shape is not limited to this (cf. FIGS. 64 and 65).

Further, in the second embodiment, the case has been explained where the information is written into the RFID tag 500. However, the second embodiment is not limited to this. In a case where information is not written into the RFID tag 500, a memory area into which information is written may not be included in the IC chip 511. Further, alternatively to the reader/writers 200a-200i, devices dedicated for reading that only perform reading out of the ID number (readers) may be utilized.

In the second embodiment, the case has been explained where the assembly line includes the five stations ST1-ST5. However, the number of the stations is not limited to this.

Further, the contents of the detected information and the history information in the second embodiment are for exemplifying purpose only, and the contents are not limited to these. Similarly, the numbers of the digits of the device number and the identification number are not limited to those of the second embodiment.

Further, the contents displayed on the display in the second embodiment are for exemplifying purpose only, and the contents are not limited to these.

Further, in the second embodiment, the case has been explained where the RFID system 10 is utilized in the assembly line. However, the usage of the REID system 10 is not limited to this. The RFID system 10 may be adjusted to the purpose for which an RFID system is currently utilized. In this case, the reliability of the system can be improved without leading to higher cost.

In the second embodiment, the case has been explained where the frequency band is the UHF band. However, the frequency band is not limited to the UHF band.

<Third Embodiment>

Figure 66:
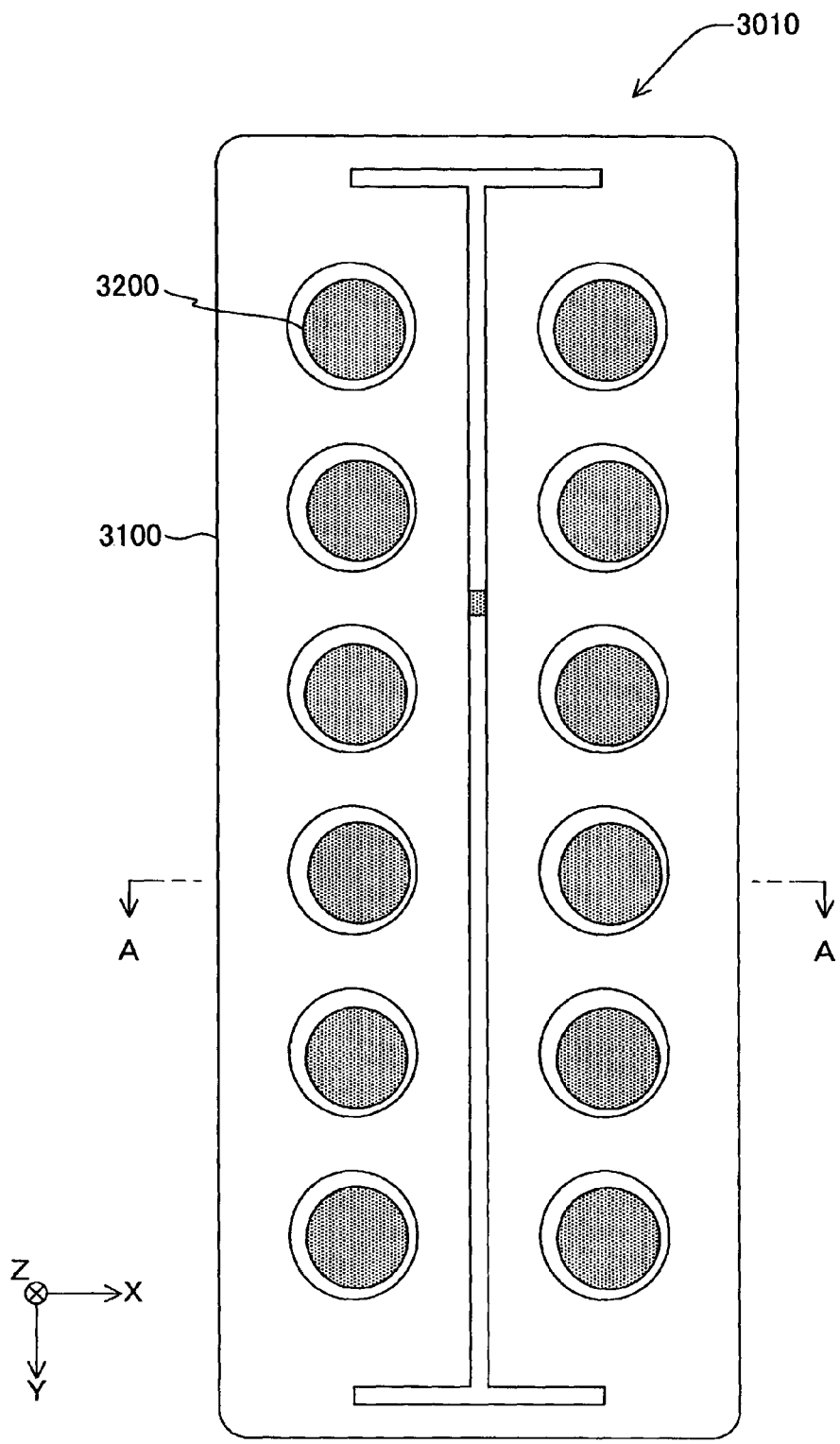
FIG. 66 is a diagram (version 1) illustrating a tablet sheet according to a third embodiment of the present invention.
Figure 67:
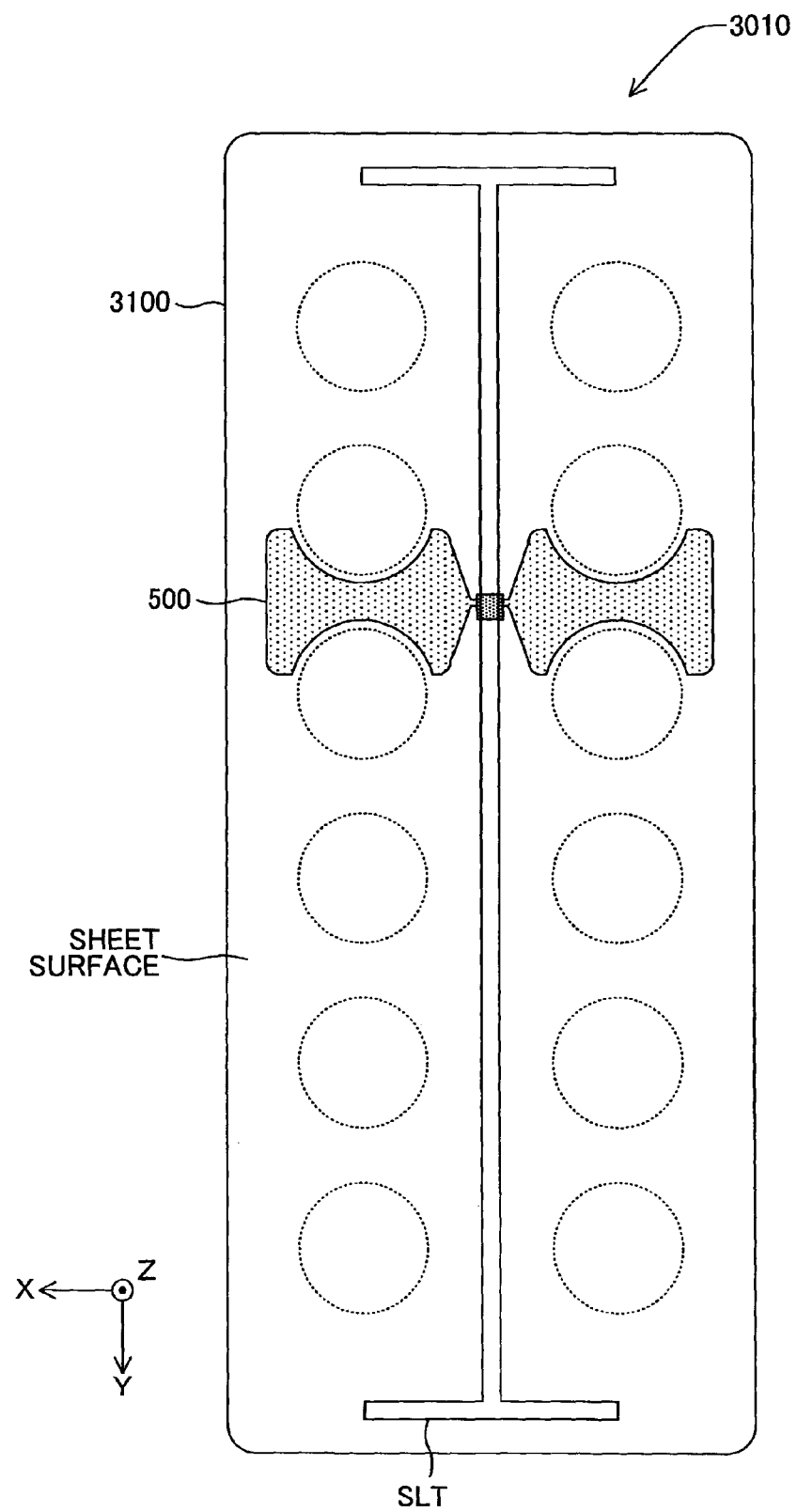
FIG. 67 is a diagram (version 2) illustrating the tablet sheet.
Figure 68:
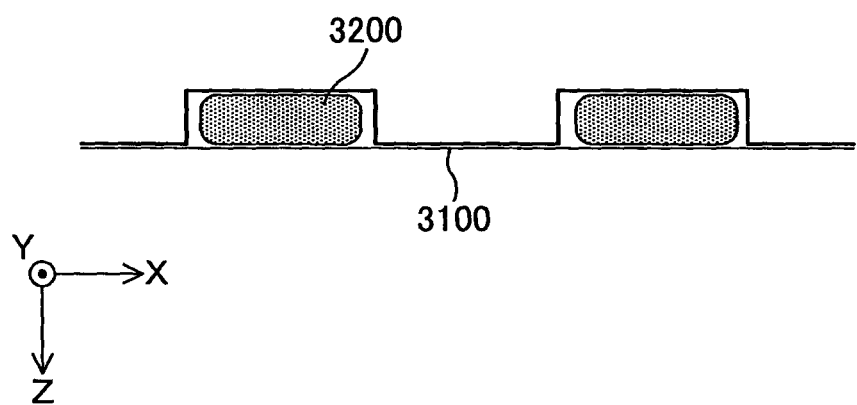
FIG. 68 is a diagram showing an A-A cross-section of FIG. 66.

Hereinafter, a third embodiment of the present invention will be explained by referring to FIGS. 66-85. FIGS. 66-68 show a tablet sheet 3010 according to the third embodiment. FIG. 68 is a diagram showing an A-A cross section of FIG. 66.

In the tablet sheet 3010, plural tablets 3200 are individually stored in a tablet package 3100.

Hereinafter, the third embodiment is explained while setting a direction perpendicular to a sheet surface of the tablet sheet 3010 to be a Z-axis direction in the XYZ three-dimensional orthogonal coordinate system. The sheet surface has a substantially rectangular shape. The longitudinal direction of the sheet surface is defined to be the Y-axis direction, while the short direction of the sheet surface is defined to be the X-axis direction.

Figure 69:
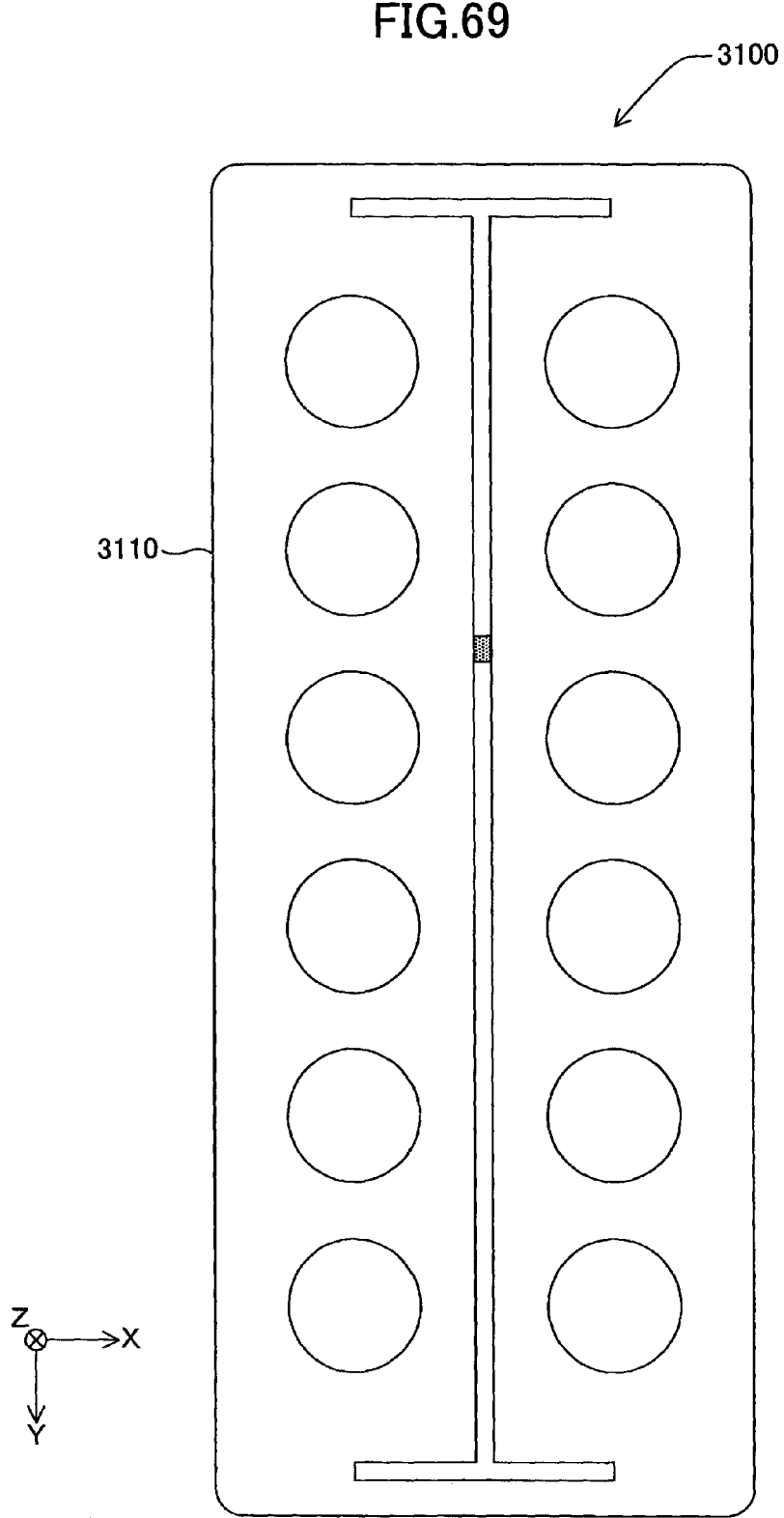
FIG. 69 is a diagram (version 1) illustrating a tablet package according to the third embodiment.
Figure 70:
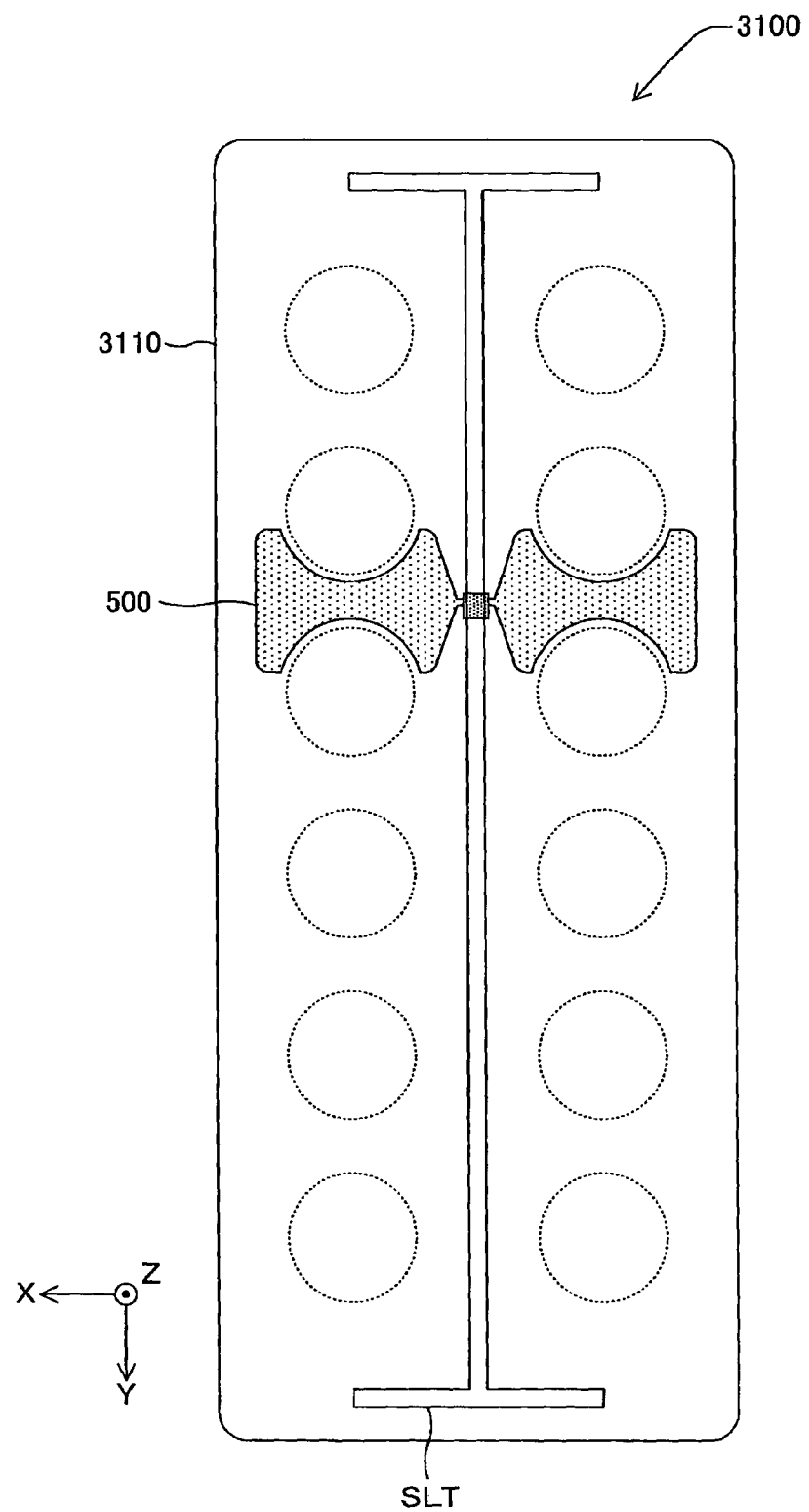
FIG. 70 is a diagram (version 2) illustrating the tablet package.

As shown in FIGS. 69 and 70, the tablet package 3100 includes a package member 3110 and an RFID tag 500.

Figure 71:
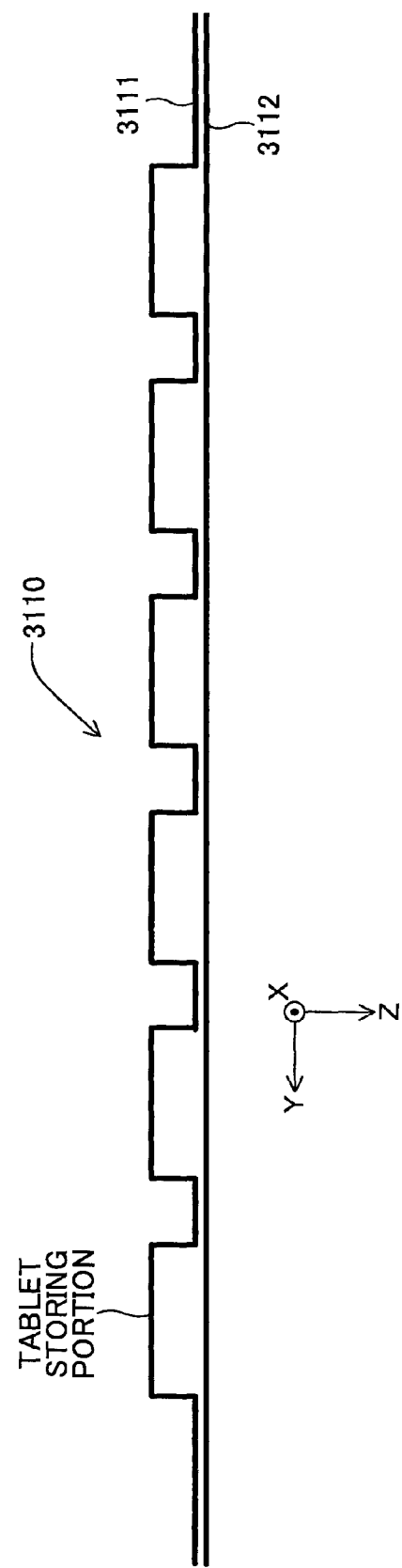
FIG. 71 is a diagram (version 1) illustrating a resin sheet and a metal sheet according to the third embodiment.
Figure 72:
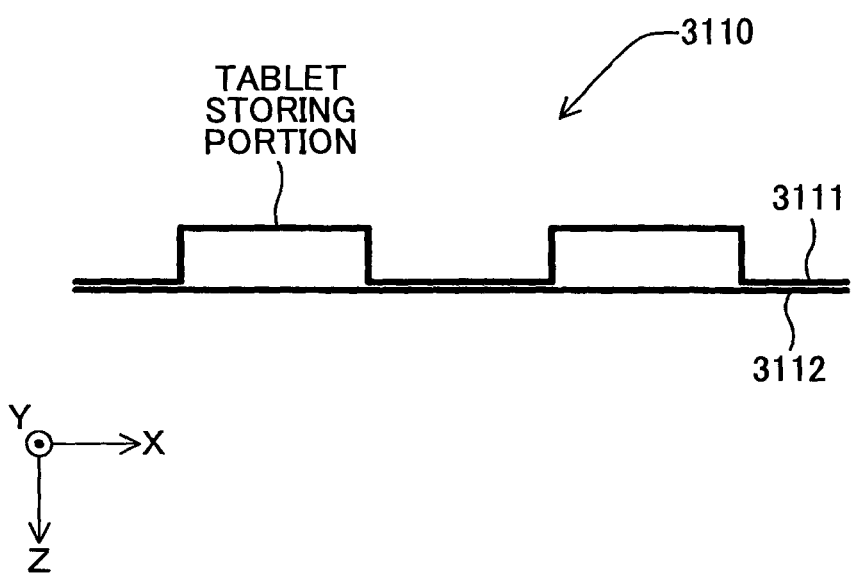
FIG. 72 is a diagram (version 2) illustrating the resin sheet and the metal sheet.

As shown in FIGS. 71 and 72, the package member 3110 includes a resin sheet 3111 and a metal sheet 3112. The package member 3110 is a package member for a press through package (PTP).

The resin sheet 3111 includes plural tablet storing portions. Each of the tablet storing portions has a shape for storing a tablet 3200. Here, as a material of the resin sheet 3111, polyvinyl chloride (PVC) is utilized.

The metal sheet 3112 is a member that is for sealing the tablet 3200 inside the corresponding tablet storing portion of the resin sheet 3111. Here, an aluminum sheet is utilized as the metal sheet 3112.

In this case, when the tablet storing portion, in which the tablet 3200 is stored, is pressed by a finger, a portion of the metal sheet 3112 facing the tablet storing portion is broken by the tablet 3200, and thereby the tablet 3200 can be taken out.

Figure 73:
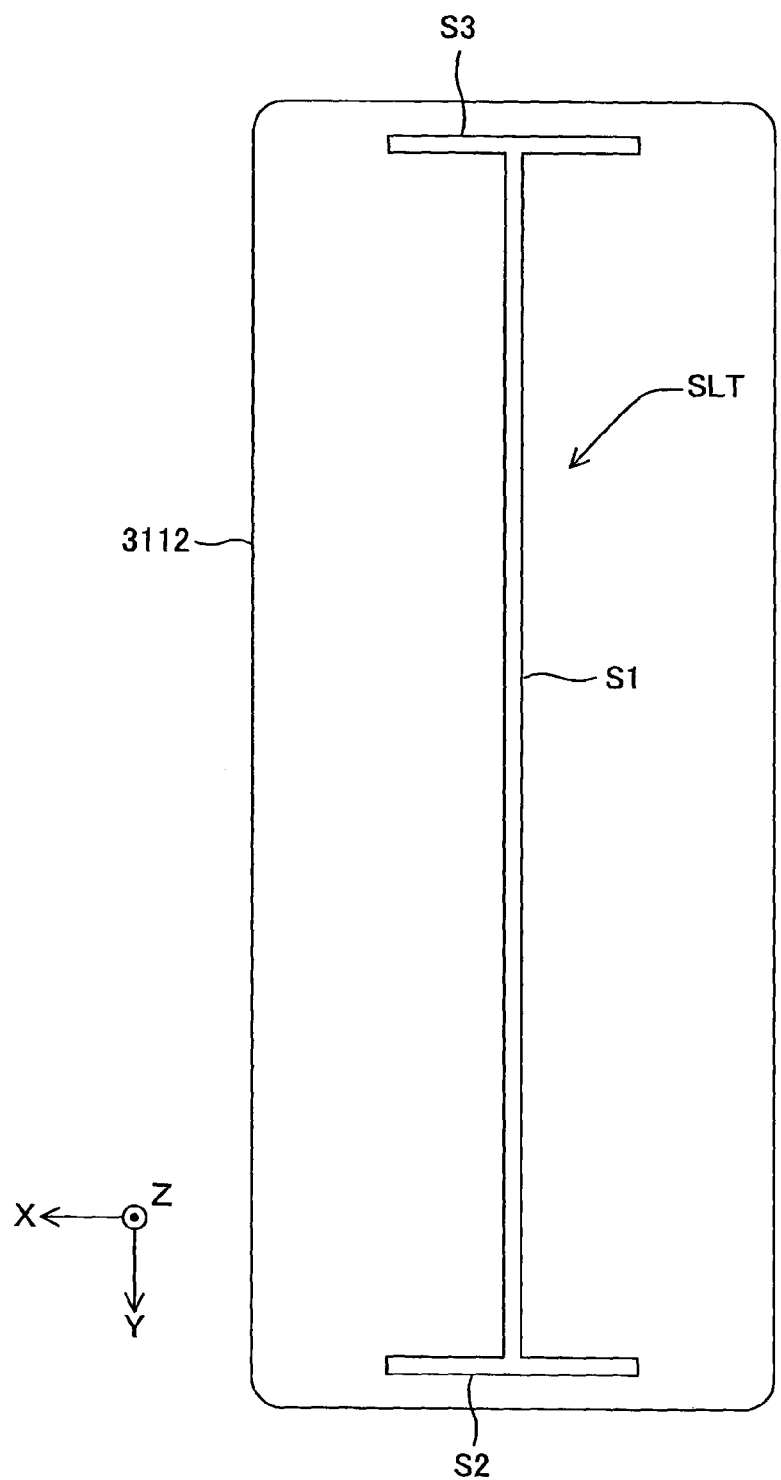
FIG. 73 is a diagram illustrating a slit according to the third embodiment.

As shown in FIG. 73, for example, the metal sheet 3112 includes a slit SLT. Here, the slit SLT includes a first slit portion S1; a second slit portion S2; and a third slit portion S3. The first slit portion S1 extends in the Y-axis direction. The second slit portion S2 extends in the X-axis direction, and the second slit portion S2 is connected to an end portion of the first slit portion S1 at the +Y side. The third slit portion S3 extends in the X-axis direction, and the third slit portion S3 is connected to the other end portion of the first slit portion S1 at the −Y side.

The RFID tag 500 is a passive tag. As shown in FIG. 74, for example, the RFID tag 500 includes an IC chip 511 and two terminal members 520.

The IC chip 511 stores a unique identification (ID) number. The ID number can be read out by using a reader/writer.

As shown in FIG. 75, for example, each of the terminal members 520 includes a thin metal film 521 and resin films 522 that cover corresponding sides of the thin metal film 521. Here, an aluminum foil is utilized as the thin metal film 521.

The thin metal film 521 of the corresponding terminal member 520 is connected to corresponding electrode 512 of the IC chip 511.

Figure 76:
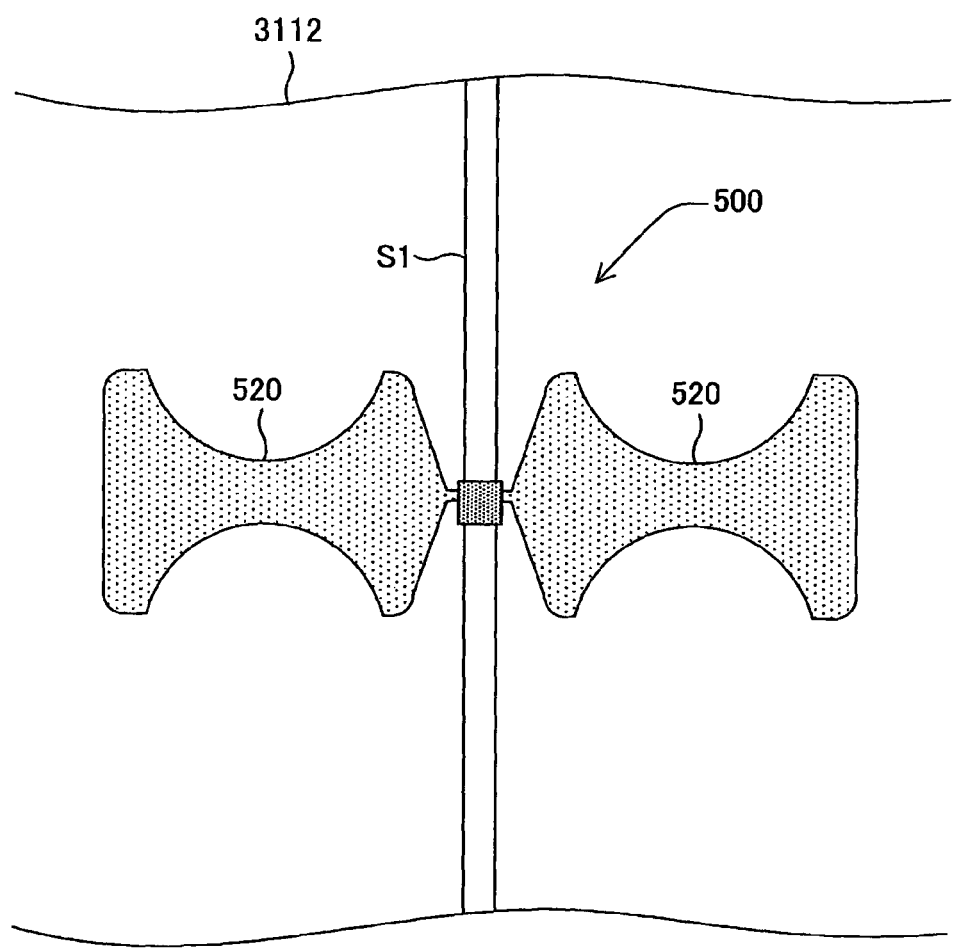
FIG. 76 is a diagram (version 1) illustrating a state where the RFID tag is attached to the metal sheet.

As shown in FIG. 76, one of the terminal members 520 is adhered to a portion of the metal sheet 3112 at the +X side of the first slit portion S1. The other terminal member 520 is adhered to another portion of the metal sheet 3112 at the −X side of the first slit portion S1.

Figure 77:
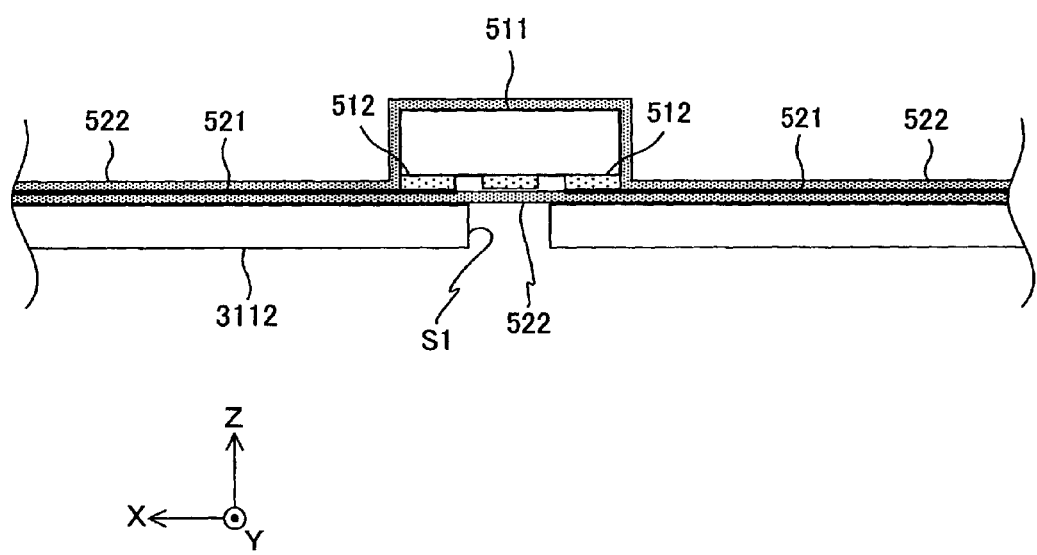
FIG. 77 is a diagram (version 2) illustrating the state where the RFID tag is attached to the metal sheet.

The thin metal films 521 of the corresponding terminal members 520 are attached to the metal sheet 3112 through a resin film 522 (cf. FIG. 77). The resin film 522 is adhered to the metal sheet by glue or an adhesive (e.g. a double-sided tape).

The resin film 522 functions as an isolator disposed between the metal sheet 3112 and the thin metal films 521. The resin film 522 also functions as a protection film for protecting the thin metal films 521 from pollution and damage.

A range between the reader/writer and the RFID tag 500, within which the reader/writer and the RFID tag 500 can communicate with each other, depends on sizes (areas) of the thin metal films 521 of the corresponding terminal members 520 and thickness of the isolator such as the resin film 522 and the adhesive layer disposed between the thin metal films 521 and the metal sheet 312. Namely, the transmissible distance can be extended by lowering the capacitive coupling impedance Z. The capacitive coupling impedance Z can be lowered by adjusting the sizes (areas) of the thin metal films 521 depending on the thickness of the isolator.

The impedance Z can be expressed by the formula (1) below.

$$Z = 1/(\omega \cdot C) \tag{1}$$

In the formula (1), $\omega$ is an angular frequency, and C is a capacitance. The angular frequency $\omega$ is expressed by the formula (2) below, and the capacitance C is expressed by the formula (3) below.

$$\omega = 2\pi f \tag{2}$$

$$C = S \cdot \in_0 \cdot \in_r / d \tag{3}$$

Here, f is a frequency of the radio wave that is utilized for the communication, S is an area of the thin metal film 521, $\in_0$ is the dielectric constant of vacuum, $\in_r$ is a dielectric constant of the isolator, and d is the thickness of the isolator.

The formula (1) can be rewritten as the formula (4) below.

$$Z = d/(2\pi f \cdot S \cdot \in_0 \in_r) \tag{4}$$

The electric power W supplied from the terminal members 520 to the IC chip 511 can be expressed by the formula (5) below.

$$\begin{aligned} W &= Wa - 2 \cdot V \cdot A \\ &= Wa - 2 \cdot V^2 / Z \end{aligned} \tag{5}$$

In the formula (5), Wa is the electric power induced between the edges in the X-axis direction of the slit SLT during the communication, V is a voltage induced between the edges in the X-axis direction of the slit SLT during the communication, and A is a current supplied from the two terminal members 520 to the IC chip 511. Namely, the electric power supplied to the IC chip 511 is obtained by subtracting the electric power consumed by the connecting portion (the portion of the isolator) from the electric power induced at the antenna.

When the electric power required to realize a desired communication range is defined to be Wmin, the area S of each of the thin metal film 521 is adjusted so that the inequality (6) below is satisfied.

$$W\min \leq Wa - 2 \cdot V^2 / Z = Wa - 4\pi f \cdot S \cdot \in_0 \cdot \in_r \cdot V^2 / d \tag{6}$$

Here, Wmin is a value that is uniquely determined when the type of the IC chip to be utilized and the desired communication range are determined.

For example, for a case where f is 950 MHz, the isolator is polyethylene-telephthalate (PET), and d is 20 μm, the formula (6) is satisfied if S is equal to 100 mm².

In the third embodiment, a PET film having thickness of 20 μm is utilized as the resin film 522, and the area of each of the thin metal films 521 is substantially equal to 100 mm². Namely, the area of each of the thin metal films 521 is adjusted so that an alternating current having a frequency in the UHF band can flow across the first slit portion S1, even if the distance between the reader/writer and the RFID tag 500 is 3 m.

Each of the terminal members 520 has a shape where portions facing the corresponding tablet storing portions are removed so as to avoid the corresponding tablet storing portions. Therefore, even if the tablet storing portion of the resin sheet 3111 is pressed by a finger and the portion of the metal sheet 3112 facing the tablet storing portion is broken so as to take out the tablet 3200 from the package member 3110, the RFID tag 500 does not receive any effect.

Figure 78:
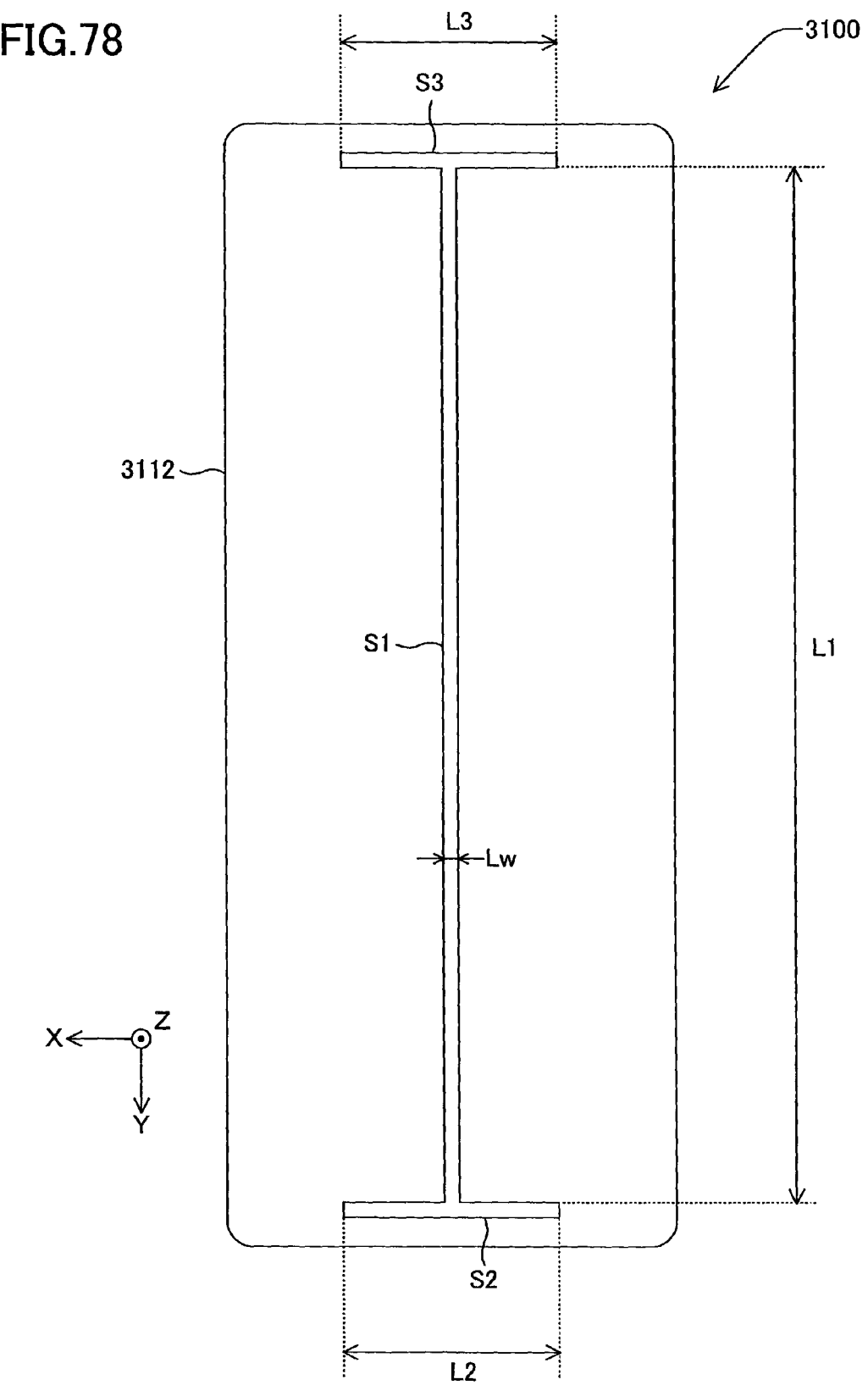
FIG. 78 is a diagram illustrating dimensions of the slit.

Further, as shown in FIG. 78, when a length of the first slit portion S1 is denoted by L1, a length of the second slit portion S2 is denoted by L2, and a length of the third slit portion S3 is denoted by L3, the slit SLT is defined to satisfy the formula (7) below.

$$L1 + L2 + L3 = \lambda / \sqrt{\in_r} \tag{7}$$

Here, $\lambda$ is a wavelength of the radio wave used for the communication.

Further, the width Lw of the slit SLT relates to a frequency band width, within which the slit SLT can obtain a desired gain (a good antenna performance) as an antenna. Namely, as the width (Lw) becomes smaller, the frequency band width becomes smaller. Conversely, as the width (Lw) becomes greater, the frequency band width becomes greater. However, as the width (Lw) becomes greater, impedance becomes greater. Accordingly, the efficiency of the antenna is lowered.

In general, the slit SLT is formed by a punching process using metal molds. The slit SLT is shaped by a secondary process depending on necessity. In this case, when the width (Lw) is too small, it is difficult to form the slit SLT having the desired width with a predetermined accuracy. Therefore, the slit SLT may be formed by laser processing. However, in this case, the cost may become higher. Furthermore, when the width (Lw) is too small, a foreign material such as a metal piece may be caught in the slit SLT, and it is possible that the antenna performance is degraded. Therefore, when the frequency of the radio wave used for radio communication is in a range from 920 MHz to 960 MHz, the width (Lw) is set to be within a range from 2 mm to 3 mm. In the third embodiment, the frequency of the radio wave used for the radio communication is 950 MHz. The lengths L1, L2, and L3 are defined so that L1+L2+L3 is equal to 160 mm. The width (Lw) is 3 mm.

With respect to the Y-axis direction, the RFID tag 500 is disposed at a position where impedance matching is achieved.

In this case, when linearly polarized radio waves or circularly polarized radio waves are emitted from the reader/writer to the slit SLT, an electric field is generated around the slit SLT. The electric field generates a voltage at a portion of the metal sheet 112 at the +X side of the slit SLT and a voltage at a portion of the metal sheet 112 at the −X side of the slit SLT. The voltages (alternate-current voltage) generated at the +X side and −X side are opposite to each other. Therefore, when the RFID tag 500 is attached to cross the slit SLT, a current flows, and the IC chip 511 of the RFID tag 500 is activated.

Figure 79:
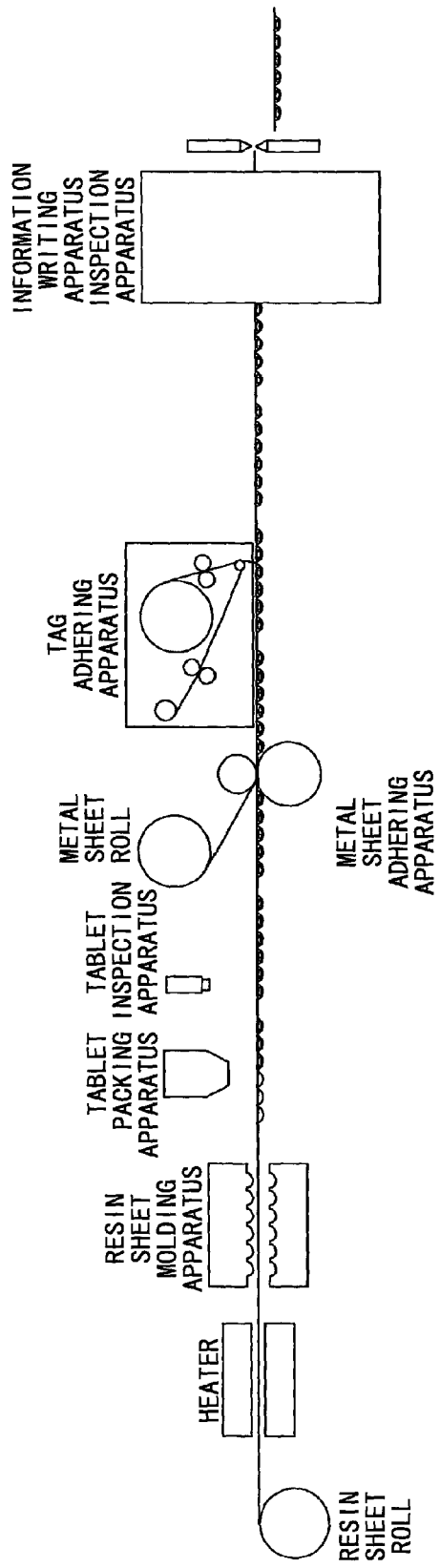
FIG. 79 is a diagram illustrating a manufacturing method of the tablet sheet.

Next, a manufacturing method of the tablet sheet 3010 will be briefly explained by referring to FIG. 79.

(1) The resin sheets are pulled out from a long roll of the resin sheets. Then, the resin sheets are heated by a heater, and the resin sheets are softened. Subsequently, the tablet storing portions are formed by a resin sheet molding apparatus, thereby forming the resin sheets 3111.

(2) The tablets are inserted into the corresponding tablet storing portions of the resin sheet by a tablet packaging apparatus.

(3) Using a tablet inspection apparatus, it is confirmed whether the tablets are correctly inserted into the corresponding tablet storing portions of the resin sheet.

Figure 80:
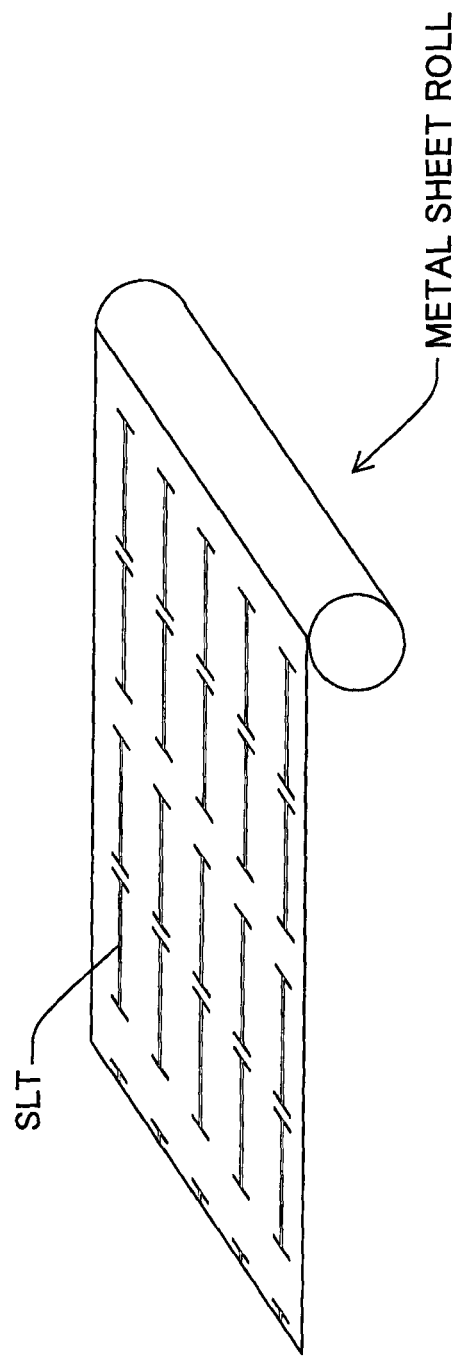
FIG. 80 is a diagram illustrating a metal sheet roll.
Figure 81:
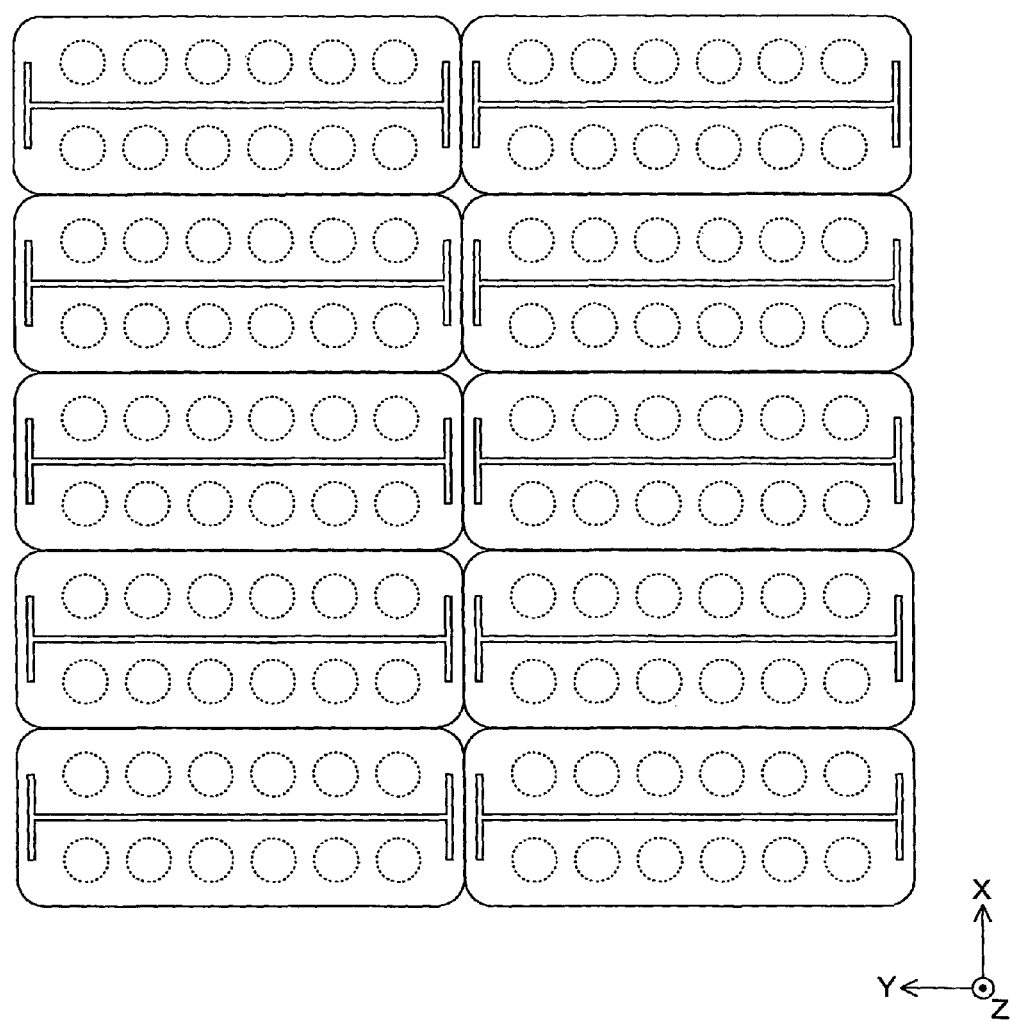
FIG. 81 is a diagram (version 1) illustrating a state where the metal sheets are attached to the resin sheets.

(4) The metal sheets are pulled out from a long roll of the metal sheets. The metal sheets are adhered to the corresponding resin sheets by using a metal sheet adhering apparatus, and thereby sealing the tablet storing portions. As shown in FIG. 80, for example, the slits SLT have been formed in the metal sheet in advance. FIGS. 81 and 82 show the state where the metal sheets are adhered to the corresponding resin sheets.

Figure 83:
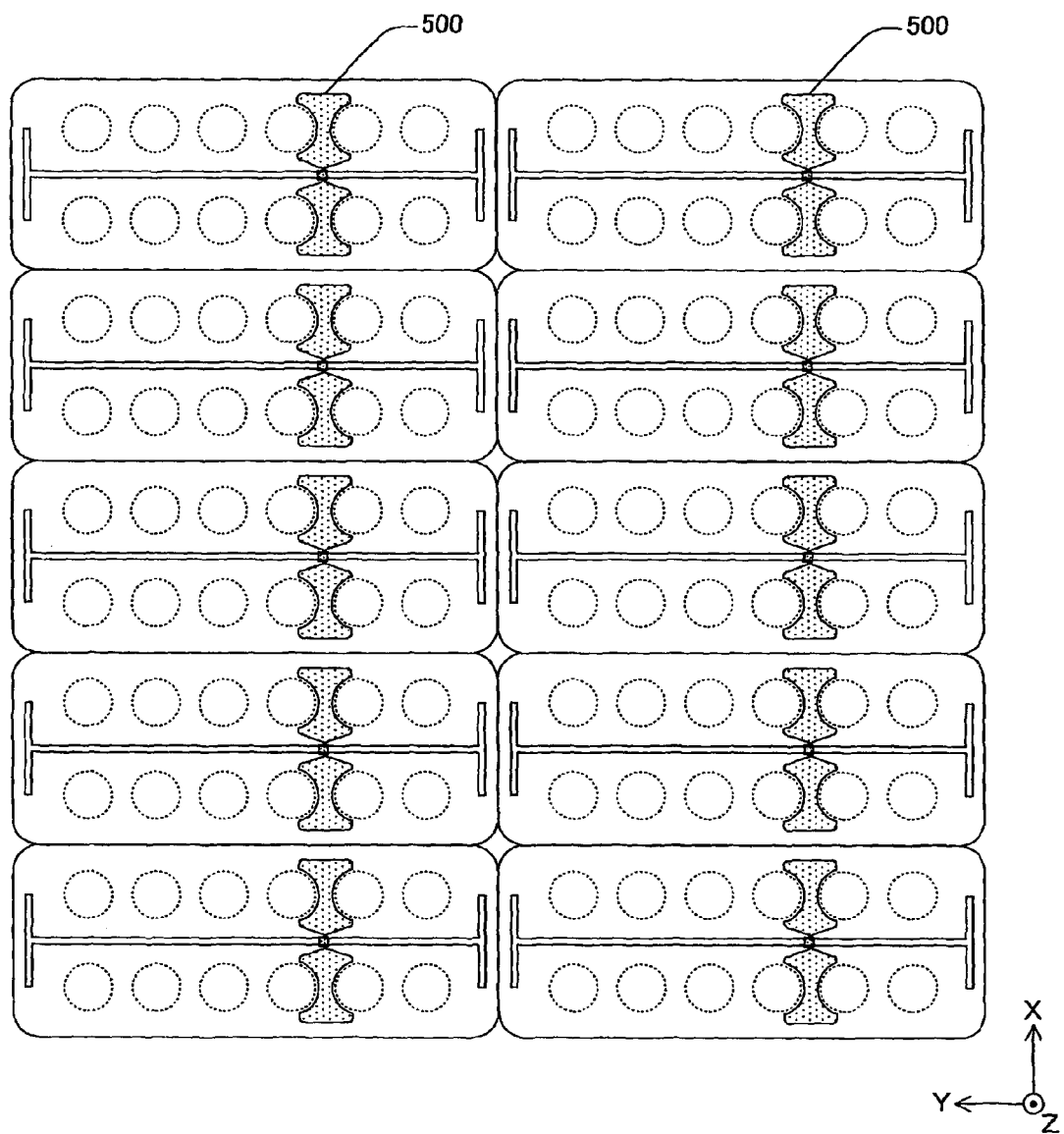
FIG. 83 is a diagram illustrating a state where the RFIDs are attached to the metal sheets.

(5) The RFID tags 500 are adhered to the corresponding metal sheets by using a tag adhering apparatus. FIG. 83 shows the state where the RFID tags 500 are adhered to the corresponding metal sheets.

(6) After confirming that the RFID tags 500 have been correctly adhered to the corresponding metal sheets by an inspection apparatus, the ID numbers and the like are written into the corresponding RFID tags 500 using an information writing apparatus.

Figure 84:
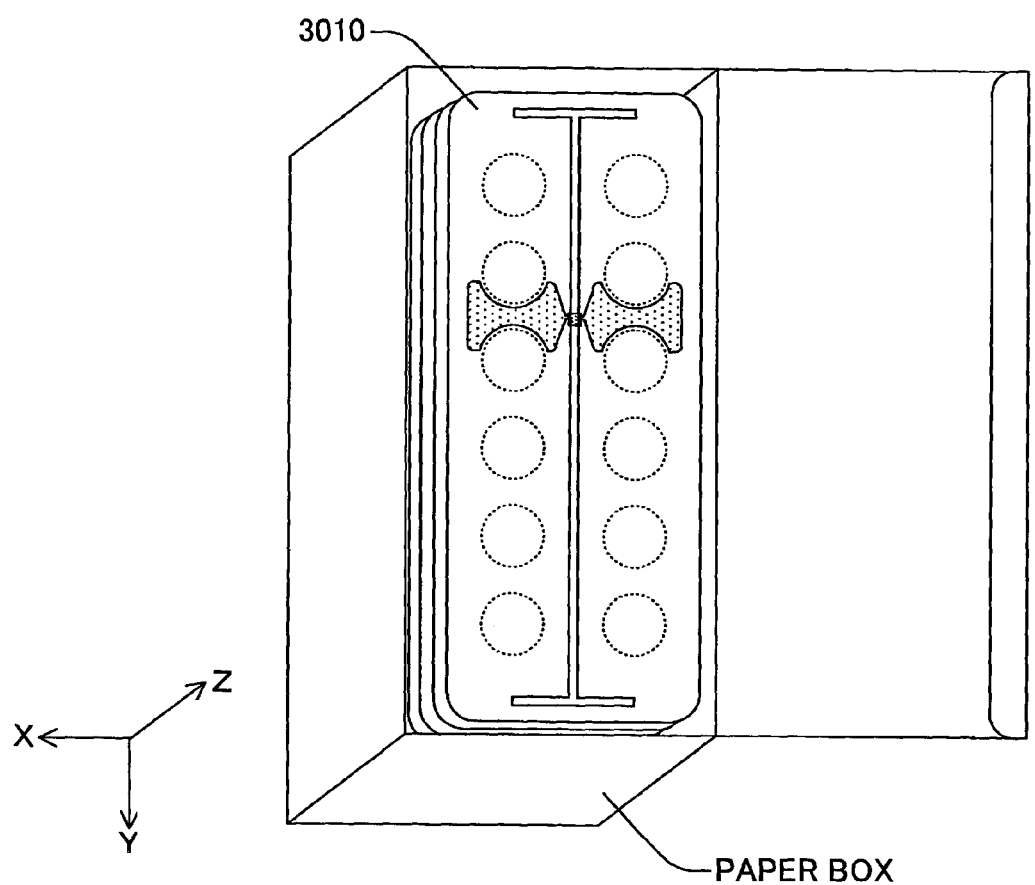
FIG. 84 is a diagram (version 1) illustrating a state where the plural tablet sheets are placed inside a paper box.
Figure 85:
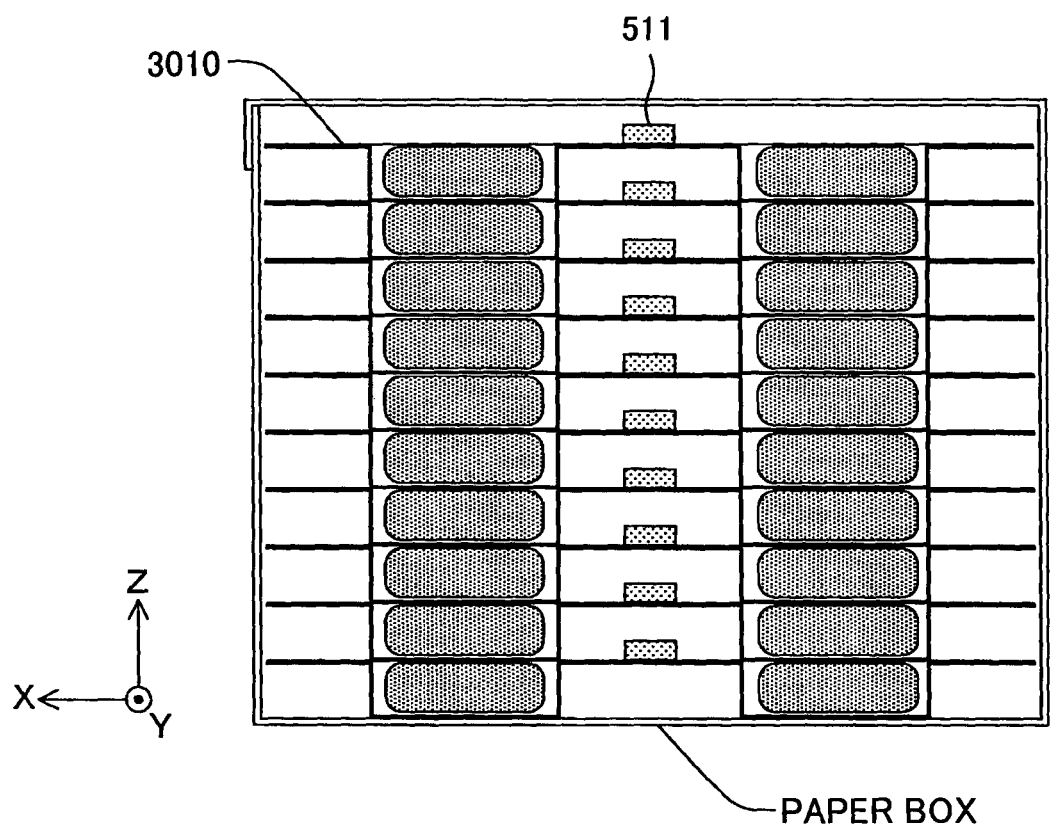
FIG. 85 is a diagram (version 2) illustrating a state where the plural tablet sheets are placed inside the paper box.

(7) After the tablet sheets 3010 are separated into individual tablet sheets 3010, a predetermined number of the tablet sheets 3010 are placed inside a paper box (cf. FIGS. 84 and 85). Here, for example, ten tablet sheets 3010 are placed inside the paper box.

(8) The ID numbers of the corresponding tablet sheets 3010 in the paper box are read out by using a reader/writer. Together with data that identifies a manufacturing date, a manufactory, and a manufacturing line, the ID numbers are registered to a database as history information. The reader/writer may be a stationary reader/writer, a portable reader/writer, or a fixed reader/writer.

With the thus produced tablet sheets 3010, even if the plural tablet sheets 3010 are stacked, it is possible to individually read out the ID numbers of the corresponding tablet sheets 3010. Further, even if the tablet sheet 3010 and the reader/writer are separated by a distance of about 3 m, it is possible to read out the ID number of the tablet sheet 3010. Therefore, inventory management of the tablet sheets 3010 can be performed accurately, quickly, and easily, in a manufacturer, in a wholesale store, in a pharmacy, or in a clinic, for example.

Further, by associating the ID numbers with a pharmaceutical database, it can be prevented that an incorrect or defective medicine is administered to a patient.

As described above, the tablet package 3100 according to the third embodiment includes the package member 3110 and the RFID tag 500.

The slit SLT corresponding to the wavelength of the radio wave in the UHF band is formed in the metal sheet 3112 of the package member 3110.

The RFID tag 500 includes the IC chip 511 and the two terminal members 520. Each of the terminal members 520 includes the thin metal film 521 and the resin films 522 that cover the corresponding sides of the thin metal film 521. The area of each of the thin metal films 521 is adjusted so that the alternating current having the frequency in the UHF band can flow across the slit SLT, even if the distance between the reader/writer and the RFID tag 500 is 3 m. The thin metal films 521 are connected to the corresponding electrodes 512 of the IC chip 511.

One of the terminal members 520 is adhered to the portion of the metal sheet 3112 at the +X side of the first slit portion S1. The other terminal member 520 is adhered to the other portion of the metal sheet 3112 at the −X side of the first slit portion S1. In this case, radio communication in the UHF band can be ensured without reducing the communication range and without enlarging the size of the RFID tag 500.

Figure 86:
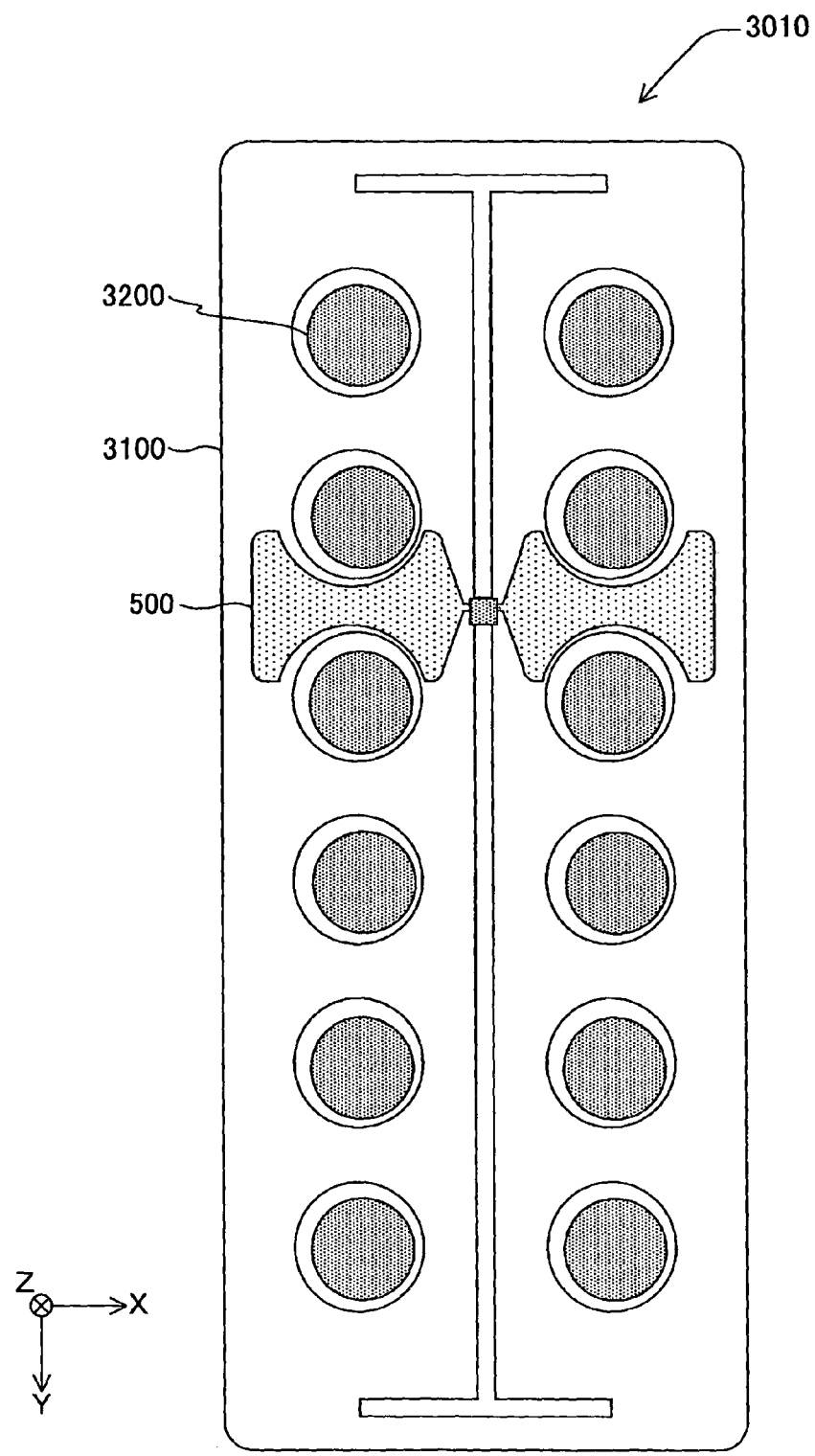
FIG. 86 is a diagram (version 1) illustrating a modified example of the tablet sheet.
Figure 87:
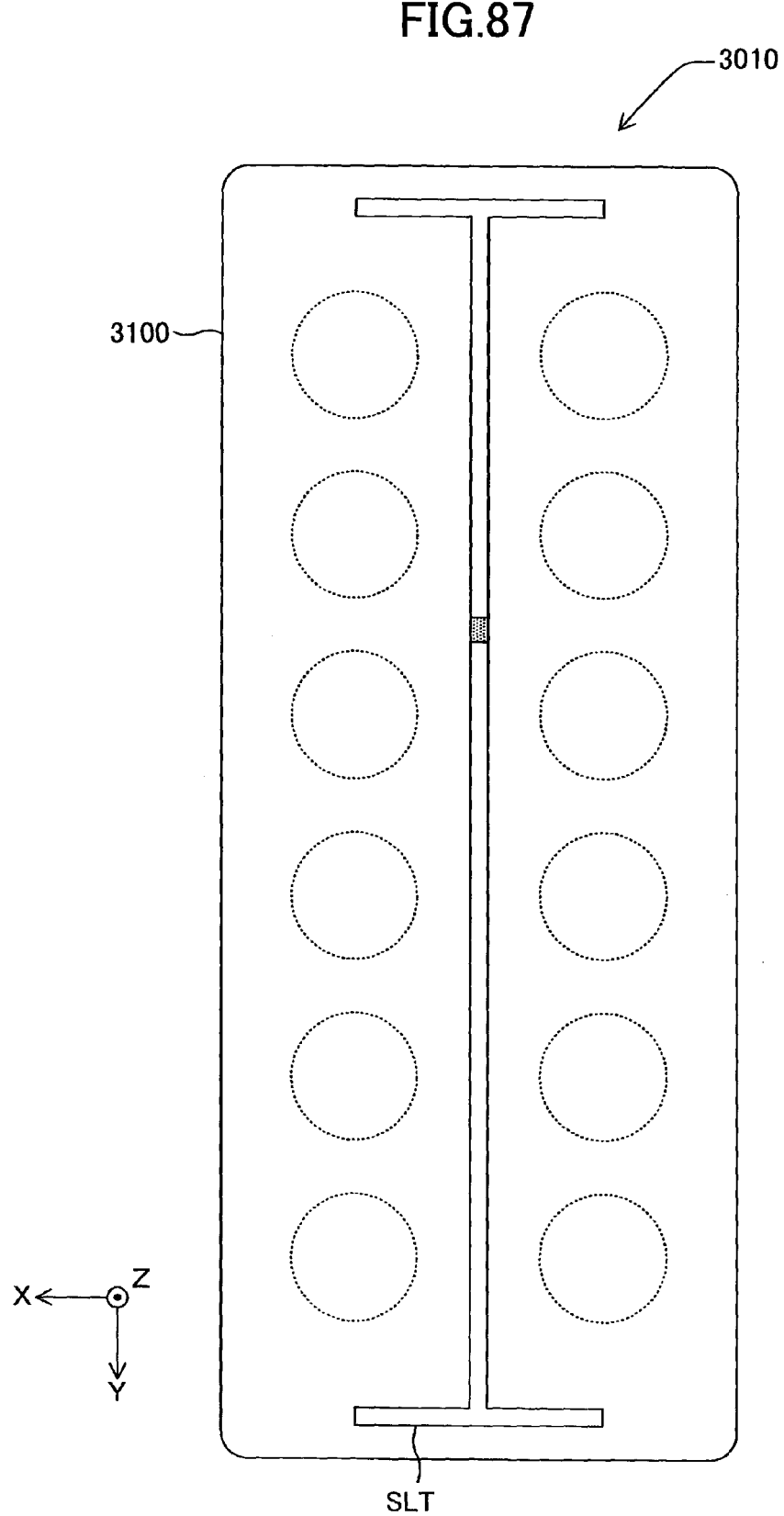
FIG. 87 is a diagram (version 2) illustrating the modified example of the tablet sheet.
Figure 88:
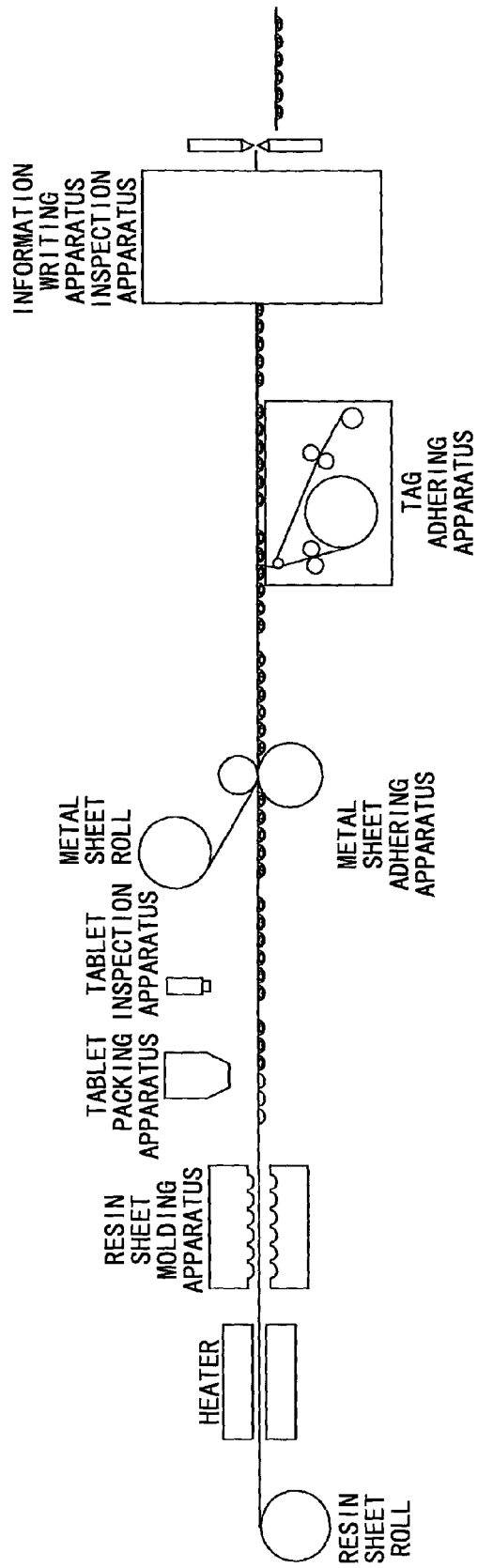
FIG. 88 is a diagram illustrating a manufacturing process of the tablet sheet according to the modified example.

In the third embodiment, the case has been explained where the RFID tag 500 is adhered to the metal sheet 3112. However, the third embodiment is not limited to this, and the RFID tag 500 may be adhered to the resin sheet 3111 (FIGS. 86 and 87). In this case, the tag adhering apparatus is disposed at the side of the resin sheet (cf. FIG. 88). Further, in this case, the thickness of the resin sheet 3111 is included in the thickness d of the isolator. In this case, the resin film 522 may not be disposed between the thin metal films 521 and the resin sheet 3111.

In the third embodiment, the case has been explained where polyvinyl chloride (PVC) is utilized as the material of the resin sheet 3111. However, the material of the resin sheet 3111 is not limited to PVC.

In the third embodiment, the case has been explained where the aluminum sheet is utilized as the metal sheet 3112. However, the metal sheet 3112 is not limited to the aluminum sheet.

In the third embodiment, the case has been explained where aluminum foils are utilized as the thin metal films 521 of the terminal members 520. However, the thin metal films 521 are not limited to aluminum foils.

Further, the shape of the slit SLT according to the third embodiment is for exemplifying purpose only, and the shape of the slit SLT is not limited to this.

Figure 89:
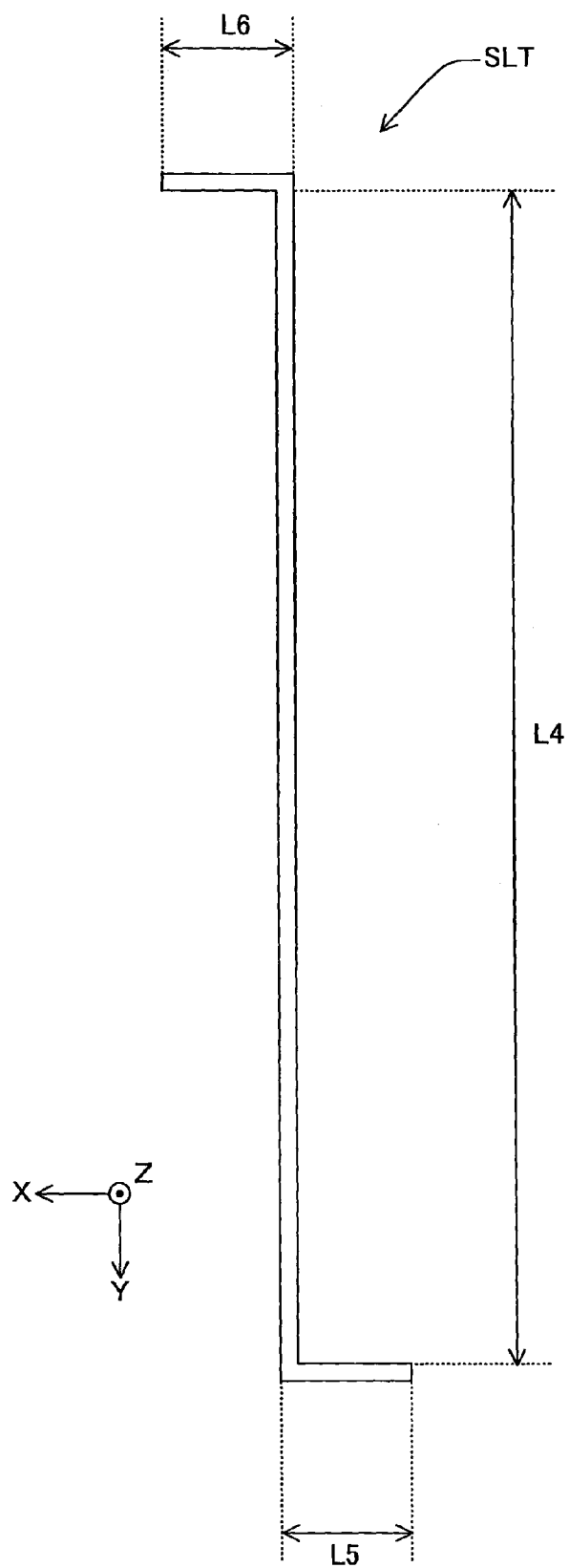
FIG. 89 is a diagram illustrating a first modified example of the slit.

For example, the slit SLT may have a shape as shown in FIG. 89. In this case, the formula (8) below is utilized, instead of the formula (7).

$$L4+L5+L6=\lambda/\sqrt{\in_r} \qquad (8)$$

Figure 90:
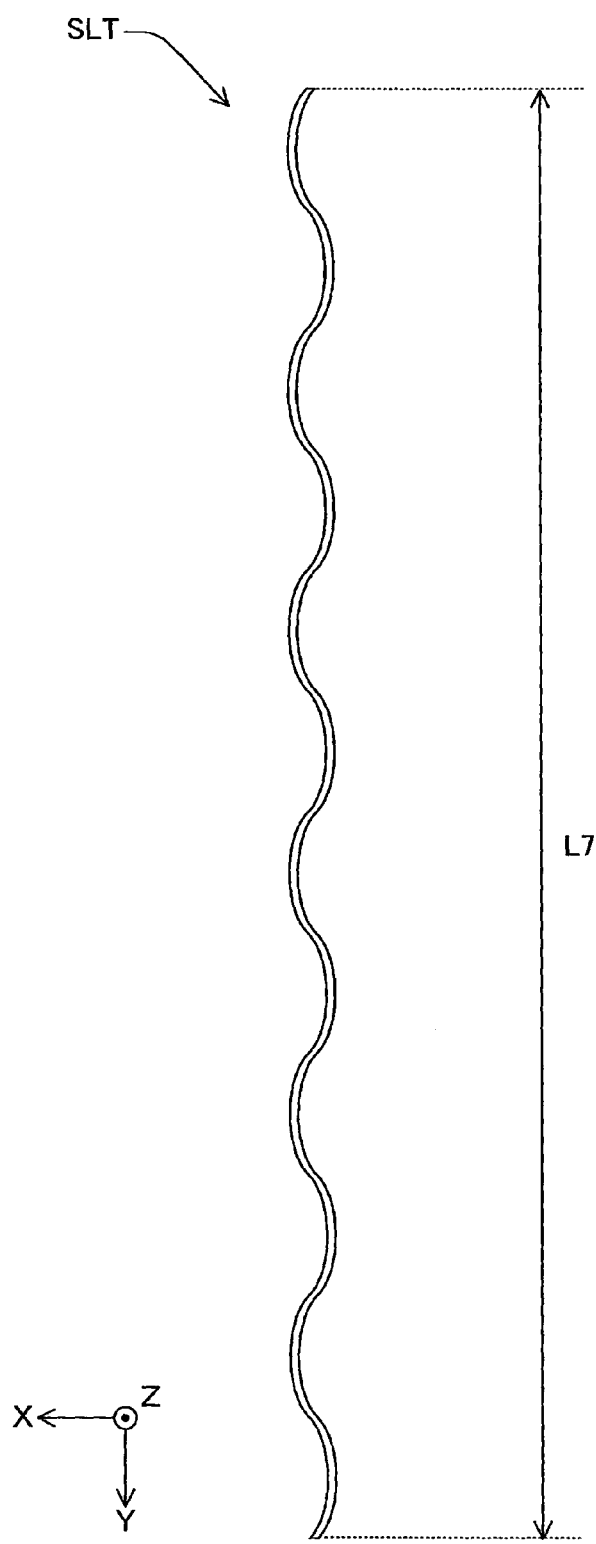
FIG. 90 is a diagram illustrating a second modified example of the slit.

Alternatively, for example, the slit SLT may have a shape shown in FIG. 90. In this case, the formula (9) below is utilized, instead of the formula (7).

$$L7=\lambda/\sqrt{\in_r} \qquad (9)$$

Figure 91:
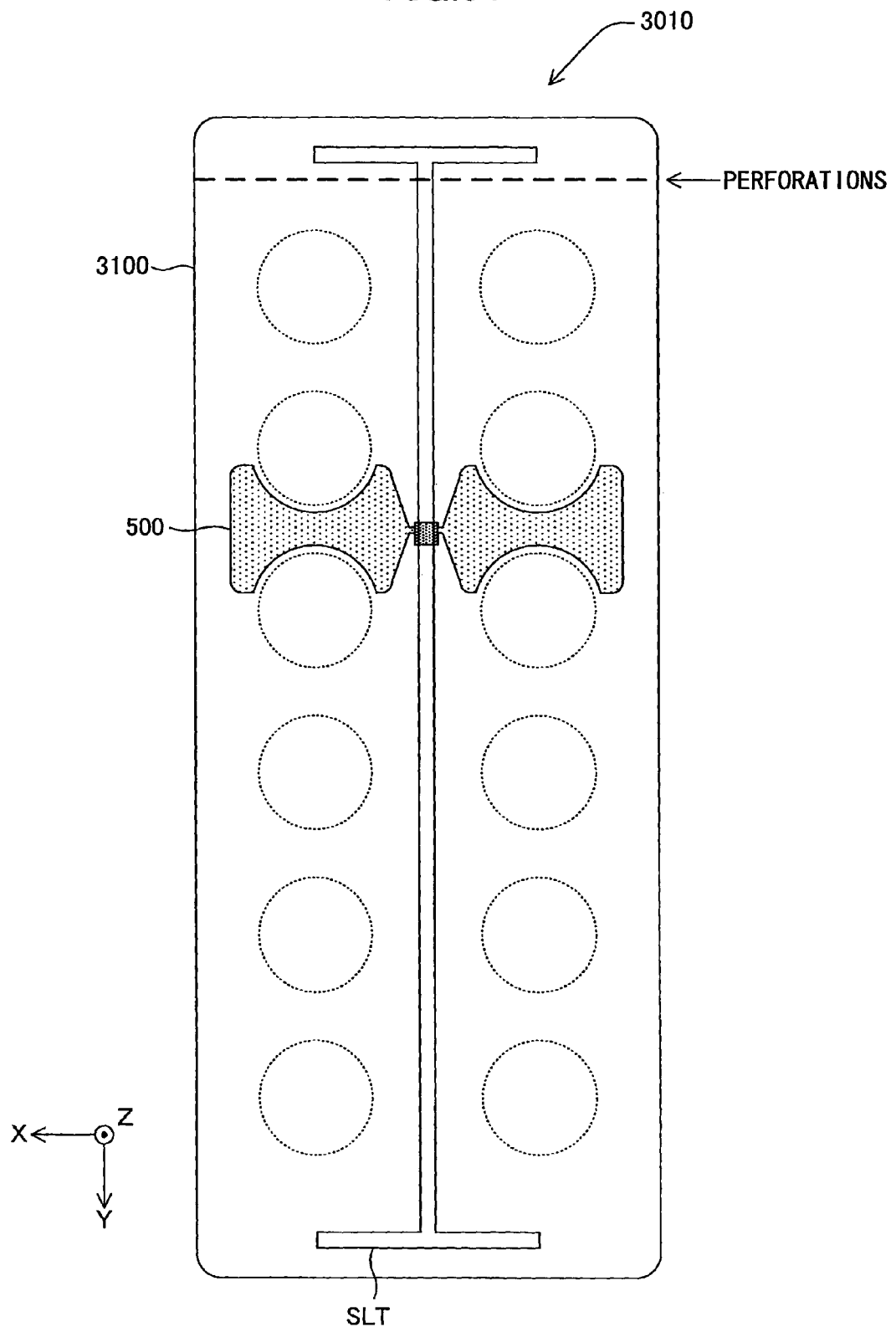
FIG. 91 is a diagram (version 1) illustrating perforations.
Figure 92:
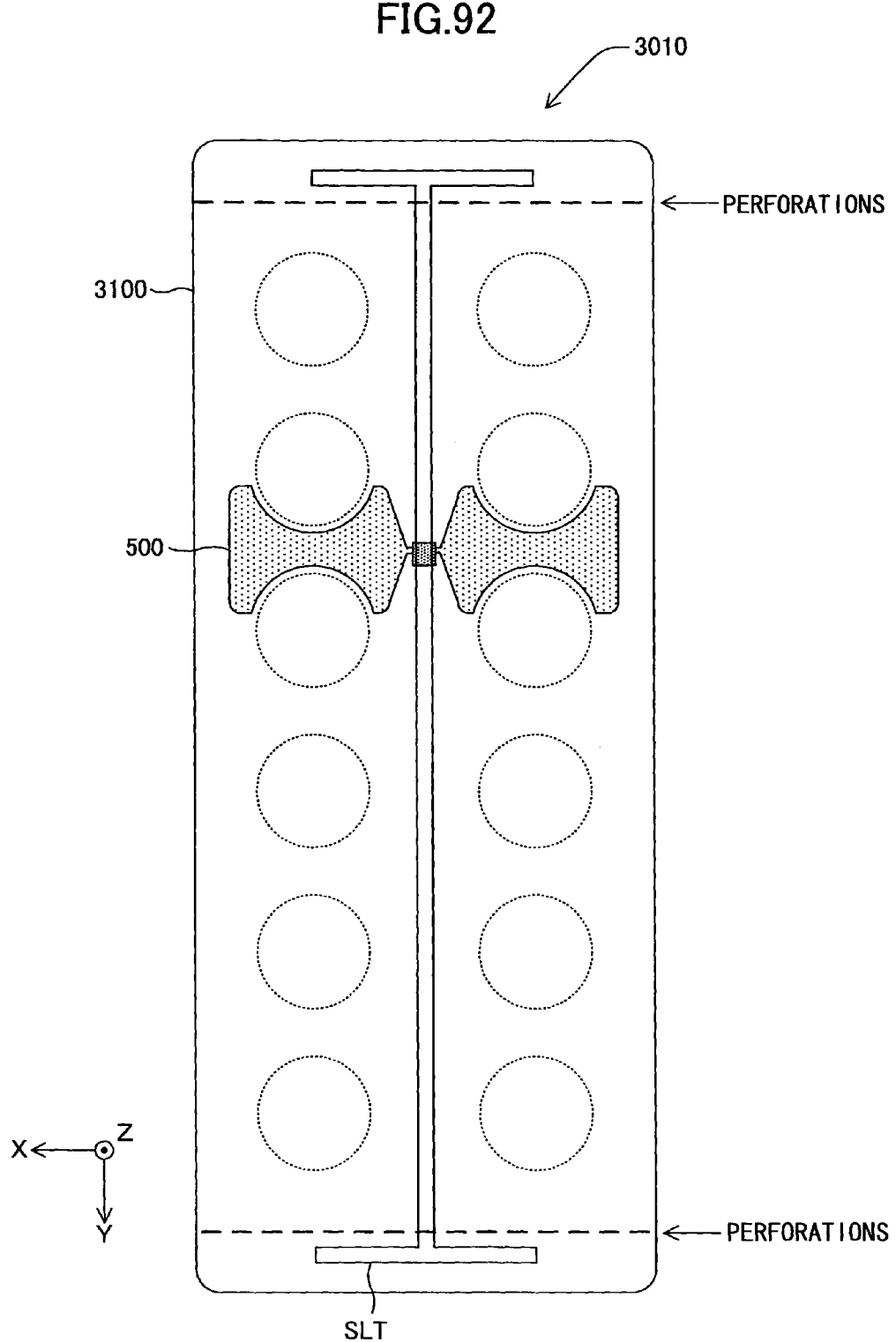
FIG. 92 is a diagram (version 2) illustrating the perforations.

Further, in the third embodiment, perforations for removing at least one of the second slit S2 and the third slit S3 from the package member 3110 may be formed in the package member 3110 (cf. FIGS. 91 and 92). In this case, when at least one of the second slit S2 and the third slit S3 is removed from the package member 3110 along the perforations, the radio communication between the RFID tag 500 and the reader/writer is disabled. Namely, the communication function of the RFID tag 500 can be easily terminated when the communication function of the RFID tag 500 becomes unnecessary.

Further, in the third embodiment, the case has been explained where the tablets are medicine. However, the tablets are not limited to medicine. For example, the tablets may be food.

Further, in the third embodiment, the case has been explained where the package member 3110 is the press through package (PTP). However, the package member 3110 is not limited to this. For example, the package member 3110 may be a blister pack. However, in this case, the metal sheet 3112 may be adhered to a cardboard.

Hereinabove, the RFID tag, the RFID system, and the tablet package including the RFID tag have been explained by the embodiments. However, the present invention is not limited to the above-described embodiments, and various modifications and improvements may be made within the scope of the present invention.

The present application is based on Japanese Priority Applications No. 2011-269506 filed on Dec. 9, 2011, No. 2012-180367 filed on Aug. 16, 2012, and No. 2012-188144 filed on Aug. 29, 2012, the entire contents of which are hereby incorporated herein by reference.

The invention claimed is:

1. A radio frequency identification tag configured to be attached to a metal member including a slit or a groove, the radio frequency identification tag comprising:
a first conductive member configured to be ached to a surface of the metal member at one side of the slit or the groove in a width direction of the slit or the groove through a first isolator;
a second conductive member configured to be attached to the surface of the metal member at the other side of the slit or the groove in the width direction of the slit or the groove through a second isolator; and
an integrated circuit (IC) chip configured to receive power through the first conductive member and the second conductive member,
wherein, when a frequency of radio waves that is utilized for communication is denoted by f, the power induced between the one side and the other side of the slit or the groove by receiving the radio waves is denoted by Wa, voltage induced between the one side and the other side of the slit or the groove by receiving the radio waves is denoted by V, a first area of the first conductive member is denoted by $S_1$, a second area of the second conductive member is denoted by $S_2$, a first thickness of the first isolator is denoted by $d_1$, a second thickness of the second isolator is denoted by $d_2$, a first dielectric constant of the first isolator is denoted by $\epsilon_{r1}$ a second dielectric constant of the second isolator is denoted by $\epsilon_{r2}$, a dielectric constant of vacuum is denoted by $\epsilon_0$, and a minimum value of the power required for the IC chip to operate is denoted Wmin, a first inequality Wmin $\leq$ Wa $-4\pi f \cdot S_1 \cdot \epsilon_0 \cdot \epsilon_{r1} \cdot V^2/d_1$ and a second inequality Wmin $\leq$ Wa $-4\pi f \cdot S_2 \cdot \epsilon_0 \cdot \epsilon_{r2} \cdot V^2/d_2$ are satisified,
wherein the first area $S_1$ of the first conductive member is equal to the second area $S_2$ of the second conductive member,
the first thickness $d_1$ of the isolator is equal to the second thickness $d_2$ of the second isolator, and
the first dielectric constant $\epsilon_{r1}$ of the first isolator is the same as the second dielectric constant $\epsilon_{r2}$ of the second isolator.

2. The radio frequency identification tag according to claim 1, further comprising:
a holding member configured to hold the first conductive member and the second conductive member, and configured to be fixed to the metal member,
wherein the holding member includes plural through holes configured to receive corresponding screws for fixing the holding member to the metal member.

3. The radio frequency identification tag according to claim 2,
wherein the holding member includes a protrusion for aligning the holding member to the slit or the groove.

4. The radio frequency identification tag according to claim 2,
wherein the holding member is configured to cover the slit or the groove.

5. The radio frequency identification tag according to claim I, further comprising:
a dielectric sheet to cover the slit or the groove.

6. A radio frequency identification system comprising:
the radio frequency identification tag according to claim 1; and
a communication device configured to perform, at least, one of reading out of information from the radio frequency identification tag through wireless communication and writing information into the radio frequency identification tag through the wireless communication.

* * * * *